United States Patent
Li et al.

(10) Patent No.: US 11,662,440 B2
(45) Date of Patent: May 30, 2023

(54) MOVEMENT PROFILES FOR SMART SCANNING USING GALVONOMETER MIRROR INSIDE LIDAR SCANNER

(71) Applicant: Innovusion, Inc., Sunnyvale, CA (US)

(72) Inventors: Yufeng Li, Milpitas, CA (US); Yimin Li, Cupertino, CA (US); Rui Zhang, Palo Alto, CA (US); Barry Loveridge, Sunnyvale, CA (US); Haosen Wang, Sunnyvale, CA (US); Junwei Bao, Los Altos, CA (US); Peng Wan, Fremont, CA (US); Gang Zhou, San Jose, CA (US)

(73) Assignee: Innovusion, Inc., Sunnyvale, CA (US)

( * ) Notice: Subject to any disclaimer, the term of this patent is extended or adjusted under 35 U.S.C. 154(b) by 0 days.

(21) Appl. No.: 17/749,968

(22) Filed: May 20, 2022

(65) Prior Publication Data

US 2022/0373655 A1    Nov. 24, 2022

Related U.S. Application Data

(60) Provisional application No. 63/191,891, filed on May 21, 2021.

(51) Int. Cl.
*G01S 7/481* (2006.01)
*G01S 17/10* (2020.01)
(Continued)

(52) U.S. Cl.
CPC .......... *G01S 7/4817* (2013.01); *G01S 7/4814* (2013.01); *G01S 17/10* (2013.01); *G01S 17/894* (2020.01); *G01S 17/931* (2020.01); *G02B 26/105* (2013.01)

(58) Field of Classification Search
CPC ...... G01S 7/4817; G01S 7/4814; G01S 17/10; G01S 17/894; G01S 17/931; G02B 26/105
See application file for complete search history.

(56) References Cited

U.S. PATENT DOCUMENTS

| 3,897,150 A | 7/1975 | Bridges et al. |
| 4,412,720 A | 11/1983 | Costa |

(Continued)

FOREIGN PATENT DOCUMENTS

| CN | 204758260 U | 11/2015 |
| CN | 204885804 U | 12/2015 |

(Continued)

OTHER PUBLICATIONS

Chen, X, et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

(Continued)

*Primary Examiner* — Sang H Nguyen
(74) *Attorney, Agent, or Firm* — Mauriel Kapouytian Woods LLP; Wensheng Ma; Liang Huang

(57) ABSTRACT

A light detection and ranging (LiDAR) scanning system is provided. The system comprises a light steering device; a galvanometer mirror controllable to oscillate between two angular positions; and a plurality of transmitter channels configured to direct light to the galvanometer mirror. The plurality of transmitter channels are separated by an angular channel spacing from one another. The system further comprises a control device. Inside an end-of-travel region, the control device controls the galvanometer mirror to move based on a first mirror movement profile. Outside the end-of-travel region, the control device controls the galvanometer mirror to move based on a second mirror movement (Continued)

profile. The second mirror movement profile is different from the first mirror-movement profile. Movement of the galvanometer mirror based on the first mirror movement profile facilitates minimizing instances of scanlines corresponding to the end-of-travel region having a pitch exceeding a first target pitch.

30 Claims, 17 Drawing Sheets

(51) Int. Cl.
*G01S 17/894* (2020.01)
*G01S 17/931* (2020.01)
*G02B 26/10* (2006.01)

(56) References Cited

U.S. PATENT DOCUMENTS

| | | |
|---|---|---|
| 4,464,048 A | 8/1984 | Farlow |
| 5,006,721 A | 4/1991 | Cameron et al. |
| 5,157,451 A | 10/1992 | Taboada |
| 5,303,084 A | 4/1994 | Pflibsen et al. |
| 5,319,434 A | 6/1994 | Croteau et al. |
| 5,369,661 A | 11/1994 | Yamaguchi et al. |
| 5,442,358 A | 8/1995 | Keeler et al. |
| 5,546,188 A | 8/1996 | Wangler et al. |
| 5,579,153 A | 11/1996 | Laming et al. |
| 5,657,077 A | 8/1997 | Deangelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Tomohiro |
| 6,163,378 A | 12/2000 | Khoury |
| 6,188,078 B1 | 2/2001 | Bell, Jr. et al. |
| 6,317,202 B1 | 11/2001 | Hosokawa et al. |
| 6,594,000 B2 | 7/2003 | Green et al. |
| 6,650,404 B1 | 11/2003 | Crawford |
| 6,788,445 B2 | 9/2004 | Goldberg et al. |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,440,084 B2 | 10/2008 | Kane |
| 7,440,175 B2 | 10/2008 | Di et al. |
| 7,489,865 B2 | 2/2009 | Varshneya et al. |
| 7,576,837 B2 | 8/2009 | Liu et al. |
| 7,830,527 B2 | 11/2010 | Chen et al. |
| 7,835,068 B1 | 11/2010 | Brooks et al. |
| 7,847,235 B2 | 12/2010 | Krupkin et al. |
| 7,936,448 B2 | 5/2011 | Albuquerque et al. |
| 7,969,558 B2 | 6/2011 | Hall |
| 7,982,861 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,764 B2 | 6/2014 | Hsu |
| 8,812,149 B2 | 8/2014 | Doak |
| 8,994,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk |
| 9,702,966 B2 | 7/2017 | Batcheller et al. |
| 9,804,264 B2 | 10/2017 | Villeneuve et al. |
| 9,810,786 B1 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,880,263 B2 | 1/2018 | Droz et al. |
| 9,880,278 B2 | 1/2018 | Uffelen et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 10,007,001 B1 | 6/2018 | LaChapelle et al. |
| 10,012,732 B2 | 7/2018 | Eichenholz et al. |
| 10,031,214 B2 | 7/2018 | Rosenzweig et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dussan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Engberg, Jr. et al. |
| 10,324,185 B2 | 6/2019 | McWhirter et al. |
| 10,393,877 B2 | 8/2019 | Hall et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,976,415 B1* | 4/2021 | Gagne .................. G01S 7/4817 |
| 10,983,218 B2 | 4/2021 | Hall et al. |
| 11,002,835 B2 | 5/2021 | Pan et al. |
| 11,009,605 B2 | 5/2021 | Li et al. |
| 11,194,048 B1 | 12/2021 | Burbank et al. |
| 2002/0136251 A1 | 9/2002 | Green et al. |
| 2003/0035100 A1* | 2/2003 | Dimsdale ................. G06T 7/80 356/124 |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu |
| 2009/0262760 A1 | 10/2009 | Krupkin et al. |
| 2009/0316134 A1 | 12/2009 | Michael et al. |
| 2010/0006760 A1 | 1/2010 | Lee et al. |
| 2010/0020306 A1 | 1/2010 | Hall |

(56) References Cited

U.S. PATENT DOCUMENTS

| | | |
|---|---|---|
| 2010/0020377 A1 | 1/2010 | Borchers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0165322 A1 | 7/2010 | Kane et al. |
| 2010/0271614 A1 | 10/2010 | Albuquerque et al. |
| 2010/0301024 A1 | 12/2010 | Unrath |
| 2011/0181864 A1 | 7/2011 | Schmitt et al. |
| 2012/0038903 A1 | 2/2012 | Weimer et al. |
| 2012/0124113 A1 | 5/2012 | Zalik et al. |
| 2012/0221142 A1 | 8/2012 | Doak |
| 2012/0260512 A1* | 10/2012 | Kretschmer ......... G01B 21/047 33/503 |
| 2013/0107016 A1 | 5/2013 | Federspiel |
| 2013/0116971 A1 | 5/2013 | Retkowski et al. |
| 2013/0241761 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347650 A1 | 11/2014 | Bosch |
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109603 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061655 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0245902 A1 | 8/2016 | Natnik |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0152691 A1 | 5/2018 | Pacala et al. |
| 2018/0158471 A1 | 6/2018 | Vaughn et al. |
| 2018/0164439 A1 | 6/2018 | Droz et al. |
| 2018/0156896 A1 | 7/2018 | O'Keeffe |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0210084 A1 | 7/2018 | Zwölfer et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0292532 A1* | 10/2018 | Meyers ................. G01S 7/4816 |
| 2018/0329060 A1 | 11/2018 | Pacala et al. |
| 2018/0359460 A1 | 12/2018 | Pacala et al. |
| 2019/0001442 A1* | 1/2019 | Unrath ................. B23K 26/703 |
| 2019/0025428 A1 | 1/2019 | Li et al. |
| 2019/0107607 A1 | 4/2019 | Danziger |
| 2019/0107623 A1* | 4/2019 | Campbell ............. G02B 26/10 |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0383911 A1 | 12/2019 | Zhang et al. |
| 2019/0383915 A1 | 12/2019 | Li et al. |
| 2020/0142070 A1 | 5/2020 | Hall et al. |
| 2020/0174103 A1* | 6/2020 | Gomez .................. G01S 17/42 |
| 2020/0182975 A1 | 6/2020 | Wang et al. |
| 2020/0256964 A1 | 8/2020 | Campbell et al. |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |
| 2021/0088631 A1* | 3/2021 | Otsuka .................. G01S 17/26 |
| 2022/0113406 A1* | 4/2022 | Cho ....................... G01S 7/481 |

FOREIGN PATENT DOCUMENTS

| | | |
|---|---|---|
| CN | 108132472 A | 6/2018 |
| CN | 207457508 U | 6/2018 |
| CN | 207557465 U | 6/2018 |
| CN | 208314210 U | 1/2019 |
| CN | 208421228 U | 1/2019 |
| CN | 208705506 U | 4/2019 |
| CN | 106597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| EP | 0 757 257 A2 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |

(56) References Cited

FOREIGN PATENT DOCUMENTS

| | | |
|---|---|---|
| GB | 1 427 164 A | 3/1976 |
| GB | 2000411 | 1/1979 |
| JP | 2007144667 A | 6/2007 |
| JP | 2010035385 A | 2/2010 |
| JP | 2017-003347 A | 1/2017 |
| JP | 2017-138301 A | 8/2017 |
| KR | 10-2012-0013515 A | 2/2012 |
| KR | 10-2013-0068224 A | 6/2013 |
| KR | 10-2018-0107673 A | 10/2018 |
| WO | 01/95010 A2 | 12/2001 |
| WO | 2017/110417 A1 | 6/2017 |
| WO | 2018/125725 A1 | 7/2018 |
| WO | 2018/129410 A1 | 7/2018 |
| WO | 2018129408 A1 | 7/2018 |
| WO | 2018129409 A1 | 7/2018 |
| WO | 2018129410 A1 | 7/2018 |
| WO | 2018175990 | 9/2018 |
| WO | 2018182812 A2 | 10/2018 |
| WO | 2019079642 | 4/2019 |
| WO | 2019165095 | 8/2019 |
| WO | 2019165289 A1 | 8/2019 |
| WO | 2019165294 | 8/2019 |
| WO | 2020013890 A2 | 1/2020 |

OTHER PUBLICATIONS

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for International Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Jan. 3, 2019, for International Application No. PCT/US2018/056577, 15 pages.
International Search Report and Written Opinion, dated Mar. 23, 2018, for International Application No. PCT/US2018/012704, 12 pages.
International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al., (Mar. 2, 2016). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
"Mirrors", Physics LibreTexts, https://phys.libretexts.org/Bookshelves/Optics/Supplemental_Modules_(Components)/Mirrors, (2021), 2 pages.
"Why Wavelengths Matter in Fiber Optics", FirstLight, https://www.firstlight.net/why-wavelengths-matter-in-fiber-optics/, (2021), 5 pages.
International Search Report and Written Opinion issued in International Application No. PCT/US2022/030373 dated Aug. 31, 2022, 15 pages.
Office Action issued in Korean Application No. 10-2021-7041437 dated Apr. 28, 2022, 6 pages.
Sels et al., "Extrinsic Calibration of a Laser Galvanometric Setup and a Range Camera," Sensors, 2018, vol. 18, No. 5, 14 pages.

* cited by examiner

FIG. 9

Sample transmission beams angular position patterns without ROI

Sample transmission beams angular position pattern with ROI

1200

| Large Step: | 0.96 | RPM Rate: | 6300 | | | | | |
|---|---|---|---|---|---|---|---|---|
| ROI Step: | 0.1 | Frame Rate: | 15Hz | | | | | |
| Ch Spacing: | 1.2 | | | | | | | |
| Time (ms) | CH#1 | CH#2 | CH#3 | CH#4 | Time (ms) | CH#1 | CH#2 | CH#3 | CH#4 |
| 0 | 9.98 | 8.78 | 7.58 | 6.38 | 66.675 | -11.38 | -12.58 | -13.78 | -14.98 |
| 1.905 | 9.5 | 8.3 | 7.1 | 5.9 | 68.58 | -10.9 | -12.1 | -13.3 | -14.5 |
| 3.81 | 9.02 | 7.82 | 6.62 | 5.42 | 70.485 | -10.42 | -11.62 | -12.82 | -14.02 |
| 5.715 | 8.06 | 6.86 | 5.66 | 4.46 | 72.39 | -9.46 | -10.66 | -11.86 | -13.06 |
| 7.62 | 7.1 | 5.9 | 4.7 | 3.5 | 74.295 | -8.5 | -9.7 | -10.9 | -12.1 |
| 9.525 | 6.14 | 4.94 | 3.74 | 2.54 | 76.2 | -7.54 | -8.74 | -9.94 | -11.14 |
| 11.43 | 5.18 | 3.98 | 2.78 | 1.58 | 78.105 | -6.58 | -7.78 | -8.98 | -10.18 |
| 13.335 | 4.22 | 3.02 | 1.82 | 0.62 | 80.01 | -5.62 | -6.82 | -8.02 | -9.22 |
| 15.24 | 3.26 | 2.06 | 0.86 | -0.34 | 81.915 | -4.66 | -5.86 | -7.06 | -8.26 |
| 17.145 | 2.3 | 1.1 | -0.1 | -1.3 | 83.82 | -3.7 | -4.9 | -6.1 | -7.3 |
| 19.05 | 2.2 | 1 | -0.2 | -1.4 | 85.725 | -2.74 | -3.94 | -5.14 | -6.34 |
| 20.955 | 2.1 | 0.9 | -0.3 | -1.5 | 87.63 | -1.78 | -2.98 | -4.18 | -5.38 |
| 22.86 | 2 | 0.8 | -0.4 | -1.6 | 89.535 | -0.82 | -2.02 | -3.22 | -4.42 |
| 24.765 | 1.9 | 0.7 | -0.5 | -1.7 | 91.44 | 0.14 | -1.06 | -2.26 | -3.46 |
| 26.67 | 1.8 | 0.6 | -0.6 | -1.8 | 93.345 | 1.1 | -0.1 | -1.3 | -2.5 |
| 28.575 | 1.7 | 0.5 | -0.7 | -1.9 | 95.25 | 1.2 | 3.8E-15 | -1.2 | -2.4 |
| 30.48 | 1.6 | 0.4 | -0.08 | -2 | 97.155 | 1.3 | 0.1 | -1.1 | -2.3 |
| 32.385 | 1.5 | 0.3 | -0.9 | -2.1 | 99.06 | 1.4 | 0.2 | -1 | -2.2 |
| 34.29 | 1.4 | 0.2 | -1 | -2.2 | 100.965 | 1.5 | 0.3 | -0.9 | -2.1 |
| 36.195 | 1.3 | 0.1 | -1.1 | -2.3 | 102.87 | 1.6 | 0.4 | -0.8 | -2 |
| 38.1 | 1.2 | -2E-15 | -1.2 | -2.4 | 104.775 | 1.7 | 0.5 | -0.7 | -1.9 |
| 40.005 | 0.38 | -0.82 | -2.02 | -3.22 | 106.68 | 1.8 | 0.6 | -0.6 | -1.8 |
| 41.91 | -0.58 | -1.78 | -2.98 | -4.18 | 108.585 | 1.9 | 0.7 | -0.5 | -1.7 |
| 43.815 | -1.54 | -2.74 | -3.94 | -5.14 | 110.49 | 2 | 0.8 | -0.4 | -1.6 |
| 45.72 | -2.5 | -3.7 | -4.9 | -6.1 | 112.395 | 2.1 | 0.9 | -0.3 | -1.5 |
| 47.625 | -3.46 | -4.66 | -5.86 | -7.06 | 114.3 | 2.2 | 1 | -0.2 | -1.4 |
| 49.53 | -4.42 | -5.62 | -6.82 | -8.02 | 116.205 | 3.02 | 1.82 | 0.62 | -0.58 |
| 51.435 | -5.38 | -6.58 | -7.78 | -8.98 | 118.11 | 3.98 | 2.78 | 1.58 | 0.38 |
| 53.34 | -6.34 | -7.54 | -8.74 | -9.94 | 120.015 | 4.94 | 3.74 | 2.54 | 1.34 |
| 55.245 | -7.3 | -8.5 | -9.7 | -10.9 | 121.92 | 5.9 | 4.7 | 3.5 | 2.3 |
| 57.15 | -8.26 | -9.46 | -10.66 | -11.86 | 123.825 | 6.86 | 5.66 | 4.46 | 3.26 |
| 59.055 | -9.22 | -10.42 | -11.62 | -12.82 | 125.73 | 7.82 | 6.62 | 5.42 | 4.22 |
| 60.96 | -10.18 | -11.38 | -12.58 | -13.78 | 127.635 | 8.78 | 7.58 | 6.38 | 5.18 |
| 62.865 | -10.66 | -11.86 | -13.06 | -14.26 | 129.54 | 9.26 | 8.06 | 6.86 | 5.66 |
| 64.77 | -11.14 | -12.34 | -13.54 | -14.74 | 131.445 | 9.74 | 8.54 | 7.34 | 6.14 |
| | | | | | 133.35 | 9.98 | 8.78 | 7.58 | 6.38 |

FIG. 12

MOVEMENT PROFILES FOR SMART SCANNING USING GALVONOMETER MIRROR INSIDE LIDAR SCANNER

CROSS-REFERENCE TO RELATED APPLICATIONS

This application claims priority to U.S. Provisional Patent Application Ser. No. 63/191,891, filed May 21, 2021, entitled "SMART SCANNING PROFILE FOR GALVO MIRROR INSIDE LIDAR SCANNER," the content of which is hereby incorporated by reference in its entirety for all purposes.

FIELD OF THE TECHNOLOGY

This disclosure relates generally to optical scanning and, more particularly, to performing intelligent scanning by controlling movement profiles of a galvanometer mirror.

BACKGROUND

Light detection and ranging (LiDAR) systems use light pulses to create an image or point cloud of the external environment. Some typical LiDAR systems include a light source, a light transmitter, a light steering system, and a light detector. The light source generates a light beam that is directed by the light steering system in particular directions when being transmitted from the LiDAR system. When a transmitted light beam is scattered by an object, a portion of the scattered light returns to the LiDAR system as a return light pulse. The light detector detects the return light pulse. Using the difference between the time that the return light pulse is detected and the time that a corresponding light pulse in the light beam is transmitted, the LiDAR system can determine the distance to the object using the speed of light. The light steering system can direct light beams along different paths to allow the LiDAR system to scan the surrounding environment and produce images or point clouds. LiDAR systems can also use techniques other than time-of-flight and scanning to measure the surrounding environment.

SUMMARY

Embodiments of present invention are described below. In various embodiments of the present invention, mirror movement profiles are configured such that the speeds of the mirror movement in different regions are different. The movement profiles are used for controlling a galvanometer mirror movement. As a result, the skipped scanlines and redundant scanlines are reduced or eliminated. Eliminating or minimizing the skipped scanlines and the redundant scanlines improves the resolutions of the scanline pattern, reduces the speed of the light steering device for producing the same total number of scanlines, and thus improves the overall performance of the LiDAR system. Moreover, the rotation cycle of a light steering device can be configured to synchronize with the scanning cycle of galvanometer mirror. The synchronization between the light steering device and the galvanometer mirror reduces or eliminates frame-to-frame jitter, thereby providing a more stable point cloud data.

In one embodiment, a light detection and ranging (LiDAR) scanning system is provided. The system comprises a light steering device; a galvanometer mirror controllable to oscillate between two angular positions; and a plurality of transmitter channels configured to direct light to the galvanometer mirror. The plurality of transmitter channels are separated by an angular channel spacing from one another. The system further comprises a control device. Inside an end-of-travel region, the control device controls the galvanometer mirror to move based on a first mirror movement profile. Outside the end-of-travel region, the control device controls the galvanometer mirror to move based on a second mirror movement profile. The second mirror movement profile is different from the first mirror-movement profile. Movement of the galvanometer mirror based on the first mirror movement profile facilitates minimizing instances of scanlines corresponding to the end-of-travel region having a pitch exceeding a first target pitch.

In one embodiment, a method for performing scan using a light detection and ranging (LiDAR) system is provided. The method is performed by one or more processors and memory. The method comprises, inside an end-of-travel region, controlling the galvanometer mirror to move based on a first mirror movement profile. The end-of-travel region comprises a first part within a first threshold angular distance of a first of the two angular positions and a second part within a second threshold angular distance of a second of the two angular positions. The method further comprises, outside the end-of-travel region, controlling the galvanometer mirror to move based on a second mirror movement profile. The second mirror movement profile is different from the first mirror-movement profile. Movement of the galvanometer mirror based on the first mirror movement profile facilitates minimizing instances of scanlines corresponding to the end-of-travel region having a pitch exceeding a first target pitch.

In one embodiment, a non-transitory computer readable medium storing one or more programs is provided. The one or more programs comprising instructions, which when executed by one or more processors of an electronic device, cause the electronic device to perform a method for performing scan using a light detection and ranging (LiDAR) system. The method comprises, inside an end-of-travel region, controlling the galvanometer mirror to move based on a first mirror movement profile. The end-of-travel region comprises a first part within a first threshold angular distance of a first of the two angular positions and a second part within a second threshold angular distance of a second of the two angular positions. The method further comprises, outside the end-of-travel region, controlling the galvanometer mirror to move based on a second mirror movement profile. The second mirror movement profile is different from the first mirror-movement profile. Movement of the galvanometer mirror based on the first mirror movement profile facilitates minimizing instances of scanlines corresponding to the end-of-travel region having a pitch exceeding a first target pitch.

BRIEF DESCRIPTION OF THE DRAWINGS

The present application can be best understood by reference to the figures described below taken in conjunction with the accompanying drawing figures, in which like parts may be referred to by like numerals.

FIG. 9 shows three sample transmission beams angular position patterns when a LiDAR system is not configured for scanning a region of interest (ROI), according to some embodiments.

FIG. 12 is a sample transmission beams angular position pattern when the galvanometer mirror is configured for scanning according to one or more movement profiles, according to some embodiments.

DETAILED DESCRIPTION

Figure 1:
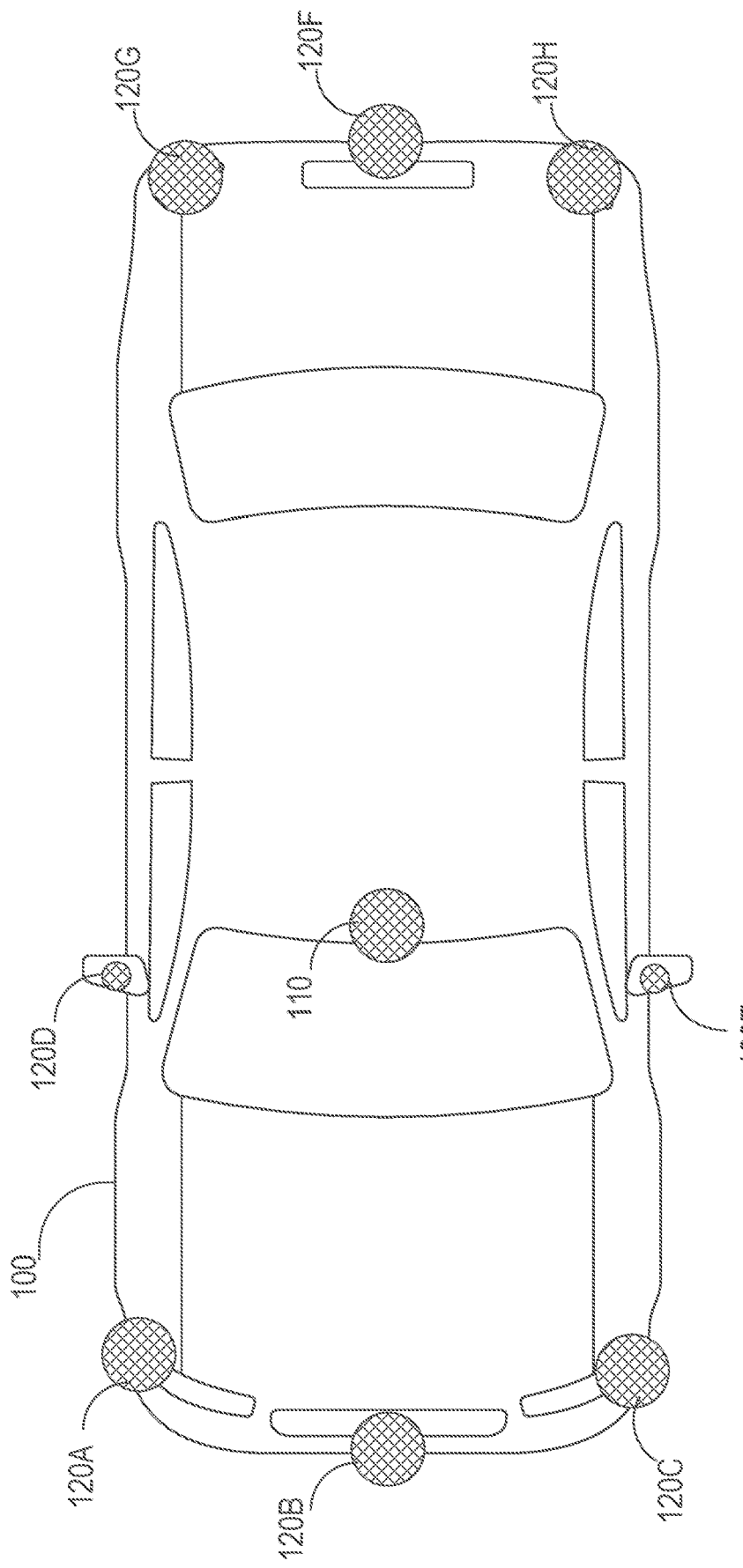
FIG. 1 illustrates one or more exemplary LiDAR systems disposed or included in a motor vehicle.

To provide a more thorough understanding of the present invention, the following description sets forth numerous specific details, such as specific configurations, parameters, examples, and the like. It should be recognized, however, that such description is not intended as a limitation on the scope of the present invention but is intended to provide a better description of the exemplary embodiments.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the disclosure may be readily combined, without departing from the scope or spirit of the invention.

As used herein, the term "or" is an inclusive "or" operator and is equivalent to the term "and/or," unless the context clearly dictates otherwise.

The term "based on" is not exclusive and allows for being based on additional factors not described unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

Although the following description uses terms "first," "second," etc. to describe various elements, these elements should not be limited by the terms. These terms are only used to distinguish one element from another. For example, a first profile could be termed a second profile and, similarly, a second profile could be termed a first profile, without departing from the scope of the various described examples. The first profile and the second profile can both be profiles and, in some cases, can be separate and different profiles.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the following disclosure, numerous references may be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, PLD, DSP, x86, ARM, RISC-V, Cold-Fire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices or network platforms, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

A LiDAR system may be configured to scan a field-of-view (FOV) and generate scan results at a certain frame rate. The frame rate relates to the total number of scanlines per second. For an LiDAR system having a given number of facets of the light steering device and a given number of the transmitter channels, increasing the rotational speed of the light steering device can increase the total number of scanlines per second. But a higher rotational speed of the light steering device causes a higher energy consumption, possibly greater acoustic noise, and reduced reliability and useful lifetime of the light steering device. Thus, it is often desirable to reduce the speed of the light steering device (e.g., a polygon mirror) as much as possible while maintaining or improving the frame rate and/or the number of scanlines per frame.

A galvanometer mirror in a LiDAR system oscillates between two angular positions to cover a vertical scanning range of the FOV. When the galvanometer mirror travels near one of the two angular positions (also referred to as the end positions or end angular positions), it typically maintains the same speed as it travels in other regions and then changes speed rapidly down to zero. It then reverses the direction of movement to oscillate back to the other end position. This manner of mirror movement inside the end-of-travel region oftentimes results in skipped or missing scanlines (as described in more detail below).

In addition, a LiDAR system may have multiple transmitter channels. For reducing channel cross-talk, the channels may be positioned far apart with a large angular channel spacing. The increased channel spacing may result in a higher number of skipped scanlines. Scanline skipping may cause the data in the end-of-travel region to be less reliable and less useful. In some embodiments, these data may be unused and discarded. Thus, the scanning by the galvanometer mirror inside an end-of-travel region near the end positions may often be wasted.

Further, when a LiDAR system is configured to scan an FOV to generate scanlines, redundant scanlines may result when the scan moves into and out from an ROI. For example, the galvanometer mirror may be configured to scan transmission light beams in the vertical dimension. An ROI may be positioned to be in the middle of the galvanometer mirror's scanning range in the vertical dimension. Thus, the galvanometer mirror may start from one end position, moves outside of the ROI, moves into the ROI, and then moves outside of the ROI again toward the other end position. There are therefore two transition areas when the galvanometer mirror moves into and out of the ROI. During such a transition process, redundant scanlines may result. The redundant scanlines are often unnecessary. A high number of redundant scanlines causes wasting of energy to process the scanlines and increases the number of scanlines needed to cover a desired FOV in the vertical dimension.

Embodiments of present invention are described below. In various embodiments of the present invention, mirror movement profiles are configured and used for controlling the galvanometer mirror movement. The scanline skipping and redundant scanlines can be reduced or eliminated by properly configuring one or more movement profiles of the galvanometer mirror such that the speeds of the mirror movement in different regions are different. Eliminating or minimizing the skipped scanlines improves the resolutions of the scanline pattern, reduces the speed of the light steering device for producing the same total number of scanlines, and thus improves the overall performance of the LiDAR system. Moreover, the rotation cycle of a light steering device can be configured to synchronize with the scanning cycle of galvanometer mirror. The synchronization between the light steering device and the galvanometer mirror provides a more stable point cloud data, which is often desirable.

FIG. 1 illustrates one or more exemplary LiDAR systems 110 disposed or included in a motor vehicle 100. Motor vehicle 100 can be a vehicle having any automated level. For example, motor vehicle 100 can be a partially automated vehicle, a highly automated vehicle, a fully automated vehicle, or a driverless vehicle. A partially automated vehicle can perform some driving functions without a human driver's intervention. For example, a partially automated vehicle can perform blind-spot monitoring, lane keeping and/or lane changing operations, automated emergency braking, smart cruising and/or traffic following, or the like. Certain operations of a partially automated vehicle may be limited to specific applications or driving scenarios (e.g., limited to only freeway driving). A highly automated vehicle can generally perform all operations of a partially automated vehicle but with less limitations. A highly automated vehicle can also detect its own limits in operating the vehicle and ask the driver to take over the control of the vehicle when necessary. A fully automated vehicle can perform all vehicle operations without a driver's intervention but can also detect its own limits and ask the driver to take over when necessary. A driverless vehicle can operate on its own without any driver intervention.

In typical configurations, motor vehicle 100 comprises one or more LiDAR systems 110 and 120A-F. Each of LiDAR systems 110 and 120A-F can be a scanning-based LiDAR system and/or a non-scanning LiDAR system (e.g., a flash LiDAR). A scanning-based LiDAR system scans one or more light beams in one or more directions (e.g., horizontal and vertical directions) to detect objects in a fieldof-view (FOV). A non-scanning based LiDAR system transmits laser light to illuminate an FOV without scanning. For example, a flash LiDAR is a type of non-scanning based LiDAR system. A flash LiDAR can transmit laser light to simultaneously illuminate an FOV using a single light pulse or light shot.

A LiDAR system is often an essential sensor of a vehicle that is at least partially automated. In one embodiment, as shown in FIG. 1, motor vehicle 100 may include a single LiDAR system 110 (e.g., without LiDAR systems 120A-F) disposed at the highest position of the vehicle (e.g., at the vehicle roof). Disposing LiDAR system 110 at the vehicle roof facilitates a 360-degree scanning around vehicle 100. In some other embodiments, motor vehicle 100 can include multiple LiDAR systems, including two or more of systems 110 and/or 120A-F. As shown in FIG. 1, in one embodiment, multiple LiDAR systems 110 and/or 120A-F are attached to vehicle 100 at different locations of the vehicle. For example, LiDAR system 120A is attached to vehicle 100 at the front right corner; LiDAR system 120B is attached to vehicle 100 at the front center; LiDAR system 120C is attached to vehicle 100 at the front left corner; LiDAR system 120D is attached to vehicle 100 at the right-side rear view mirror; LiDAR system 120E is attached to vehicle 100 at the left-side rear view mirror; and/or LiDAR system 120F is attached to vehicle 100 at the back center. In some embodiments, LiDAR systems 110 and 120A-F are independent LiDAR systems having their own respective laser sources, control electronics, transmitters, receivers, and/or steering mechanisms. In other embodiments, some of LiDAR systems 110 and 120A-F can share one or more components, thereby forming a distributed sensor system. In one example, optical fibers are used to deliver laser light from a centralized laser source to all LiDAR systems. It is understood that one or more LiDAR systems can be distributed and attached to a vehicle in any desired manner and FIG. 1 only illustrates one embodiment. As another example, LiDAR systems 120D and 120E may be attached to the B-pillars of vehicle 100 instead of the rear-view mirrors. As another example, LiDAR system 120B may be attached to the windshield of vehicle 100 instead of the front bumper.

Figure 2:
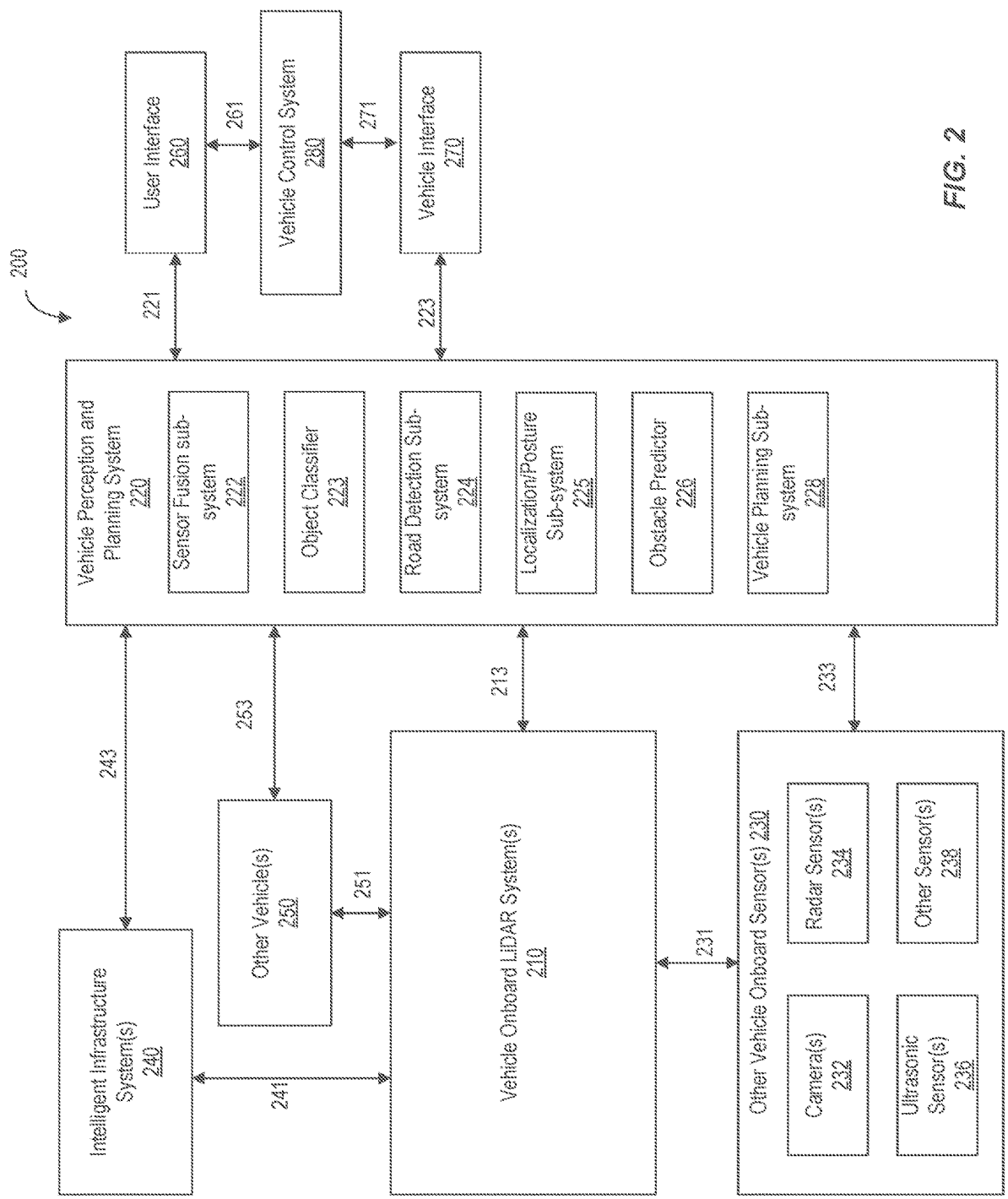
FIG. 2 is a block diagram illustrating interactions between an exemplary LiDAR system and multiple other systems including a vehicle perception and planning system.

FIG. 2 is a block diagram 200 illustrating interactions between vehicle onboard LiDAR system(s) 210 and multiple other systems including a vehicle perception and planning system 220. LiDAR system(s) 210 can be mounted on or integrated to a vehicle. LiDAR system(s) 210 include sensor(s) that scan laser light to the surrounding environment to measure the distance, angle, and/or velocity of objects. Based on the scattered light that returned to LiDAR system(s) 210, it can generate sensor data (e.g., image data or 3D point cloud data) representing the perceived external environment.

LiDAR system(s) 210 can include one or more of short-range LiDAR sensors, medium-range LiDAR sensors, and long-range LiDAR sensors. A short-range LiDAR sensor measures objects located up to about 20-40 meters from the LiDAR sensor. Short-range LiDAR sensors can be used for, e.g., monitoring nearby moving objects (e.g., pedestrians crossing street in a school zone), parking assistance applications, or the like. A medium-range LiDAR sensor measures objects located up to about 100-150 meters from the LiDAR sensor. Medium-range LiDAR sensors can be used for, e.g., monitoring road intersections, assistance for merging onto or leaving a freeway, or the like. A long-range LiDAR sensor measures objects located up to about 150-300 meters. Long-range LiDAR sensors are typically used when a vehicle is travelling at high speed (e.g., on a freeway), such that the vehicle's control systems may only have a few seconds (e.g., 6-8 seconds) to respond to any situations detected by the LiDAR sensor. As shown in FIG. 2, in one embodiment, the LiDAR sensor data can be provided to vehicle perception and planning system 220 via a communication path 213 for further processing and controlling the vehicle operations. Communication path 213 can be any wired or wireless communication links that can transfer data.

With reference still to FIG. 2, in some embodiments, other vehicle onboard sensor(s) 230 are used to provide additional sensor data separately or together with LiDAR system(s) 210. Other vehicle onboard sensors 230 may include, for example, one or more camera(s) 232, one or more radar(s) 234, one or more ultrasonic sensor(s) 236, and/or other sensor(s) 238. Camera(s) 232 can take images and/or videos of the external environment of a vehicle. Camera(s) 232 can take, for example, high-definition (HD) videos having millions of pixels in each frame. A camera produces monochrome or color images and videos. Color information may be important in interpreting data for some situations (e.g., interpreting images of traffic lights). Color information may not be available from other sensors such as LiDAR or radar sensors. Camera(s) 232 can include one or more of narrow-focus cameras, wider-focus cameras, side-facing cameras, infrared cameras, fisheye cameras, or the like. The image and/or video data generated by camera(s) 232 can also be provided to vehicle perception and planning system 220 via communication path 233 for further processing and controlling the vehicle operations. Communication path 233 can be any wired or wireless communication links that can transfer data.

Other vehicle onboard sensor(s) 230 can also include radar sensor(s) 234. Radar sensor(s) 234 use radio waves to determine the range, angle, and velocity of objects. Radar sensor(s) 234 produce electromagnetic waves in the radio or microwave spectrum. The electromagnetic waves reflect off an object and some of the reflected waves return to the radar sensor, thereby providing information about the object's position and velocity. Radar sensor(s) 234 can include one or more of short-range radar(s), medium-range radar(s), and long-range radar(s). A short-range radar measures objects located at about 0.1-30 meters from the radar. A short-range radar is useful in detecting objects located nearby the vehicle, such as other vehicles, buildings, walls, pedestrians, bicyclists, etc. A short-range radar can be used to detect a blind spot, assist in lane changing, provide rear-end collision warning, assist in parking, provide emergency braking, or the like. A medium-range radar measures objects located at about 30-80 meters from the radar. A long-range radar measures objects located at about 80-200 meters. Medium- and/or long-range radars can be useful in, for example, traffic following, adaptive cruise control, and/or highway automatic braking. Sensor data generated by radar sensor(s) 234 can also be provided to vehicle perception and planning system 220 via communication path 233 for further processing and controlling the vehicle operations.

Other vehicle onboard sensor(s) 230 can also include ultrasonic sensor(s) 236. Ultrasonic sensor(s) 236 use acoustic waves or pulses to measure object located external to a vehicle. The acoustic waves generated by ultrasonic sensor(s) 236 are transmitted to the surrounding environment. At least some of the transmitted waves are reflected off an object and return to the ultrasonic sensor(s) 236. Based on the return signals, a distance of the object can be calculated. Ultrasonic sensor(s) 236 can be useful in, for example, check blind spot, identify parking spots, provide lane changing assistance into traffic, or the like. Sensor data generated by ultrasonic sensor(s) 236 can also be provided to vehicle perception and planning system 220 via communication path 233 for further processing and controlling the vehicle operations.

In some embodiments, one or more other sensor(s) 238 may be attached in a vehicle and may also generate sensor data. Other sensor(s) 238 may include, for example, global positioning systems (GPS), inertial measurement units (IMU), or the like. Sensor data generated by other sensor(s) 238 can also be provided to vehicle perception and planning system 220 via communication path 233 for further processing and controlling the vehicle operations. It is understood that communication path 233 may include one or more communication links to transfer data between the various sensor(s) 230 and vehicle perception and planning system 220.

In some embodiments, as shown in FIG. 2, sensor data from other vehicle onboard sensor(s) 230 can be provided to vehicle onboard LiDAR system(s) 210 via communication path 231. LiDAR system(s) 210 may process the sensor data from other vehicle onboard sensor(s) 230. For example, sensor data from camera(s) 232, radar sensor(s) 234, ultrasonic sensor(s) 236, and/or other sensor(s) 238 may be correlated or fused with sensor data LiDAR system(s) 210, thereby at least partially offloading the sensor fusion process performed by vehicle perception and planning system 220. It is understood that other configurations may also be implemented for transmitting and processing sensor data from the various sensors (e.g., data can be transmitted to a cloud service for processing and then the processing results can be transmitted back to the vehicle perception and planning system 220).

With reference still to FIG. 2, in some embodiments, sensors onboard other vehicle(s) 250 are used to provide additional sensor data separately or together with LiDAR system(s) 210. For example, two or more nearby vehicles may have their own respective LiDAR sensor(s), camera(s), radar sensor(s), ultrasonic sensor(s), etc. Nearby vehicles can communicate and share sensor data with one another. Communications between vehicles are also referred to as V2V (vehicle to vehicle) communications. For example, as shown in FIG. 2, sensor data generated by other vehicle(s) 250 can be communicated to vehicle perception and planning system 220 and/or vehicle onboard LiDAR system(s) 210, via communication path 253 and/or communication path 251, respectively. Communication paths 253 and 251 can be any wired or wireless communication links that can transfer data.

Sharing sensor data facilitates a better perception of the environment external to the vehicles. For instance, a first vehicle may not sense a pedestrian that is a behind a second vehicle but is approaching the first vehicle. The second vehicle may share the sensor data related to this pedestrian with the first vehicle such that the first vehicle can have additional reaction time to avoid collision with the pedestrian. In some embodiments, similar to data generated by sensor(s) 230, data generated by sensors onboard other vehicle(s) 250 may be correlated or fused with sensor data generated by LiDAR system(s) 210, thereby at least partially offloading the sensor fusion process performed by vehicle perception and planning system 220.

In some embodiments, intelligent infrastructure system(s) 240 are used to provide sensor data separately or together with LiDAR system(s) 210. Certain infrastructures may be configured to communicate with a vehicle to convey information and vice versa. Communications between a vehicle and infrastructures are generally referred to as V2I (vehicle to infrastructure) communications. For example, intelligent infrastructure system(s) 240 may include an intelligent traffic light that can convey its status to an approaching vehicle in a message such as "changing to yellow in 5 seconds." Intelligent infrastructure system(s) 240 may also include its own LiDAR system mounted near an intersection such that it can convey traffic monitoring information to a vehicle. For example, a left-turning vehicle at an intersection may not have sufficient sensing capabilities because some of its own sensors may be blocked by traffics in the opposite direction. In such a situation, sensors of intelligent infrastructure system(s) 240 can provide useful, and sometimes vital, data to the left-turning vehicle. Such data may include, for example, traffic conditions, information of objects in the direction the vehicle is turning to, traffic light status and predictions, or the like. These sensor data generated by intelligent infrastructure system(s) 240 can be provided to vehicle perception and planning system 220 and/or vehicle onboard LiDAR system(s) 210, via communication paths 243 and/or 241, respectively. Communication paths 243 and/or 241 can include any wired or wireless communication links that can transfer data. For example, sensor data from intelligent infrastructure system(s) 240 may be transmitted to LiDAR system(s) 210 and correlated or fused with sensor data generated by LiDAR system(s) 210, thereby at least partially offloading the sensor fusion process performed by vehicle perception and planning system 220. V2V and V2I communications described above are examples of vehicle-to-X (V2X) communications, where the "X" represents any other devices, systems, sensors, infrastructure, or the like that can share data with a vehicle.

With reference still to FIG. 2, via various communication paths, vehicle perception and planning system 220 receives sensor data from one or more of LiDAR system(s) 210, other vehicle onboard sensor(s) 230, other vehicle(s) 250, and/or intelligent infrastructure system(s) 240. In some embodiments, different types of sensor data are correlated and/or integrated by a sensor fusion sub-system 222. For example, sensor fusion sub-system 222 can generate a 360-degree model using multiple images or videos captured by multiple cameras disposed at different positions of the vehicle. Sensor fusion sub-system 222 obtains sensor data from different types of sensors and uses the combined data to perceive the environment more accurately. For example, a vehicle onboard camera 232 may not capture a clear image because it is facing the sun or a light source (e.g., another vehicle's headlight during nighttime) directly. A LiDAR system 210 may not be affected as much and therefore sensor fusion sub-system 222 can combine sensor data provided by both camera 232 and LiDAR system 210, and use the sensor data provided by LiDAR system 210 to compensate the unclear image captured by camera 232. As another example, in a rainy or foggy weather, a radar sensor 234 may work better than a camera 232 or a LiDAR system 210. Accordingly, sensor fusion sub-system 222 may use sensor data provided by the radar sensor 234 to compensate the sensor data provided by camera 232 or LiDAR system 210.

In other examples, sensor data generated by other vehicle onboard sensor(s) 230 may have a lower resolution (e.g., radar sensor data) and thus may need to be correlated and confirmed by LiDAR system(s) 210, which usually has a higher resolution. For example, a sewage cover (also referred to as a manhole cover) may be detected by radar sensor 234 as an object towards which a vehicle is approaching. Due to the low-resolution nature of radar sensor 234, vehicle perception and planning system 220 may not be able to determine whether the object is an obstacle that the vehicle needs to avoid. High-resolution sensor data generated by LiDAR system(s) 210 thus can be used to correlated and confirm that the object is a sewage cover and causes no harm to the vehicle.

Vehicle perception and planning system 220 further comprises an object classifier 223. Using raw sensor data and/or correlated/fused data provided by sensor fusion sub-system 222, object classifier 223 can detect and classify the objects and estimate the positions of the objects. In some embodiments, object classifier 233 can use machine-learning based techniques to detect and classify objects. Examples of the machine-learning based techniques include utilizing algorithms such as region-based convolutional neural networks (R-CNN), Fast R-CNN, Faster R-CNN, histogram of oriented gradients (HOG), region-based fully convolutional network (R-FCN), single shot detector (SSD), spatial pyramid pooling (SPP-net), and/or You Only Look Once (Yolo).

Vehicle perception and planning system 220 further comprises a road detection sub-system 224. Road detection sub-system 224 localizes the road and identifies objects and/or markings on the road. For example, based on raw or fused sensor data provided by radar sensor(s) 234, camera(s) 232, and/or LiDAR system(s) 210, road detection sub-system 224 can build a 3D model of the road based on machine-learning techniques (e.g., pattern recognition algorithms for identifying lanes). Using the 3D model of the road, road detection sub-system 224 can identify objects (e.g., obstacles or debris on the road) and/or markings on the road (e.g., lane lines, turning marks, crosswalk marks, or the like).

Vehicle perception and planning system 220 further comprises a localization and vehicle posture sub-system 225. Based on raw or fused sensor data, localization and vehicle posture sub-system 225 can determine position of the vehicle and the vehicle's posture. For example, using sensor data from LiDAR system(s) 210, camera(s) 232, and/or GPS data, localization and vehicle posture sub-system 225 can determine an accurate position of the vehicle on the road and the vehicle's six degrees of freedom (e.g., whether the vehicle is moving forward or backward, up or down, and left or right). In some embodiments, high-definition (HD) maps are used for vehicle localization. HD maps can provide highly detailed, three-dimensional, computerized maps that pinpoint a vehicle's location. For instance, using the HD maps, localization and vehicle posture sub-system 225 can determine precisely the vehicle's current position (e.g., which lane of the road the vehicle is currently in, how close it is to a curb or a sidewalk) and predict vehicle's future positions.

Vehicle perception and planning system 220 further comprises obstacle predictor 226. Objects identified by object classifier 223 can be stationary (e.g., a light pole, a road sign) or dynamic (e.g., a moving pedestrian, bicycle, another car). For moving objects, predicting their moving path or future positions can be important to avoid collision. Obstacle predictor 226 can predict an obstacle trajectory and/or warn the driver or the vehicle planning sub-system 228 about a potential collision. For example, if there is a high likelihood that the obstacle's trajectory intersects with the vehicle's current moving path, obstacle predictor 226 can generate such a warning. Obstacle predictor 226 can use a variety of techniques for making such a prediction. Such techniques include, for example, constant velocity or acceleration models, constant turn rate and velocity/acceleration models, Kalman Filter and Extended Kalman Filter based models, recurrent neural network (RNN) based models, long short-term memory (LSTM) neural network based models, encoder-decoder RNN models, or the like.

With reference still to FIG. 2, in some embodiments, vehicle perception and planning system 220 further comprises vehicle planning sub-system 228. Vehicle planning sub-system 228 can include a route planner, a driving behaviors planner, and a motion planner. The route planner can plan the route of a vehicle based on the vehicle's current location data, target location data, traffic information, etc. The driving behavior planner adjusts the timing and planned movement based on how other objects might move, using the obstacle prediction results provided by obstacle predictor 226. The motion planner determines the specific operations the vehicle needs to follow. The planning results are then communicated to vehicle control system 280 via vehicle interface 270. The communication can be performed through communication paths 223 and 271, which include any wired or wireless communication links that can transfer data.

Vehicle control system 280 controls the vehicle's steering mechanism, throttle, brake, etc., to operate the vehicle according to the planned route and movement. Vehicle perception and planning system 220 may further comprise a user interface 260, which provides a user (e.g., a driver) access to vehicle control system 280 to, for example, override or take over control of the vehicle when necessary. User interface 260 can communicate with vehicle perception and planning system 220, for example, to obtain and display raw or fused sensor data, identified objects, vehicle's location/posture, etc. These displayed data can help a user to better operate the vehicle. User interface 260 can communicate with vehicle perception and planning system 220 and/or vehicle control system 280 via communication paths 221 and 261 respectively, which include any wired or wireless communication links that can transfer data. It is understood that the various systems, sensors, communication links, and interfaces in FIG. 2 can be configured in any desired manner and not limited to the configuration shown in FIG. 2.

Figure 3:
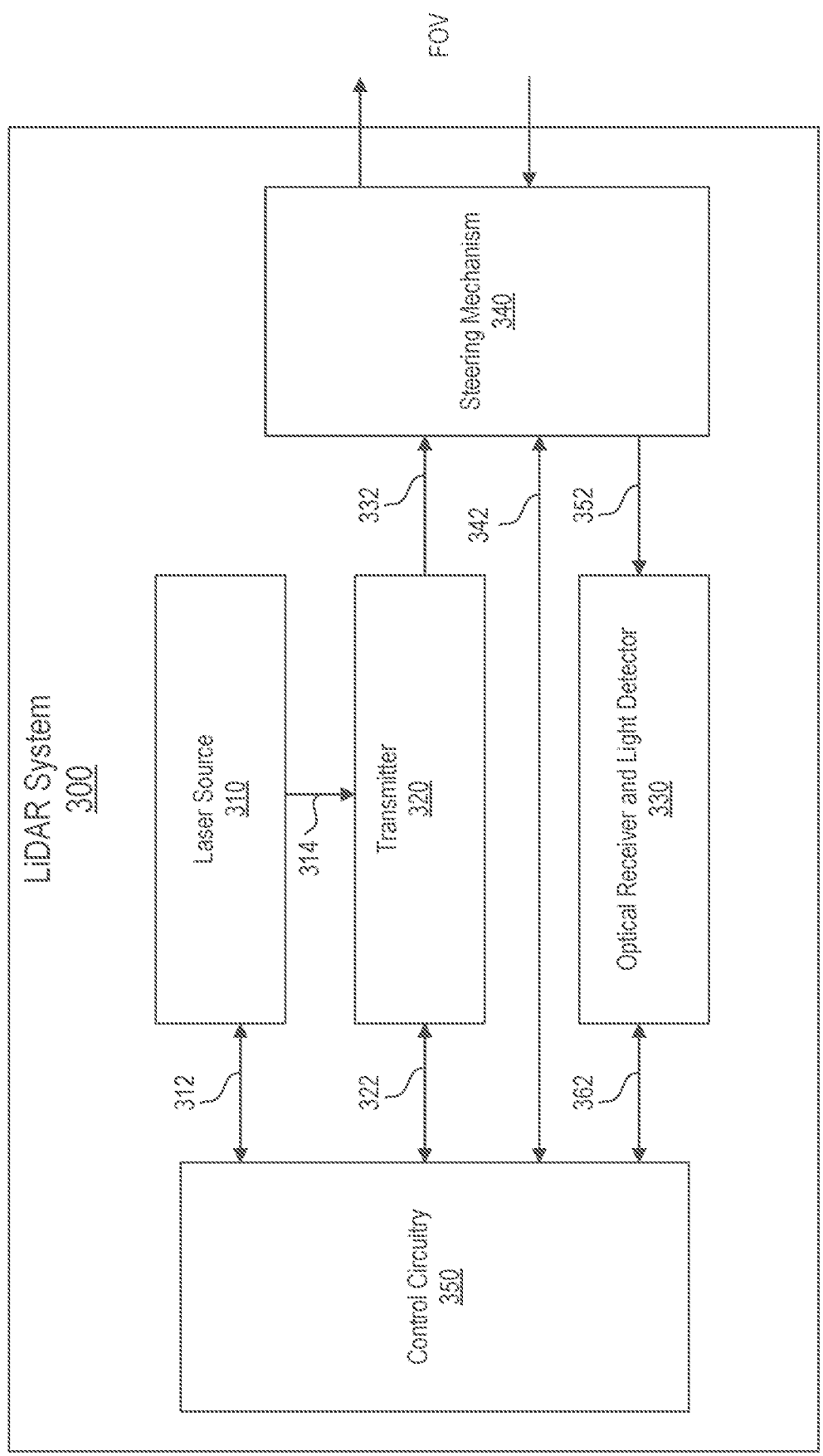
FIG. 3 is a block diagram illustrating an exemplary LiDAR system.

FIG. 3 is a block diagram illustrating an exemplary LiDAR system 300. LiDAR system 300 can be used to implement LiDAR system 110, 120A-F, and/or 210 shown in FIGS. 1 and 2. In one embodiment, LiDAR system 300 comprises a laser source 310, a transmitter 320, an optical receiver and light detector 330, a steering system 340, and a control circuitry 350. These components are coupled together using communications paths 312, 314, 322, 332, 343, 352, and 362. These communications paths include communication links (wired or wireless, bidirectional or unidirectional) among the various LiDAR system components, but need not be physical components themselves. While the communications paths can be implemented by one or more electrical wires, buses, or optical fibers, the communication paths can also be wireless channels or free-space optical paths so that no physical communication medium is present. For example, in one embodiment of LiDAR system 300, communication path 314 between laser source 310 and transmitter 320 may be implemented using one or more optical fibers. Communication paths 332 and 352 may represent optical paths implemented using free space optical components and/or optical fibers. And communication paths 312, 322, 342, and 362 may be implemented using one or more electrical wires that carry electrical signals. The communications paths can also include one or more of the above types of communication mediums (e.g., they can include an optical fiber and a free-space optical component, or include one or more optical fibers and one or more electrical wires).

LiDAR system 300 can also include other components not depicted in FIG. 3, such as power buses, power supplies, LED indicators, switches, etc. Additionally, other communication connections among components may be present, such as a direct connection between light source 310 and optical receiver and light detector 330 to provide a reference signal so that the time from when a light pulse is transmitted until a return light pulse is detected can be accurately measured.

Laser source 310 outputs laser light for illuminating objects in a field of view (FOV). Laser source 310 can be, for example, a semiconductor-based laser (e.g., a diode laser) and/or a fiber-based laser. A semiconductor-based laser can be, for example, an edge emitting laser (EEL), a vertical cavity surface emitting laser (VCSEL), or the like. A fiber-based laser is a laser in which the active gain medium is an optical fiber doped with rare-earth elements such as erbium, ytterbium, neodymium, dysprosium, praseodymium, thulium and/or holmium. In some embodiments, a fiber laser is based on double-clad fibers, in which the gain medium forms the core of the fiber surrounded by two layers of cladding. The double-clad fiber allows the core to be pumped with a high-power beam, thereby enabling the laser source to be a high power fiber laser source.

In some embodiments, laser source 310 comprises a master oscillator (also referred to as a seed laser) and power amplifier (MOPA). The power amplifier amplifies the output power of the seed laser. The power amplifier can be a fiber amplifier, a bulk amplifier, or a semiconductor optical amplifier. The seed laser can be a diode laser (e.g., a Fabry-Perot cavity laser, a distributed feedback laser), a solid-state bulk laser, or a tunable external-cavity diode laser. In some embodiments, laser source 310 can be an optically pumped microchip laser. Microchip lasers are alignment-free monolithic solid-state lasers where the laser crystal is directly contacted with the end mirrors of the laser resonator. A microchip laser is typically pumped with a laser diode (directly or using a fiber) to obtain the desired output power. A microchip laser can be based on neodymium-doped yttrium aluminum garnet ($Y_3Al_5O_{12}$) laser crystals (i.e., Nd:YAG), or neodymium-doped vanadate (i.e., ND:$YVO_4$) laser crystals.

Figure 4:
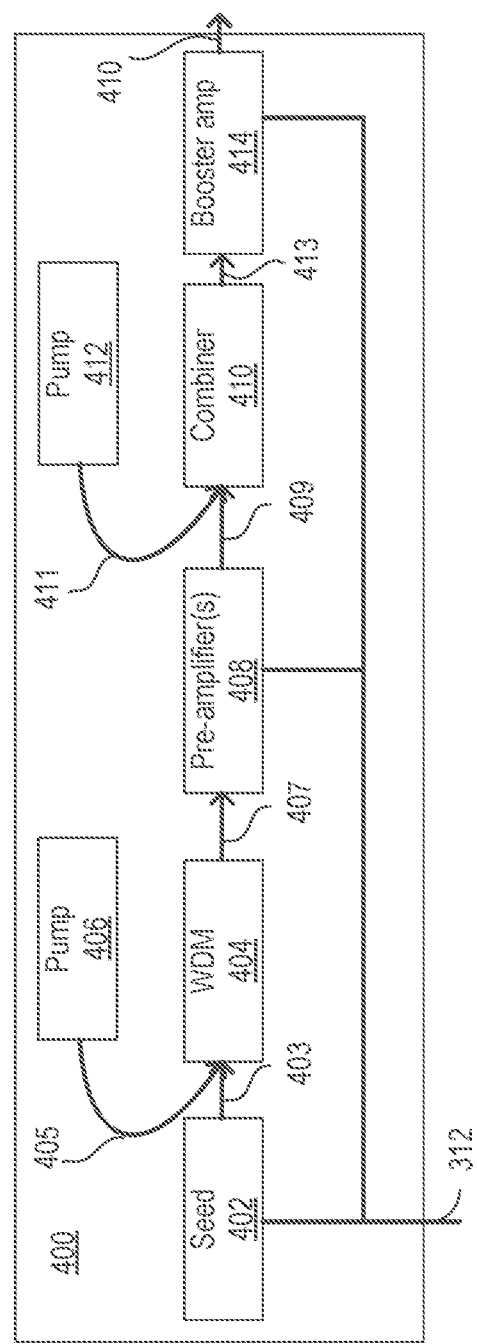
FIG. 4 is a block diagram illustrating an exemplary fiber-based laser source.

FIG. 4 is a block diagram illustrating an exemplary fiber-based laser source 400 having a seed laser and one or more pumps (e.g., laser diodes) for pumping desired output power. Fiber-based laser source 400 is an example of laser source 310 depicted in FIG. 3. In some embodiments, fiber-based laser source 400 comprises a seed laser 402 to generate initial light pulses of one or more wavelengths (e.g., 1550 nm), which are provided to a wavelength-division multiplexor (WDM) 404 via an optical fiber 403. Fiber-based laser source 400 further comprises a pump 406 for providing laser power (e.g., of a different wavelength, such as 980 nm) to WDM 404 via an optical fiber 405. WDM 404 multiplexes the light pulses provided by seed laser 402 and the laser power provided by pump 406 onto a single optical fiber 407. The output of WDM 404 can then be provided to one or more pre-amplifier(s) 408 via optical fiber 407. Pre-amplifier(s) 408 can be optical amplifier(s) that amplify optical signals (e.g., with about 20-30 dB gain). In some embodiments, pre-amplifier(s) 408 are low noise amplifiers. Pre-amplifier(s) 408 output to a combiner 410 via an optical fiber 409. Combiner 410 combines the output laser light of pre-amplifier(s) 408 with the laser power provided by pump 412 via an optical fiber 411. Combiner 410 can combine optical signals having the same wavelength or different wavelengths. One example of a combiner is a WDM. Combiner 410 provides pulses to a booster amplifier 414, which produces output light pulses via optical fiber 410. The booster amplifier 414 provides further amplification of the optical signals. The outputted light pulses can then be transmitted to transmitter 320 and/or steering mechanism 340 (shown in FIG. 3). It is understood that FIG. 4 illustrates one exemplary configuration of fiber-based laser source 400. Laser source 400 can have many other configurations using different combinations of one or more components shown in FIG. 4 and/or other components not shown in FIG. 4 (e.g., other components such as power supplies, lens, filters, splitters, combiners, etc.).

In some variations, fiber-based laser source 400 can be controlled (e.g., by control circuitry 350) to produce pulses of different amplitudes based on the fiber gain profile of the fiber used in fiber-based laser source 400. Communication path 312 couples fiber-based laser source 400 to control circuitry 350 (shown in FIG. 3) so that components of fiber-based laser source 400 can be controlled by or otherwise communicate with control circuitry 350. Alternatively, fiber-based laser source 400 may include its own dedicated controller. Instead of control circuitry 350 communicating directly with components of fiber-based laser source 400, a dedicated controller of fiber-based laser source 400 communicates with control circuitry 350 and controls and/or communicates with the components of fiber-based light source 400. Fiber-based light source 400 can also include other components not shown, such as one or more power connectors, power supplies, and/or power lines.

Referencing FIG. 3, typical operating wavelengths of laser source 310 comprise, for example, about 850 nm, about 905 nm, about 940 nm, about 1064 nm, and about 1550 nm. The upper limit of maximum usable laser power is set by the U.S. FDA (U.S. Food and Drug Administration) regulations. The optical power limit at 1550 nm wavelength is much higher than those of the other aforementioned wavelengths. Further, at 1550 nm, the optical power loss in a fiber is low. There characteristics of the 1550 nm wavelength make it more beneficial for long-range LiDAR applications. The amount of optical power output from laser source 310 can be characterized by its peak power, average power, and the pulse energy. The peak power is the ratio of pulse energy to the width of the pulse (e.g., full width at half maximum or FWHM). Thus, a smaller pulse width can provide a larger peak power for a fixed amount of pulse energy. A pulse width can be in the range of nanosecond or picosecond. The average power is the product of the energy of the pulse and the pulse repetition rate (PRR). As described in more detail below, the PRR represents the frequency of the pulsed laser light. The PRR typically corresponds to the maximum range that a LiDAR system can measure. Laser source 310 can be configured to produce pulses at high PRR to meet the desired number of data points in a point cloud generated by the LiDAR system. Laser source 310 can also be configured to produce pulses at medium or low PRR to meet the desired maximum detection distance. Wall plug efficiency (WPE) is another factor to evaluate the total power consumption, which may be a key indicator in evaluating the laser efficiency. For example, as shown in FIG. 1, multiple LiDAR systems may be attached to a vehicle, which may be an electrical-powered vehicle or a vehicle otherwise having limited fuel or battery power supply. Therefore, high WPE and intelligent ways to use laser power are often among the important considerations when selecting and configuring laser source 310 and/or designing laser delivery systems for vehicle-mounted LiDAR applications.

It is understood that the above descriptions provide non-limiting examples of a laser source 310. Laser source 310 can be configured to include many other types of light sources (e.g., laser diodes, short-cavity fiber lasers, solid-state lasers, and/or tunable external cavity diode lasers) that are configured to generate one or more light signals at various wavelengths. In some examples, light source 310 comprises amplifiers (e.g., pre-amplifiers and/or booster amplifiers), which can be a doped optical fiber amplifier, a solid-state bulk amplifier, and/or a semiconductor optical amplifier. The amplifiers are configured to receive and amplify light signals with desired gains.

With reference back to FIG. 3, LiDAR system 300 further comprises a transmitter 320. Laser source 310 provides laser light (e.g., in the form of a laser beam) to transmitter 320. The laser light provided by laser source 310 can be amplified laser light with a predetermined or controlled wavelength, pulse repetition rate, and/or power level. Transmitter 320 receives the laser light from laser source 310 and transmits the laser light to steering mechanism 340 with low divergence. In some embodiments, transmitter 320 can include, for example, optical components (e.g., lens, fibers, mirrors, etc.) for transmitting laser beams to a field-of-view (FOV) directly or via steering mechanism 340. While FIG. 3 illustrates transmitter 320 and steering mechanism 340 as separate components, they may be combined or integrated as one system in some embodiments. Steering mechanism 340 is described in more detail below.

Laser beams provided by laser source 310 may diverge as they travel to transmitter 320. Therefore, transmitter 320 often comprises a collimating lens configured to collect the diverging laser beams and produce more parallel optical beams with reduced or minimum divergence. The collimated optical beams can then be further directed through various optics such as mirrors and lens. A collimating lens may be, for example, a single plano-convex lens or a lens group. The collimating lens can be configured to achieve any desired properties such as the beam diameter, divergence, numerical aperture, focal length, or the like. A beam propagation ratio or beam quality factor (also referred to as the $M^2$ factor) is used for measurement of laser beam quality. In many LiDAR applications, it is important to have good laser beam quality in the generated transmitting laser beam. The $M^2$ factor represents a degree of variation of a beam from an ideal Gaussian beam. Thus, the $M^2$ factor reflects how well a collimated laser beam can be focused on a small spot, or how well a divergent laser beam can be collimated. Therefore, laser source 310 and/or transmitter 320 can be configured to meet, for example, a scan resolution requirement while maintaining the desired $M^2$ factor.

One or more of the light beams provided by transmitter 320 are scanned by steering mechanism 340 to a FOV. Steering mechanism 340 scans light beams in multiple dimensions (e.g., in both the horizontal and vertical dimension) to facilitate LiDAR system 300 to map the environment by generating a 3D point cloud. Steering mechanism 340 will be described in more detail below. The laser light scanned to an FOV may be scattered or reflected by an object in the FOV. At least a portion of the scattered or reflected light returns to LiDAR system 300. FIG. 3 further illustrates an optical receiver and light detector 330 configured to receive the return light. Optical receiver and light detector 330 comprises an optical receiver that is configured to collect the return light from the FOV. The optical receiver can include optics (e.g., lens, fibers, mirrors, etc.) for receiving, redirecting, focus, amplifying, and/or filtering return light from the FOV. For example, the optical receiver often includes a collection lens (e.g., a single plano-convex lens or a lens group) to collect and/or focus the collected return light onto a light detector.

A light detector detects the return light focused by the optical receiver and generates current and/or voltage signals proportional to the incident intensity of the return light. Based on such current and/or voltage signals, the depth information of the object in the FOV can be derived. One exemplary method for deriving such depth information is based on the direct TOF (time of flight), which is described in more detail below. A light detector may be characterized by its detection sensitivity, quantum efficiency, detector bandwidth, linearity, signal to noise ratio (SNR), overload resistance, interference immunity, etc. Based on the applications, the light detector can be configured or customized to have any desired characteristics. For example, optical receiver and light detector 330 can be configured such that the light detector has a large dynamic range while having a good linearity. The light detector linearity indicates the detector's capability of maintaining linear relationship between input optical signal power and the detector's output. A detector having good linearity can maintain a linear relationship over a large dynamic input optical signal range.

To achieve desired detector characteristics, configurations or customizations can be made to the light detector's structure and/or the detector's material system. Various detector structure can be used for a light detector. For example, a light detector structure can be a PIN based structure, which has a undoped intrinsic semiconductor region (i.e., an "i" region) between a p-type semiconductor and an n-type semiconductor region. Other light detector structures comprise, for example, a APD (avalanche photodiode) based structure, a PMT (photomultiplier tube) based structure, a SiPM (Silicon photomultiplier) based structure, a SPAD (single-photon avalanche diode) base structure, and/or quantum wires. For material systems used in a light detector, Si, InGaAs, and/or Si/Ge based materials can be used. It is understood that many other detector structures and/or material systems can be used in optical receiver and light detector 330.

A light detector (e.g., an APD based detector) may have an internal gain such that the input signal is amplified when generating an output signal. However, noise may also be amplified due to the light detector's internal gain. Common types of noise include signal shot noise, dark current shot noise, thermal noise, and amplifier noise (TIA). In some embodiments, optical receiver and light detector 330 may include a pre-amplifier that is a low noise amplifier (LNA). In some embodiments, the pre-amplifier may also include a TIA-transimpedance amplifier, which converts a current signal to a voltage signal. For a linear detector system, input equivalent noise or noise equivalent power (NEP) measures how sensitive the light detector is to weak signals. Therefore, they can be used as indicators of the overall system performance. For example, the NEP of a light detector specifies the power of the weakest signal that can be detected and therefore it in turn specifies the maximum range of a LiDAR system. It is understood that various light detector optimization techniques can be used to meet the requirement of LiDAR system 300. Such optimization techniques may include selecting different detector structures, materials, and/or implement signal processing techniques (e.g., filtering, noise reduction, amplification, or the like). For example, in addition to or instead of using direct detection of return signals (e.g., by using TOF), coherent detection can also be used for a light detector. Coherent detection allows for detecting amplitude and phase information of the received light by interfering the received light with a local oscillator. Coherent detection can improve detection sensitivity and noise immunity.

FIG. 3 further illustrates that LiDAR system 300 comprises steering mechanism 340. As described above, steering mechanism 340 directs light beams from transmitter 320 to scan an FOV in multiple dimensions. A steering mechanism is referred to as a raster mechanism or a scanning mechanism. Scanning light beams in multiple directions (e.g., in both the horizontal and vertical directions) facilitates a LiDAR system to map the environment by generating an image or a 3D point cloud. A steering mechanism can be based on mechanical scanning and/or solid-state scanning. Mechanical scanning uses rotating mirrors to steer the laser beam or physically rotate the LiDAR transmitter and receiver (collectively referred to as transceiver) to scan the laser beam. Solid-state scanning directs the laser beam to various positions through the FOV without mechanically moving any macroscopic components such as the transceiver. Solid-state scanning mechanisms include, for example, optical phased arrays based steering and flash LiDAR based steering. In some embodiments, because solid-state scanning mechanisms do not physically move macroscopic components, the steering performed by a solid-state scanning mechanism may be referred to as effective steering. A LiDAR system using solid-state scanning may also be referred to as a non-mechanical scanning or simply non-scanning LiDAR system (a flash LiDAR system is an exemplary non-scanning LiDAR system).

Steering mechanism 340 can be used with the transceiver (e.g., transmitter 320 and optical receiver and light detector 330) to scan the FOV for generating an image or a 3D point cloud. As an example, to implement steering mechanism 340, a two-dimensional mechanical scanner can be used with a single-point or several single-point transceivers. A single-point transceiver transmits a single light beam or a small number of light beams (e.g., 2-8 beams) to the steering mechanism. A two-dimensional mechanical steering mechanism comprises, for example, polygon mirror(s), oscillating mirror(s), rotating prism(s), rotating tilt mirror surface(s), or a combination thereof. In some embodiments, steering mechanism 340 may include non-mechanical steering mechanism(s) such as solid-state steering mechanism(s). For example, steering mechanism 340 can be based on tuning wavelength of the laser light combined with refraction effect, and/or based on reconfigurable grating/phase array. In some embodiments, steering mechanism 340 can use a single scanning device to achieve two-dimensional scanning or two devices combined to realize two-dimensional scanning.

As another example, to implement steering mechanism 340, a one-dimensional mechanical scanner can be used with an array or a large number of single-point transceivers. Specifically, the transceiver array can be mounted on a rotating platform to achieve 360-degree horizontal field of view. Alternatively, a static transceiver array can be combined with the one-dimensional mechanical scanner. A one-dimensional mechanical scanner comprises polygon mirror(s), oscillating mirror(s), rotating prism(s), rotating tilt mirror surface(s) for obtaining a forward-looking horizontal field of view. Steering mechanisms using mechanical scanners can provide robustness and reliability in high volume production for automotive applications.

As another example, to implement steering mechanism 340, a two-dimensional transceiver can be used to generate a scan image or a 3D point cloud directly. In some embodiments, a stitching or micro shift method can be used to improve the resolution of the scan image or the field of view being scanned. For example, using a two-dimensional transceiver, signals generated at one direction (e.g., the horizontal direction) and signals generated at the other direction (e.g., the vertical direction) may be integrated, interleaved, and/or matched to generate a higher or full resolution image or 3D point cloud representing the scanned FOV.

Some implementations of steering mechanism 340 comprise one or more optical redirection elements (e.g., mirrors or lens) that steer return light signals (e.g., by rotating, vibrating, or directing) along a receive path to direct the return light signals to optical receiver and light detector 330. The optical redirection elements that direct light signals along the transmitting and receiving paths may be the same components (e.g., shared), separate components (e.g., dedicated), and/or a combination of shared and separate components. This means that in some cases the transmitting and receiving paths are different although they may partially overlap (or in some cases, substantially overlap).

With reference still to FIG. 3, LiDAR system 300 further comprises control circuitry 350. Control circuitry 350 can be configured and/or programmed to control various parts of the LiDAR system 300 and/or to perform signal processing. In a typical system, control circuitry 350 can be configured and/or programmed to perform one or more control operations including, for example, controlling laser source 310 to obtain desired laser pulse timing, repetition rate, and power; controlling steering mechanism 340 (e.g., controlling the speed, direction, and/or other parameters) to scan the FOV and maintain pixel registration/alignment; controlling optical receiver and light detector 330 (e.g., controlling the sensitivity, noise reduction, filtering, and/or other parameters) such that it is an optimal state; and monitoring overall system health/status for functional safety.

Control circuitry 350 can also be configured and/or programmed to perform signal processing to the raw data generated by optical receiver and light detector 330 to derive distance and reflectance information, and perform data packaging and communication to vehicle perception and planning system 220 (shown in FIG. 2). For example, control circuitry 350 determines the time it takes from transmitting a light pulse until a corresponding return light pulse is received; determines when a return light pulse is not received for a transmitted light pulse; determines the direction (e.g., horizontal and/or vertical information) for a transmitted/return light pulse; determines the estimated range in a particular direction; and/or determines any other type of data relevant to LiDAR system 300.

LiDAR system 300 can be disposed in a vehicle, which may operate in many different environments including hot or cold weather, rough road conditions that may cause intense vibration, high or low humidifies, dusty areas, etc. Therefore, in some embodiments, optical and/or electronic components of LiDAR system 300 (e.g., optics in transmitter 320, optical receiver and light detector 330, and steering mechanism 340) are disposed or configured in such a manner to maintain long term mechanical and optical stability. For example, components in LiDAR system 300 may be secured and sealed such that they can operate under all conditions a vehicle may encounter. As an example, an anti-moisture coating and/or hermetic sealing may be applied to optical components of transmitter 320, optical receiver and light detector 330, and steering mechanism 340 (and other components that are susceptible to moisture). As another example, housing(s), enclosure(s), and/or window can be used in LiDAR system 300 for providing desired characteristics such as hardness, ingress protection (IP)

rating, self-cleaning capability, resistance to chemical and resistance to impact, or the like. In addition, efficient and economical methodologies for assembling LiDAR system 300 may be used to meet the LiDAR operating requirements while keeping the cost low.

It is understood by a person of ordinary skill in the art that FIG. 3 and the above descriptions are for illustrative purposes only, and a LiDAR system can include other functional units, blocks, or segments, and can include variations or combinations of these above functional units, blocks, or segments. For example, LiDAR system 300 can also include other components not depicted in FIG. 3, such as power buses, power supplies, LED indicators, switches, etc. Additionally, other connections among components may be present, such as a direct connection between light source 310 and optical receiver and light detector 330 so that light detector 330 can accurately measure the time from when light source 310 transmits a light pulse until light detector 330 detects a return light pulse.

These components shown in FIG. 3 are coupled together using communications paths 312, 314, 322, 332, 342, 352, and 362. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 314 includes one or more optical fibers; communication path 352 represents an optical path; and communication paths 312, 322, 342, and 362 are all electrical wires that carry electrical signals. The communication paths can also include more than one of the above types of communication mediums (e.g., they can include an optical fiber and an optical path, or one or more optical fibers and one or more electrical wires).

Figure 5A:
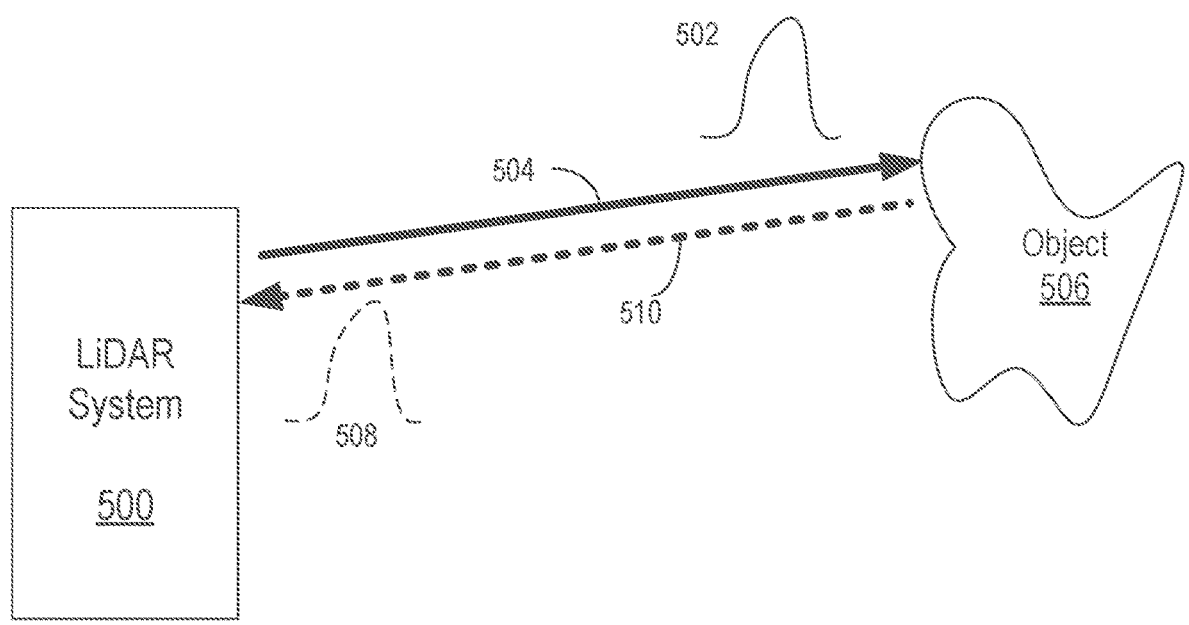
FIGS. 5A-5C illustrate an exemplary LiDAR system using pulse signals to measure distances to objects disposed in a field-of-view (FOV).

As described above, some LiDAR systems use the time-of-flight (TOF) of light signals (e.g., light pulses) to determine the distance to objects in a light path. For example, with reference to FIG. 5A, an exemplary LiDAR system 500 includes a laser light source (e.g., a fiber laser), a steering system (e.g., a system of one or more moving mirrors), and a light detector (e.g., a photon detector with one or more optics). LiDAR system 500 can be implemented using, for example, LiDAR system 300 described above. LiDAR system 500 transmits a light pulse 502 along light path 504 as determined by the steering system of LiDAR system 500. In the depicted example, light pulse 502, which is generated by the laser light source, is a short pulse of laser light. Further, the signal steering system of the LiDAR system 500 is a pulsed-signal steering system. However, it should be appreciated that LiDAR systems can operate by generating, transmitting, and detecting light signals that are not pulsed and derive ranges to an object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulsed signals also may be applicable to LiDAR systems that do not use one or both of these techniques.

Referring back to FIG. 5A (e.g., illustrating a time-of-flight LiDAR system that uses light pulses), when light pulse 502 reaches object 506, light pulse 502 scatters or reflects to generate a return light pulse 508. Return light pulse 508 may return to system 500 along light path 510. The time from when transmitted light pulse 502 leaves LiDAR system 500 to when return light pulse 508 arrives back at LiDAR system 500 can be measured (e.g., by a processor or other electronics, such as control circuitry 350, within the LiDAR system). This time-of-flight combined with the knowledge of the speed of light can be used to determine the range/distance from LiDAR system 500 to the portion of object 506 where light pulse 502 scattered or reflected.

Figure 5B:
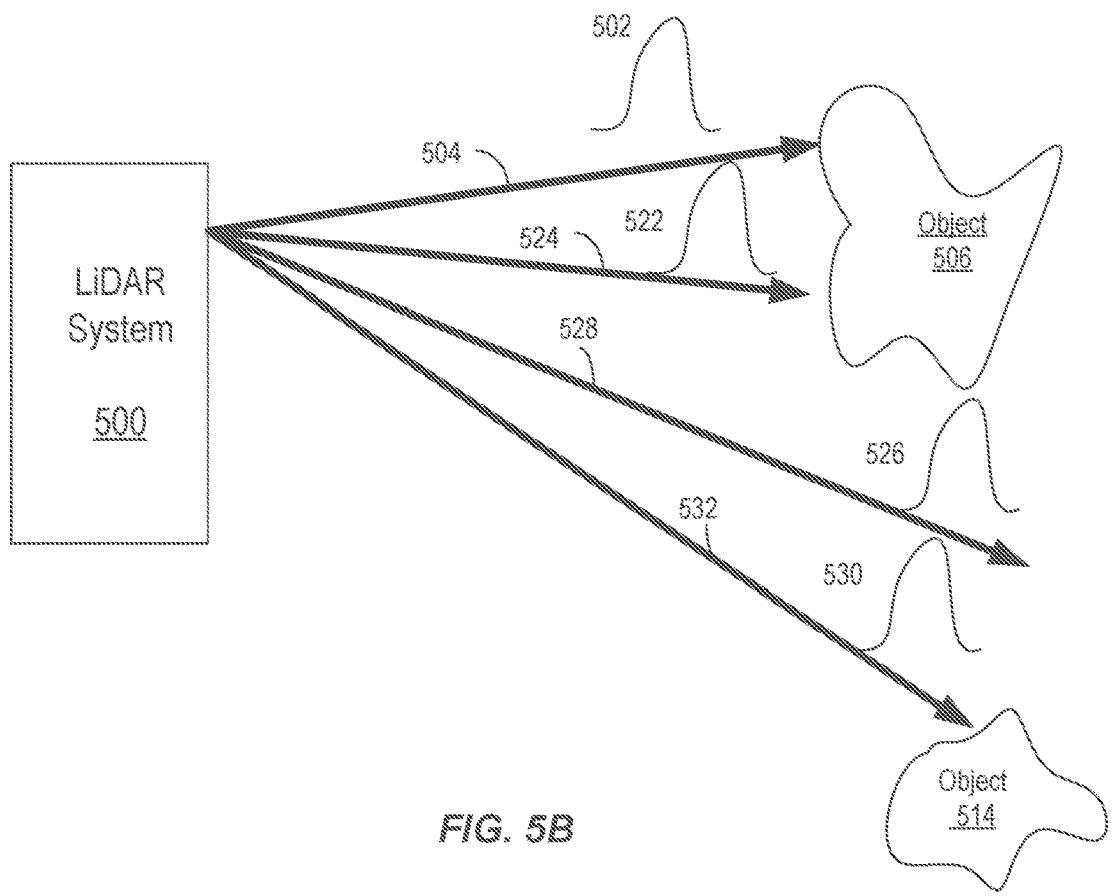
Figure 5C:
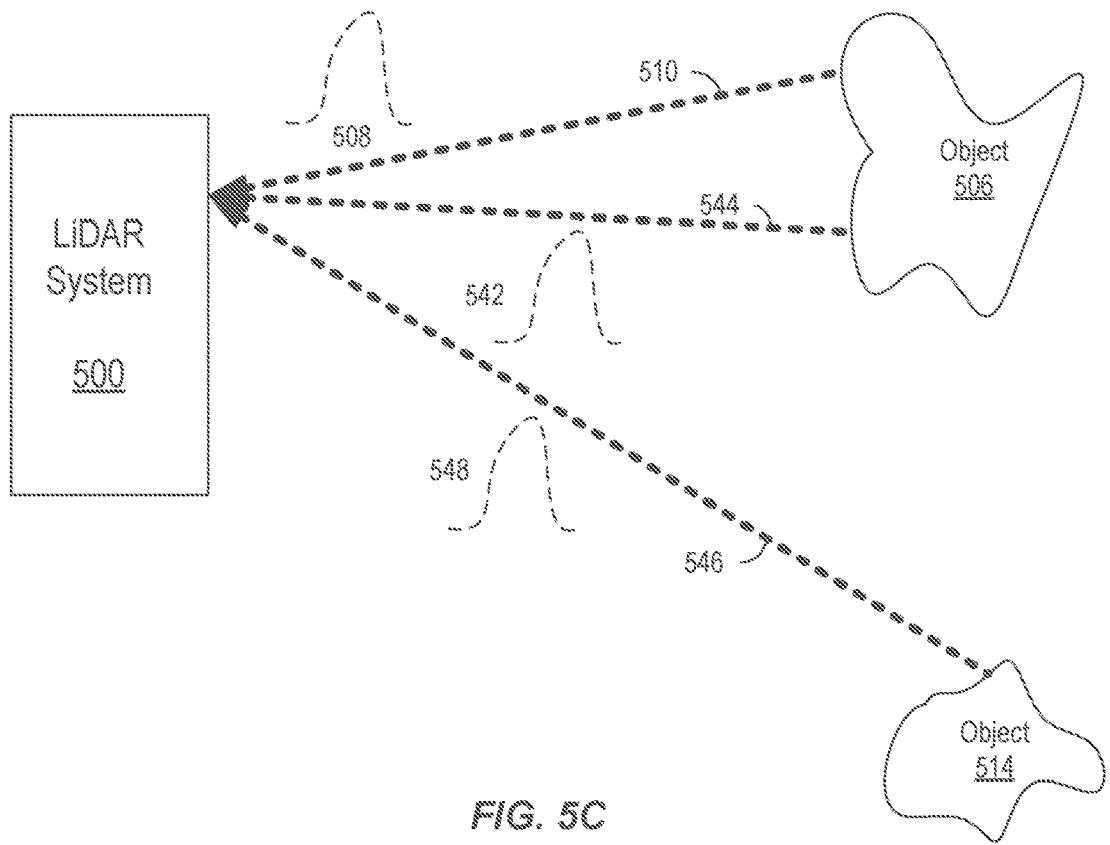

By directing many light pulses, as depicted in FIG. 5B, LiDAR system 500 scans the external environment (e.g., by directing light pulses 502, 522, 526, 530 along light paths 504, 524, 528, 532, respectively). As depicted in FIG. 5C, LiDAR system 500 receives return light pulses 508, 542, 548 (which correspond to transmitted light pulses 502, 522, 530, respectively). Return light pulses 508, 542, and 548 are generated by scattering or reflecting the transmitted light pulses by one of objects 506 and 514. Return light pulses 508, 542, and 548 may return to LiDAR system 500 along light paths 510, 544, and 546, respectively. Based on the direction of the transmitted light pulses (as determined by LiDAR system 500) as well as the calculated range from LiDAR system 500 to the portion of objects that scatter or reflect the light pulses (e.g., the portions of objects 506 and 514), the external environment within the detectable range (e.g., the field of view between path 504 and 532, inclusively) can be precisely mapped or plotted (e.g., by generating a 3D point cloud or images).

If a corresponding light pulse is not received for a particular transmitted light pulse, then it may be determined that there are no objects within a detectable range of LiDAR system 500 (e.g., an object is beyond the maximum scanning distance of LiDAR system 500). For example, in FIG. 5B, light pulse 526 may not have a corresponding return light pulse (as illustrated in FIG. 5C) because light pulse 526 may not produce a scattering event along its transmission path 528 within the predetermined detection range. LiDAR system 500, or an external system in communication with LiDAR system 500 (e.g., a cloud system or service), can interpret the lack of return light pulse as no object being disposed along light path 528 within the detectable range of LiDAR system 500.

In FIG. 5B, light pulses 502, 522, 526, and 530 can be transmitted in any order, serially, in parallel, or based on other timings with respect to each other. Additionally, while FIG. 5B depicts transmitted light pulses as being directed in one dimension or one plane (e.g., the plane of the paper), LiDAR system 500 can also direct transmitted light pulses along other dimension(s) or plane(s). For example, LiDAR system 500 can also direct transmitted light pulses in a dimension or plane that is perpendicular to the dimension or plane shown in FIG. 5B, thereby forming a 2-dimensional transmission of the light pulses. This 2-dimensional transmission of the light pulses can be point-by-point, line-by-line, all at once, or in some other manner. A point cloud or image from a 1-dimensional transmission of light pulses (e.g., a single horizontal line) can generate 2-dimensional data (e.g., (1) data from the horizontal transmission direction and (2) the range or distance to objects). Similarly, a point cloud or image from a 2-dimensional transmission of light pulses can generate 3-dimensional data (e.g., (1) data from the horizontal transmission direction, (2) data from the vertical transmission direction, and (3) the range or distance to objects). In general, a LiDAR system performing an n-dimensional transmission of light pulses generates (n+1) dimensional data. This is because the LiDAR system can measure the depth of an object or the range/distance to the object, which provides the extra dimension of data. Therefore, a 2D scanning by a LiDAR system can generate a 3D point cloud for mapping the external environment of the LiDAR system.

The density of a point cloud refers to the number of measurements (data points) per area performed by the LiDAR system. A point cloud density relates to the LiDAR scanning resolution. Typically, a larger point cloud density, and therefore a higher resolution, is desired at least for the region of interest (ROI). The density of points in a point cloud or image generated by a LiDAR system is equal to the number of pulses divided by the field of view. In some embodiments, the field of view can be fixed. Therefore, to increase the density of points generated by one set of transmission-receiving optics (or transceiver optics), the LiDAR system may need to generate a pulse more frequently. In other words, a light source with a higher pulse repetition rate (PRR) is needed. On the other hand, by generating and transmitting pulses more frequently, the farthest distance that the LiDAR system can detect may be limited. For example, if a return signal from a distant object is received after the system transmits the next pulse, the return signals may be detected in a different order than the order in which the corresponding signals are transmitted, thereby causing ambiguity if the system cannot correctly correlate the return signals with the transmitted signals.

To illustrate, consider an exemplary LiDAR system that can transmit laser pulses with a repetition rate between 500 kHz and 1 MHz. Based on the time it takes for a pulse to return to the LiDAR system and to avoid mix-up of return pulses from consecutive pulses in a conventional LiDAR design, the farthest distance the LiDAR system can detect may be 300 meters and 150 meters for 500 kHz and 1 MHz, respectively. The density of points of a LiDAR system with 500 kHz repetition rate is half of that with 1 MHz. Thus, this example demonstrates that, if the system cannot correctly correlate return signals that arrive out of order, increasing the repetition rate from 500 kHz to 1 MHz (and thus improving the density of points of the system) may reduce the detection range of the system. Various techniques are used to mitigate the tradeoff between higher PRR and limited detection range. For example, multiple wavelengths can be used for detecting objects in different ranges. Optical and/or signal processing techniques are also used to correlate between transmitted and return light signals.

Various systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Various systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers. Examples of client computers can include desktop computers, workstations, portable computers, cellular smartphones, tablets, or other types of computing devices.

Figure 11A:
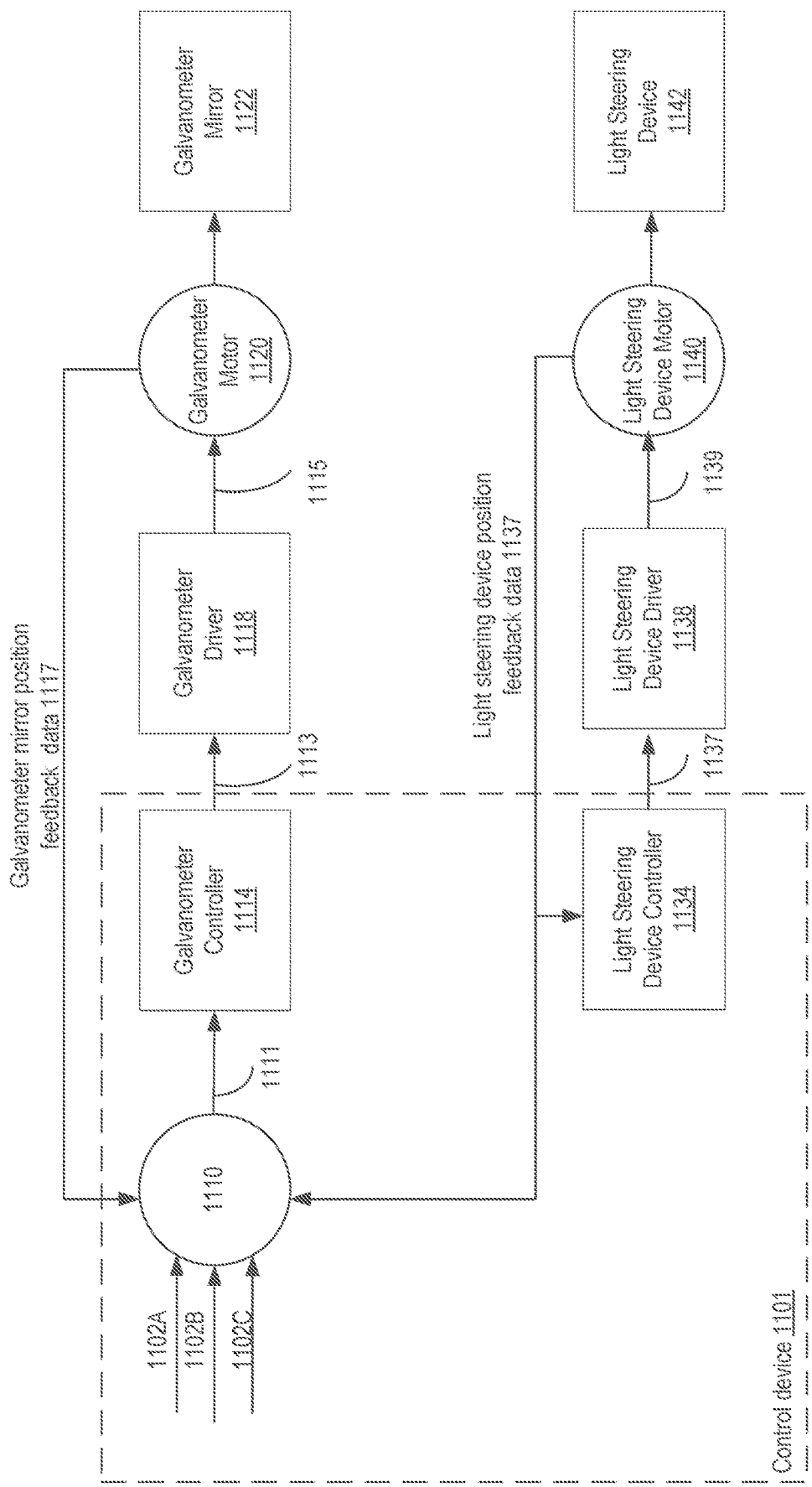
FIG. 11A is a block diagram illustrating a control device and additional components used to control the galvanometer mirror movement and to control the light steering device movement, according to some embodiments.
Figure 11B:
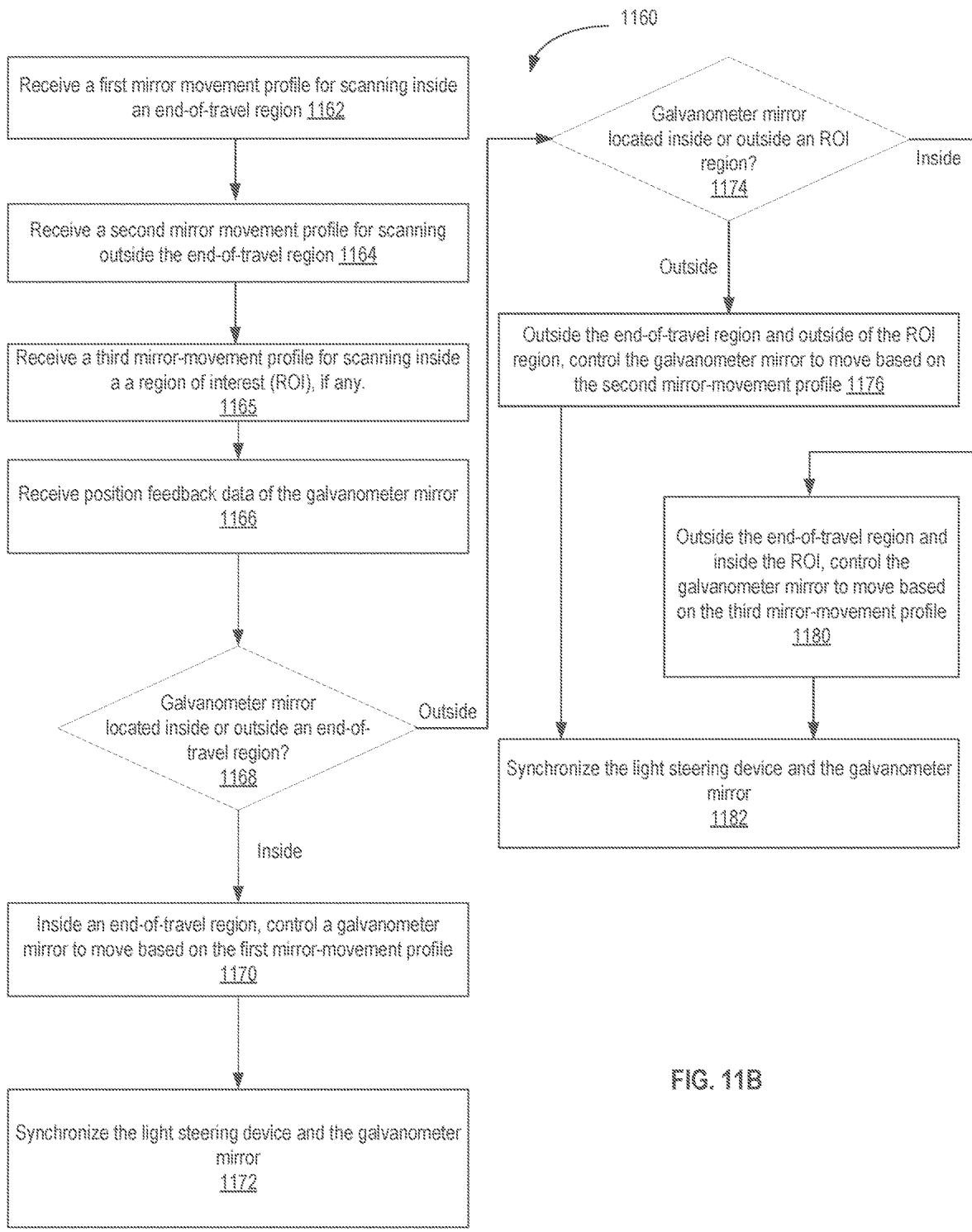
FIG. 11B is a flowchart illustrating a method for controlling a galvanometer mirror, according to some embodiments.

Various systems, apparatus, and methods described herein may be implemented using a computer program product tangibly embodied in an information carrier, e.g., in a non-transitory machine-readable storage device, for execution by a programmable processor; and the method processes and steps described herein, including one or more of the steps of FIG. 11B, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
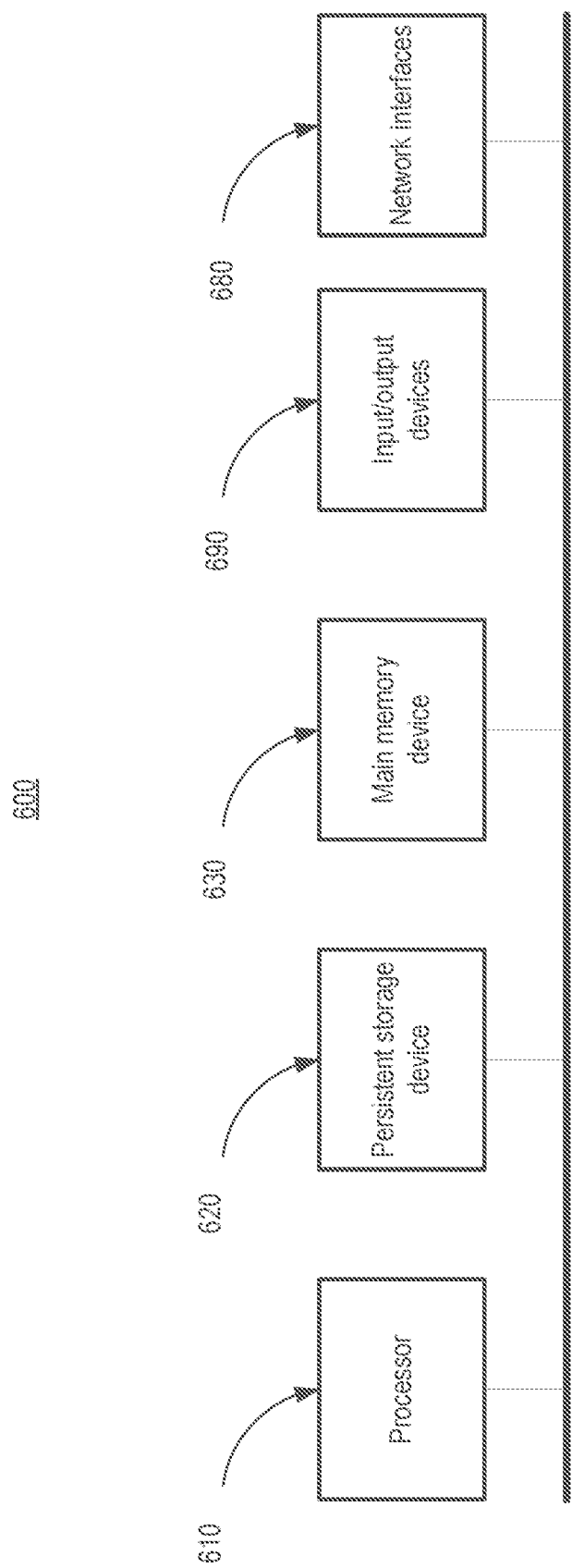
FIG. 6 is a block diagram illustrating an exemplary apparatus used to implement systems, apparatus, and methods in various embodiments.

A high-level block diagram of an exemplary apparatus that may be used to implement systems, apparatus and methods described herein is illustrated in FIG. 6. Apparatus 600 comprises a processor 610 operatively coupled to a persistent storage device 620 and a main memory device 630. Processor 610 controls the overall operation of apparatus 600 by executing computer program instructions that define such operations. The computer program instructions may be stored in persistent storage device 620, or other computer-readable medium, and loaded into main memory device 630 when execution of the computer program instructions is desired. For example, processor 610 may be used to implement one or more components and systems described herein, such as control circuitry 350 (shown in FIG. 3), vehicle perception and planning system 220 (shown in FIG. 2), and vehicle control system 280 (shown in FIG. 2). Thus, the method steps of FIG. 11B can be defined by the computer program instructions stored in main memory device 630 and/or persistent storage device 620 and controlled by processor 610 executing the computer program instructions. For example, the computer program instructions can be implemented as computer executable code programmed by one skilled in the art to perform an algorithm defined by the method steps of FIG. 11B. Accordingly, by executing the computer program instructions, the processor 610 executes an algorithm defined by the methods of FIGS. 3-5 and 11B. Apparatus 600 also includes one or more network interfaces 680 for communicating with other devices via a network. Apparatus 600 may also include one or more input/output devices 690 that enable user interaction with apparatus 600 (e.g., display, keyboard, mouse, speakers, buttons, etc.).

Processor 610 may include both general and special purpose microprocessors and may be the sole processor or one of multiple processors of apparatus 600. Processor 610 may comprise one or more central processing units (CPUs), and one or more graphics processing units (GPUs), which, for example, may work separately from and/or multi-task with one or more CPUs to accelerate processing, e.g., for various image processing applications described herein. Processor 610, persistent storage device 620, and/or main memory device 630 may include, be supplemented by, or incorporated in, one or more application-specific integrated circuits (ASICs) and/or one or more field programmable gate arrays (FPGAs).

Persistent storage device 620 and main memory device 630 each comprise a tangible non-transitory computer readable storage medium. Persistent storage device 620, and main memory device 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 690 may include peripherals, such as a printer, scanner, display screen, etc. For example, input/output devices 690 may include a display device such as a cathode ray tube (CRT), plasma or liquid crystal display (LCD) monitor for displaying information to a user, a keyboard, and a pointing device such as a mouse or a trackball by which the user can provide input to apparatus 600.

Any or all of the functions of the systems and apparatuses discussed herein may be performed by processor 610, and/or incorporated in, an apparatus or a system such as LiDAR system 300. Further, LiDAR system 300 and/or apparatus 600 may utilize one or more neural networks or other deep-learning techniques performed by processor 610 or other systems or apparatuses discussed herein.

One skilled in the art will recognize that an implementation of an actual computer or computer system may have other structures and may contain other components as well, and that FIG. 6 is a high-level representation of some of the components of such a computer for illustrative purposes.

Figure 7:
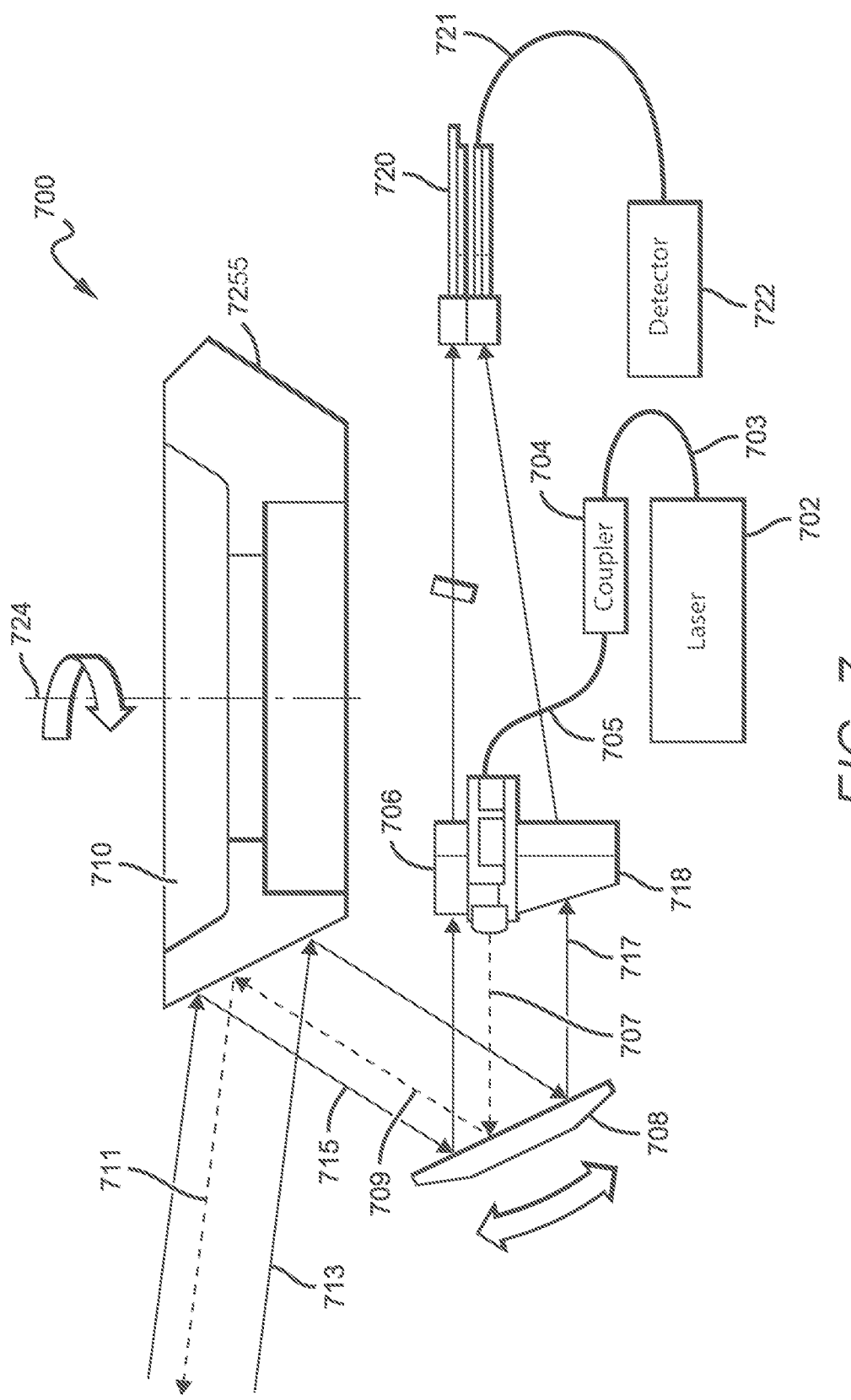
FIG. 7 illustrates a simplified LiDAR scanning system, according to some embodiments.

FIG. 7 illustrates a simplified LiDAR scanning system 700, according to some embodiments. As shown in FIG. 7, system 700 comprises a light source 702, an optical coupler 704, a transmitter 706, optical fiber-based light delivery media 703 and 705, a galvanometer mirror 708, a light steering device 710, a collection lens 718, a receiver 720, an optical fiber-based light delivery medium 721, and a light detector 722. In some embodiments, light source 702 includes a laser source that can provide one or more transmission light beams. Typical operating wavelengths of light source 702 include, for example, about 850 nm, about 905 nm, about 940 nm, about 1064 nm, and about 1550 nm. The one or more transmission light beams are directed to optical coupler 704 via optical fiber-based light delivery medium 703, which can be, for example, a single mode optical fiber. An optic coupler is an optical device capable of connecting one or more fiber ends in order to allow the transmission of light in multiple paths. The optical coupler is capable of combining two or more inputs into a single output and also dividing a single input into two or more outputs. An optical coupler is optional in some embodiments. As shown in FIG. 7, the transmission light beams can be delivered from optical coupler 704 to transmitter 706 via another optical fiber-based light delivery medium 705 (e.g., an optical fiber).

In some embodiments, transmitter 706 comprises multiple transmitter channels (e.g., 4 or more channels). The transmitter channels include multiple transmission optical fibers that can provide transmission light beams 707. The transmission optical fibers may form a transmission fiber array, in which the optical fibers of different channels are disposed at a predetermined pitch from one another. The transmission light beams 707 can be collimated laser beams formed by using a collimation lens (not shown). As shown in FIG. 7, transmission light beams 707 are directed to galvanometer mirror 708. Mirror 708 is controlled to oscillate about an axis between two predefined angular positions. The oscillation of the mirror 708 facilitates scanning light along one dimension (e.g., the vertical dimension) of a FOV. Mirror 708 reflects transmission light beams 707 to form transmission light beams 709, which are directed toward multiple-facet light steering device 710.

In some embodiments, multiple-facet light steering device 710 comprises a top surface, a bottom surface, and multiple facets 725 that reflect light. A facet 725 is also referred to as a side surface of device 710. A facet 725 is disposed between the top surface and the bottom surface of device 710. One embodiment of the multiple-facet light steering device 710 is shown in FIG. 7, where the device has a polygon-shaped top and bottom surfaces (e.g., rectangle-shaped, pentagon-shaped, hexagon-shaped, octagon-shaped, or the like) and multiple trapezoidal-shaped facets 725. Facets 725 are reflective surfaces (e.g., mirrors) and thus multiple-facet light steering device 710 can be a polygon mirror. As shown in FIG. 7, facets 725 reflect transmission light beams 709 to form transmission light beams 711, which illuminate objects in a field-of-view (FOV). Light steering device 710 is configured to rotate about an axis 724. Therefore, each facet of light steering device 710 takes turns to reflect light. In the present disclosure, oscillation means continuously moving back and forth in two opposite directions (e.g., clockwise and counterclockwise) within a predetermined angular range (e.g., +/−20 degrees, +/−40 degrees, etc.) in a periodical or non-periodical manner. Rotation means continuously moving in only one direction for at least 360 degrees.

In some embodiments, at any particular time point, multiple transmission light beams 709 are reflected by a same facet of light steering device 710 to form multiple transmission light beams 711. In some embodiments, multiple transmission light beams 709 are reflected by different facets of light steering device 710. When transmission light beams 711 travel to illuminate one or more objects in an FOV (not shown), at least a portion of transmission light beams 711 is reflected or scattered to form return light 713. Return light 713 is redirected (e.g., reflected) by light steering device 710 to form return light 715, which is directed toward galvanometer mirror 708. Return light 715 is redirected (e.g., reflected) by galvanometer mirror 708 to form return light 717, which is collected by collection lens 718. Collection lens 718 directs the collected return light to a receiver 720 of the LiDAR system 700. Receiver 720 can have multiple receiving channels corresponding to the multiple transmitter channels. Receiver 720, in one example, includes a receiving fiber array. Receiver 720 directs the received return light to a light detector 722 via an optical fiber 721 and/or free-space optical components (not shown). Thus, in some embodiments as described above, multiple-facet light steering device 710 and galvanometer mirror 708 are used for both transmitting light beams to illuminate objects in an FOV and for receiving and redirecting return light to a receiver of the LiDAR system 700.

In some embodiments, return light 713 is formed by scattering and/or reflecting multiple transmission light beams 711. Return light 713 can be reflected by a same facet of light steering device 710 at any particular time point. In some embodiments, return light 713 can be reflected by different facets of light steering device 710. Embodiments of LiDAR system 700 and its light steering device 710 shown in FIG. 7 are described in more detail in U.S. non-provisional patent application Ser. No. 16/682,774, filed on Nov. 14, 2018, entitled "LIDAR SYSTEMS THAT USE A MULTI-FACET MIRROR", the content of which is incorporated by reference in it is entirety for all purposes.

Figure 8:
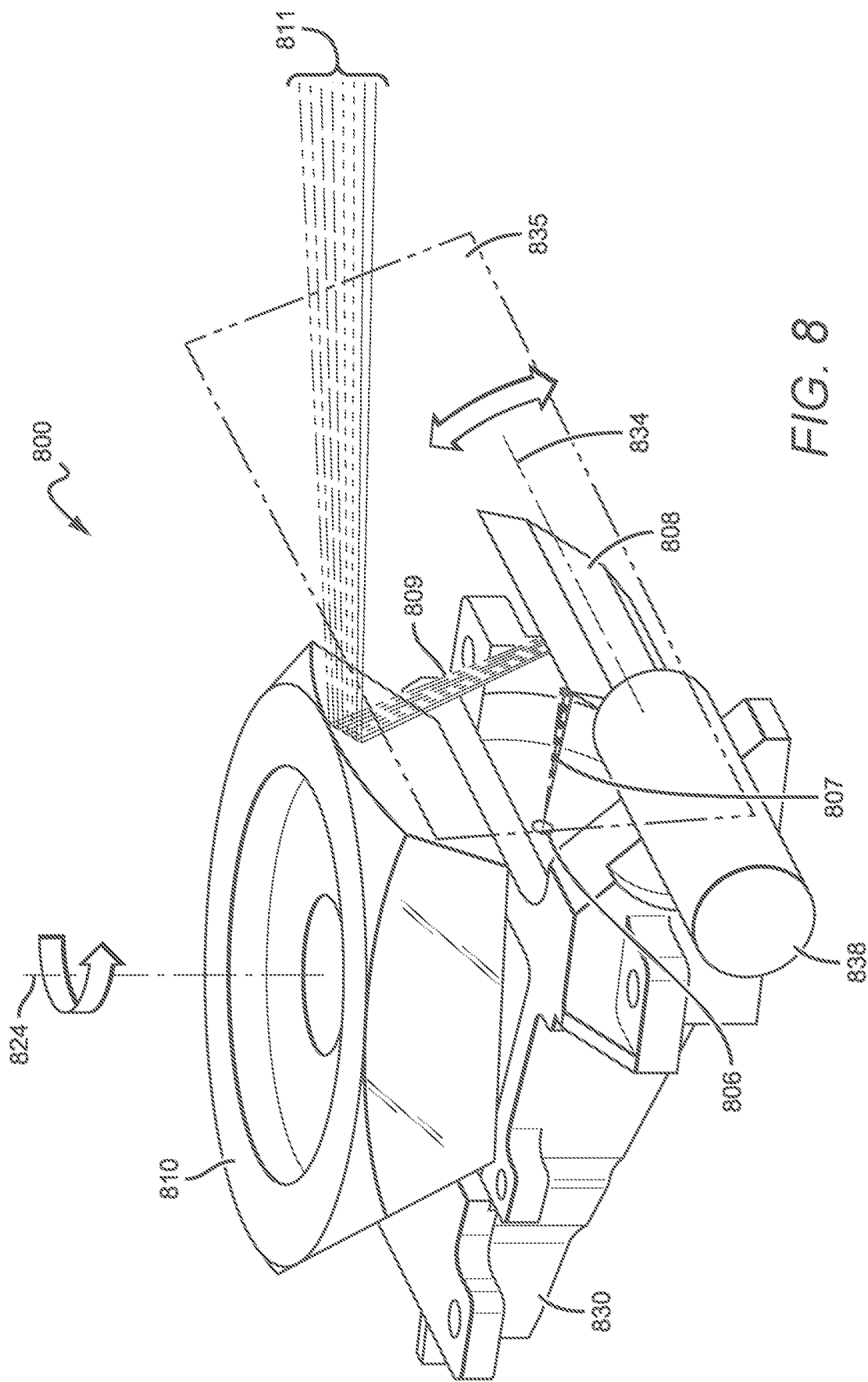
FIG. 8 is a perspective view of a simplified LiDAR scanning system, according to some embodiments.

In some embodiments, facets 725 of light steering device 710 have 90-degree or non-90 degree tile angles. A tilt angle is an angle between the normal direction of a facet and the rotational axis of the multiple-facet light steering device. Therefore, for a facet of device 710, the tilt angle is between the direction perpendicular to the facet and rotational axis 724. The tilt angle of a facet 725 can be 90 degrees or non-90 degrees. FIGS. 7 and 8 illustrate a multiple-facet light steering device 710 that includes facets having non-90 degree tilt angles. In some embodiments, light steering device 710 can rotate about axis 724. Each facet 725 of light steering device 710 has a tilt angle that is not 90-degrees, thereby forming wedged facets. Therefore, a cross-section of the light steering device 710 may have a trapezoidal shape.

FIG. 8 is a perspective view of a simplified LiDAR scanning system 800, according to some embodiments. LiDAR scanning system 800 is similar to system 700 described above. System 800 also includes a multiple-facet light steering device 810 and a galvanometer mirror 808, similar to light steering device 710 and mirror 708, respectively. A transmitter 806 provides multiple transmission light beams 807. In one example, transmitter 806 includes four or more transmitter channels providing four or more transmission light beams. Galvanometer mirror 808, driven by a motor 838, oscillates about axis 834 within two predefined angular positions. In one embodiment, axis 834 is along the longitudinal direction of mirror 808. The oscillation of mirror 808 about axis 834 thus enables the scanning of the transmission light beams 807 in one dimension (e.g., the vertical dimension) of an FOV. Galvanometer mirror 808 directs transmission light beams 807 toward light steering device 810, which is configured to rotate about an axis 824. The rotation of the light steering device 810 can thus scan the transmission light beams in another dimension (e.g., the horizontal dimension) of the FOV. With reference to FIG. 8, in one example, multiple transmission light beams 811 (e.g., four beams) are directed to scan the FOV in both the horizontal and vertical directions to provide a desired scanning coverage. The transmission light beams 811 travel through a window 835. Return light (not shown) also travels through window 835 and be directed to the receiver by using light steering device 810 and galvanometer mirror 808. In some embodiments, window 835 can also be configured to (e.g., coated) filter out light having undesired wavelengths. In some embodiments, one or more of the components of the transmitter and the receiver of the LiDAR system 800 are disposed at least partially within a transceiver housing 830.

With reference to FIGS. 7 and 8, LiDAR scanning systems 700 or 800 are configured to meet one or more LiDAR scanning requirements. For example, in some LiDAR scanning applications, a LiDAR system is configured to scan one or more regions of interest (ROIs). The requirements for scanning inside an ROI may be different from those for scanning outside of an ROI. Typically, scanning inside an ROI may be performed at a higher density or resolution and therefore, the scanlines of the resulting LiDAR scanning pattern inside the ROI may have a finer pitch. To meet the higher resolution requirement for scanning inside an ROI, the galvanometer mirror may be configured to move at a smaller angular increment or step. In one example, for scanning inside an ROI, a LiDAR system may be required to scan a distance up to 250 meter assuming the object reflection rate is about 10%, to be able to scan a horizontal FOV of about or greater than 20 degrees and a vertical FOV of about or greater than 4-5 degrees, and to have an angular resolution of about or less than 0.1 degrees inside the ROI (in both horizontal and vertical dimensions). For scanning outside an ROI, for example, a LiDAR system may be required to scan a distance up to 150 meter (assuming the object reflection rate is about 10%), to be able to scan a horizontal FOV of about or greater than 120 degrees and a vertical FOV of about or greater than 25 degrees, and to have an angular resolution of about or less than 0.25 degrees (in both horizontal and vertical dimensions). Therefore, compared to scanning outside an ROI, scanning inside an ROI typically requires the capabilities to achieve a further distance, a smaller FOV coverage, and/or a higher resolution.

In some other scanning applications, a LiDAR system is not configured to scan an ROI because, for example, there may be no ROI to be scanned. As such, a LiDAR system that is not configured to scan an ROI may have different scanning requirements than a system that is configured to scan an ROI. As one example, if there is no ROI to be scanned, the LiDAR system may be required to scan a distance of about 200 meter (assuming the object reflection rate is about 10%), to have a horizontal FOV of about or greater than 120 degrees and a vertical FOV of about or greater than 25 degrees, to have an angular resolution of about or less than 0.2 degrees (in both horizontal and vertical dimensions), and to have a distance accuracy of about or less than 5 cm.

In some embodiments, a LiDAR scanning system (e.g., systems 700 and 800) are configured to scan the FOV and generate scanlines at a frame rate about or greater than 15 frames per second. The frame rate is related to the total number of scanlines a LiDAR system generates in a second, as shown in the following equation [1].

Total number of scanlines per second=number of scanlines per frame*frame rate. [1]

For example, if the LiDAR system can generate 2400 scanlines per second and the frame rate is 10 Hz, then the number of scanlines per frame (denoted by $N_{FR}$) is 240. As another example, if the LiDAR system can generate 2400 scanlines per second and the frame rate is 15 Hz, then the number of scanlines per frame is 160. Thus, if the total number of scanlines generated by the LiDAR system remains the same, increasing the frame rate decreases the resolution in a single frame (e.g., each frame has a smaller number of scanlines). Further, if the resolution of a frame needs to be higher, then the frame rate may need to be reduced (and thus the resulting LiDAR image data is refreshed less frequently), again assuming that the total number of scanlines remains the same.

The total number of scanlines that a LiDAR system can generate in one second relates to the rotational speed of the light steering device, the number of facets of the light steering device, and the number of transmitter channels, as defined the following equation [2].

Total number of scanlines per second=rotational speed of the light steering device*the number of the facets of the light steering device*the number of transmitter channels/60 [2]

Thus, for example, if the LiDAR system (e.g., system 700 and 800) has a 5-facet polygon mirror that rotates at 7200 rounds per minute (RPM) and has 4 transmitter channels (e.g., for scanning 4 transmission light beams in parallel), the total number of scanlines per second is 2400. Typically, for an existing LiDAR system having a given number of facets and a given number of transmitter channels, increasing the rotational speed of the light steering device increases the total number of scanlines per second. But a higher rotational speed of the light steering device causes a higher energy consumption, greater acoustic noise, and reduced reliability and useful lifetime of the light steering device. Thus, it is often desirable to reduce the speed of the light steering device (e.g., a polygon mirror) while maintaining or improving the frame rate and/or the resolution per frame.

A LiDAR application may have a requirement of a minimum number of scanlines per frame that the LiDAR should provide. The minimum number of scanlines per frame can be determined based on the following equation [3].

Minimum number of scanlines per frame=Angle$_{outside\ ROI}$/Pitch$_{outside\ ROI}$+ Angle$_{inside\ ROI}$/Pitch$_{inside\ ROI}$ [3]

In equation [3], Angle$_{outside\ ROI}$ denotes the angular scanning range in the vertical dimension outside an ROI (if any). For instance, to scan a vertical dimension, the galvanometer mirror can be configured to move within an angular scanning range (e.g., 25 degrees) outside an ROI and move within another angular scanning range (e.g., 4-5 degrees) inside the ROI (if any). In equation [3], Pitch$_{outside\ ROI}$ denotes the scanline pitch when the galvanometer mirror moves outside an ROI (if any); and Pitch$_{inside\ ROI}$ denotes the scanning line pitch when the galvanometer mirror moves inside an ROI (if any). The scanline pitch generally relates to the step size when the galvanometer mirror moves. The relation between the scanline pitch and the step size of the galvanometer mirror can be modeled using a linear function, a non-linear function, or any other suitable functions/models (e.g., a machine-learning based model). In one example, inside an ROI, the scanline pitch may be about 0.2 degrees, corresponding generally to an angular movement step size of about 0.1 degrees. Outside an ROI, the relation between the scanline pitch and the step size of the angular movement of the galvanometer mirror can also be determined by taking into account of the scanline interlacing across the multiple transmitter channels. In some embodiments, the scanline pitch also indicates that within the amount of time the galvanometer mirror moves one step size (e.g., 0.2 degrees), the light steering device completes a horizontal scan. In one example, Pitch$_{outside\ ROI}$ (e.g., 0.2 degrees) is greater than Pitch$_{inside\ ROI}$ (e.g., 0.1 degrees). That is, inside an ROI, the galvanometer mirror moves at a smaller step size, thereby facilitating the LiDAR system to generate a higher number of scanlines within the ROI. Assuming for example, the total angular scanning range is 25 degrees, where Angle$_{outside\ ROI}$ is about 20 degrees, Pitch$_{outside\ ROI}$ is about 0.2 degrees, Angle$_{inside\ ROI}$ is about 5 degrees, and Pitch$_{inside\ ROI}$ is about 0.1 degrees, the minimum number of lines per frame can be calculated to be about 150.

When a LiDAR system is configured to scan an FOV to generate scanlines, redundant scanlines may result when the scan moves into and out from an ROI. For example, the galvanometer mirror oscillates to scan transmission light beams in the vertical dimension. The ROI in the vertical dimension may have an angular range of about 4-5 degrees. The angular range outside an ROI may have a vertical range of about 25 degrees. The ROI may be positioned in the middle of the galvanometer mirror's scanning range in the vertical dimension. Thus, the galvanometer mirror may start from one end position, move outside the ROI first, move into the ROI, and then move outside of the ROI again toward the other end position. As shown in more detail below, during such a process, duplicated or overlapping scanlines may result. The duplicated or overlapping scanlines are often redundant scanlines, which are unnecessary.

As described above, the galvanometer mirror (e.g., mirror 708 or 808) oscillates between two angular positions to cover a vertical scanning range (e.g., about or greater than 25 degrees). When the galvanometer mirror travels near one of the two angular positions (also referred to as the end positions or end angular positions), it typically maintains the same speed as it travels in other regions and then changes speed rapidly down to zero. It then reverses the direction of movement to oscillate back to the other end position. This manner of movement inside the end-of-travel region oftentimes results in skipped or missing scanlines (as described in more detail below). The skipped or missing scanlines may cause the data in the end-of-travel region to be less reliable and less useful. In some embodiments, these data may be unused or discarded. Thus, the scanning by the galvanometer mirror inside an end-of-travel region may be wasted.

Moreover, in some embodiments, a galvanometer mirror may be configured to operate in a flyback mode. In the flyback mode, when the galvanometer mirror moves to an end angular position, it quickly retraces back to its starting angular position to continue scanning. In other words, in the flyback mode, the galvanometer mirror facilitates scanning in one direction and not the reverse direction. During the time the galvanometer mirror retraces back to its starting angular position, no scanning is performed. The time that the galvanometer mirror retraces back to its starting position is referred as the flyback time. Data generated during the flyback time are unusable and are discarded. Therefore, the time spent by the galvanometer mirror to flyback is also wasted.

Figure 9:
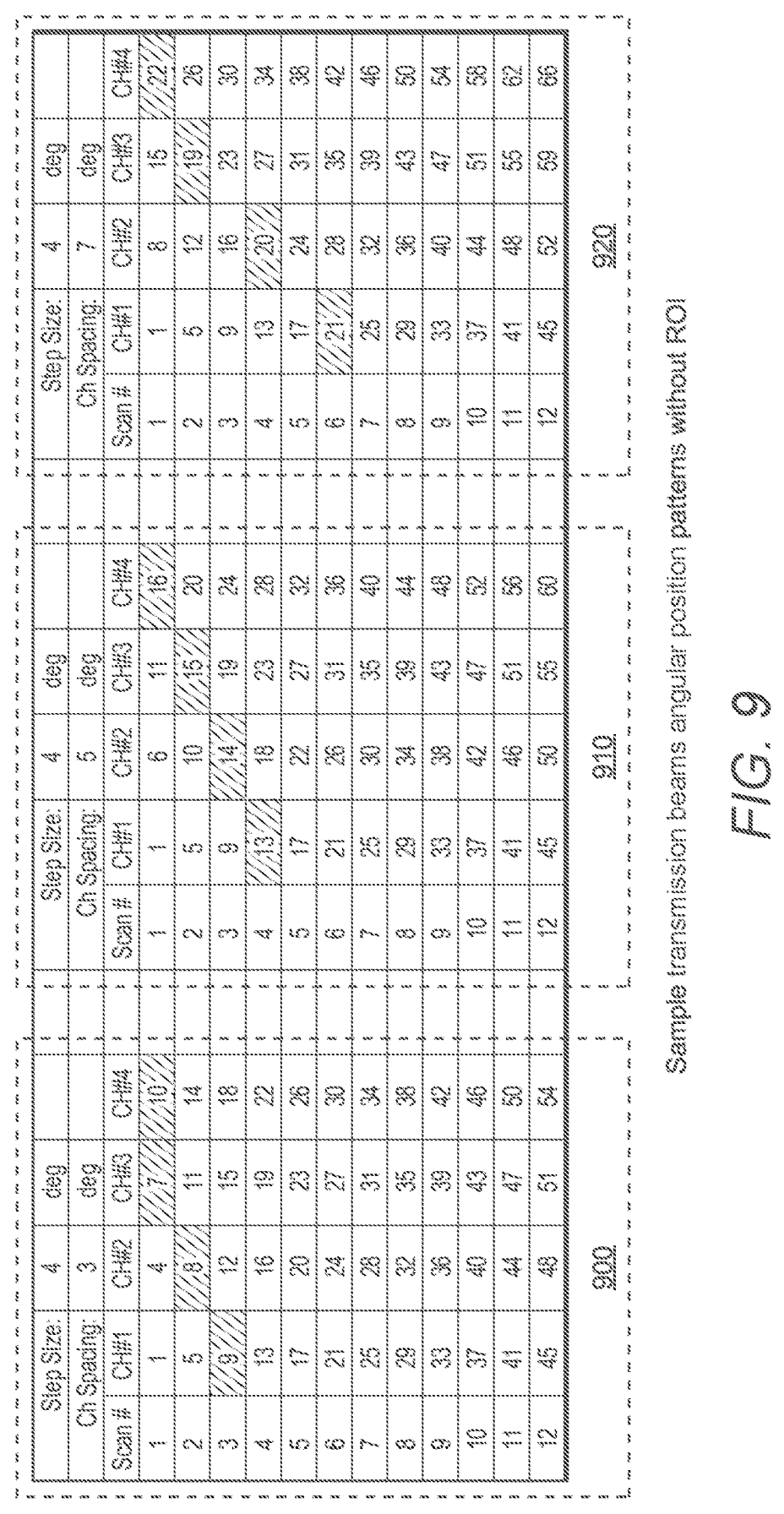

FIG. 9 illustrates sample transmission beams angular position patterns when the LiDAR system is not configured to scan an ROI. The numbers in the tables of FIG. 9 represent angular positions of a transmission beams provided by multiple transmitter channels. Each of the angular positions in the tables of FIG. 9 corresponds to a scanline at that position. FIG. 9 illustrates that skipped or missing scanlines may occur when the galvanometer mirror travels with the same speed inside and outside an end-of-travel region. As described above, a LiDAR system can be configured to have multiple transmitter channels separated from each other by an angular channel spacing. An angular channel spacing is a parameter that measures or represents the degree of angular separation between the light beams transmitted by the multiple transmitter channels to scan an FOV. When the adjacent transmitter channels are configured to have the proper angular channel spacing, the multiple transmission light beams are positioned sufficiently apart at a desired angular separation to scan different areas within an FOV, providing a good coverage of the scanned areas and improving the scan resolution and speed. Therefore, the scanning performance of the LiDAR system can be improved by using multiple transmitter channels configured with a proper angular channel spacing.

Table 900 of FIG. 9 shows one example of an angular position pattern of the transmission light beams provided by multiple transmitter channels. In this example, the transmitter channels have an angular channel spacing of 3 degrees. The pitch (e.g., the step size) of the galvanometer mirror movement is 4 degrees. As discussed above, each of the transmission beam angular positions corresponds to a particular vertical angular position of the galvanometer mirror. Thus, each transmission beam angular position shown in tables in FIG. 9 represents a scanline obtained by scanning a beam at a galvanometer mirror's vertical angular position. Thus, the step size of the galvanometer mirror movement also relates to the scanline pitch, which is the angular spacing between the two adjacent scanlines. As shown in Table 900, for the first transmitter channel (CH #1), at the starting angular position of the galvanometer mirror, the transmission beam of the first transmission channel is at the 1-degree position. A scanline at this vertical angular position is generated when the light steering device rotates to scan the transmission light beam of the first transmitter channel in the horizontal dimension. Next, the galvanometer mirror moves to its next angular position by increasing one pitch or step size (e.g., 4 degrees) from its current angular position. As a result, the transmission beam of the first transmitter channel moves to the 5-degree position. Similarly, a scanline at this vertical angular position is generated when the light steering device rotates to scan the transmission light beam of the first transmitter channel in the horizontal dimension. Next, the galvanometer mirror moves to its next angular position by increasing another step size from its current angular position. As a result, the transmission light beam of the first transmitter channel moves to the 9-degree position. A scanline at this vertical angular position is similarly generated based on the rotation of the light steering device. The galvanometer mirror moves in this manner such that the transmission light beam of the first transmitter channel is vertically positioned at 1, 5, 9, 13, 17, etc. degrees. Scanlines at these vertical angular positions are generated when the light steering device rotates to scan the transmission light beam of the first transmitter channel in the horizontal dimension.

In a multiple transmitter channels configuration, the transmission light beam of the second transmitter channel (CH #2) is angularly separated from that of the first transmitter channel (CH #1) by an angular channel spacing. In one embodiment, different transmitter channels comprise optical fibers that are placed at a predetermined pitch from one another, thereby enabling the transmission light beams from the different transmitter channels to be angularly separated. As shown in Table 900, the starting angular position of the transmission light beam of the second transmitter channel is the sum of the angular channel spacing (e.g., 3 degrees) and the starting position of transmission beam of the first transmitter channel (e.g., 1 degree). That is, the starting angular position of the transmission light beam of the second transmitter channel is at the 4-degree position. In a similar manner as described above, when the galvanometer mirror moves its angular positions one pitch at a time to enable vertical scanning, the transmission light beam of the second transmitter channel also moves such that it is vertically positioned at 4, 8, 12, 16, 20, etc. degrees. Scanlines at these vertical angular positions are generated when the light steering device rotates to scan the transmission light beam of the second transmitter channel in the horizontal dimension.

Similarly, the transmission light beam of the third transmitter channel (CH #3) is angularly separated from that of the second transmitter channel (CH #2) by an angular channel spacing (e.g., 3 degrees); and the transmission light beam of the fourth transmitter channel (CH #4) is angularly separated from that of the third transmitter channel (CH #3) by another angular channel spacing (e.g., 3 degrees). As such, the transmission light beam of the third transmitter channel moves such that it is vertically positioned at 7, 11, 15, 19, 23, etc. degrees. And the transmission light beam of the fourth transmitter channel moves such that it is vertically positioned at 10, 14, 18, 22, 26, etc. degrees. Scanlines corresponding to these vertical angular positions are generated when the light steering device rotates to scan the transmission light beams of the third and fourth transmitter channels in the horizontal dimension.

Table 900 in FIG. 9 thus show 12 angular positions (in the vertical direction) of a transmission light beam for each transmitter channel. In some embodiments, the scanning step size of the galvanometer mirror's movement is configured to be the number of transmitter channels (e.g., 4 degrees) multiplied by the target scanline pitch (e.g., 1). And the transmitter channel spacing is configured to be an odd number (e.g., 3, 5, or 7 as shown in Table 900, 910, or 920) multiplied by the target scanline pitch. Thus, the transmission light beams of the multiple transmitter channels should be positioned such that the resulting scanlines are evenly spaced with adjacent scanlines separated by a target scanline pitch. But Table 900 shows that scanline skipping (or hopping) may occur in the end-of-travel region of the galvanometer mirror. In Table 900, the scan numbers listed in the left-most column correspond to the angular positions of the galvanometer mirror. For example, the scan numbers 1-3 correspond to angular positions in the end-of-travel region. An end-of-travel region is where the galvanometer mirror begins to move away from, or approaches toward, one of its end positions. As shown in Table 900 of FIG. 9, the angular positions of a transmission light beam of a particular transmitter channel are evenly spaced (e.g., for CH #1, the angular positions are evenly spaced at 1, 5, 9, 13, 17, and so forth). Further, if there is no scanline skipping, across multiple transmitter channels, the angular positions of the transmission light beams should also be evenly distributed such that the resulting scanlines are evenly spaced by the target scanline pitch. Thus, if there is no scanline skipping, the angular positions of all transmission light beams in Table 900 should be evenly spaced at 1, 2, 3, 4, 5, 6, 7, and so forth (and so should the resulting scanlines). Table 900 shows that the angular positions of the transmission light beams are distributed evenly starting from the angular position at 7 degrees (the first angular position of the transmission light beam of the third transmitter channel). That is, starting from 7 degrees, the angular positions of the transmission light beams across all transmitter channels are evenly spaced at 7, 8, 9, 10, 11, 12, 13, etc. degrees. But before 7 degrees, several angular positions are skipped or missing, including positions at 2, 3, and 6 degrees. None of the four transmission light beams scans at these angular positions and thus there are no scanlines in the resulting LiDAR scan pattern. As a result, scanline skipping occurs.

Tables 910 and 920 further illustrate that more scanline skipping may occur if the angular channel spacing between the transmitter channels increases. In Table 910, an angular channel spacing of 5 degrees is used; and in Table 920, an angular channel spacing of 7 degrees is used. Similar to Table 900, Table 910 and 920 also list the angular positions of the transmission light beams for all four transmitter channels at each scan number. The scan numbers correspond to the galvanometer mirror's angular positions. The scanning step size of the galvanometer mirror remains the same (e.g., 4 degrees) in Tables 910 and 920. As shown in Table 910 of FIG. 9, for an angular channel spacing of 5 degrees, the angular positions of the transmission light beams are distributed evenly (and so do the resulting scanlines) starting from the angular position at 13 degrees (scan number 4 of the first transmitter channel). That is, starting from 13 degrees, the angular positions of the transmission light beams are evenly spaced at 13, 14, 15, 16, 17, 18, etc. degrees across all four transmitter channels, resulting a target scanline pitch of 1 degree. But before the 13-degree angular position, several angular positions are skipped, including positions at 2, 3, 4, 7, 8, and 12 degrees. None of the four transmission light beams scans at these angular positions and thus there are no scanlines in the resulting LiDAR scan pattern. Comparing Tables 910 and 900, more scanline skipping occurs when the angular channel spacing increases.

Similarly, Table 920 shows that if an angular channel spacing increases to 7 degrees (e.g., the target scanline pitch multiplied by 7), the angular positions of the transmission light beams are distributed evenly starting from the angular position at 19 degrees (scan number 2 of the third transmitter channel). That is, starting from 19 degrees, the angular positions of the transmission light beams are evenly spaced at 19, 20, 21, 22, 23, 24, etc. degrees across the four transmitter channels. But more angular positions are skipped, including positions at 2, 3, 4, 6, 7, 10, 11, 14, and 18 degrees. None of the four transmission light beams scans at these angular positions and thus there are no scanlines in the resulting LiDAR scan pattern. Table 920 shows that if the angular channel spacing further increases, even more scanline skipping occurs.

Comparing Tables 900, 910, and 920, as the angular channel spacing becomes large, the scanline skipping becomes worse inside or near the end-of-travel regions of the galvanometer mirror. A large angular channel spacing means that the transmitter channels are spaced further apart physically, therefore reducing optical channel crosstalk. However, it also creates more skipped scanlines inside or near the end-of-travel regions and thus reduces the resolution of the scan pattern. Scanline skipping is caused by the fact that the speed of the galvanometer mirror changes rapidly when it travels inside the end-of-travel region. For example, when the galvanometer mirror approaches the end position, it needs to reduce the speed to zero; and when it moves in the opposite direction, it needs to increase the speed from zero to a normal oscillation speed. The rapid changing of oscillation speed inside the end-of-travel region results in scanline skipping. As described above, the galvanometer mirror oscillates between two angular positions. An end-of-travel region includes a first part within a first threshold angular distance of a first of the two angular positions and a second part within a second threshold angular distance of a second of the two angular positions. The first and second threshold angular distances can be predetermined based on one or more parameters including, for example, the angular channel spacing, the target scanline pitch, the step size, etc.

Figure 10:
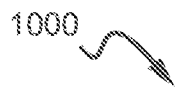
FIG. 10 is a sample transmission beams angular position pattern with a LiDAR system is configured for scanning an ROI, according to some embodiments.

A large angular channel spacing between transmitter channels may cause not only scanline skipping, but also redundant scanlines when the LiDAR system is configured to scan one or more ROIs. FIG. 10 is a sample transmission beam angular position pattern when the LiDAR system is configured for scanning an ROI, according to some embodiments. In Table 1000 shown in FIG. 10, similar to Tables 900-920 described above, the scan numbers listed in the left-most column correspond to the angular positions of the galvanometer mirror. And the angular positions of the transmission light beams in all four transmitter channels (CH #1-CH #4) are listed for each of the scan numbers in Table 1000. The target scanline pitch is configured to be 0.16 degrees outside an ROI and 0.07 degrees inside the ROI. The angular channel spacing between the adjacent transmitter channels is an odd number (e.g., 7) multiplied by the target scanline pitch outside of the ROI. In one example, the angular channel spacing is 1.12 (i.e., 7*0.16) degrees. Similar to those described above, the scanning step size of the galvanometer mirror outside the ROI can be configured as the total number of transmitter channels multiplied by the target scanline pitch. In an LiDAR system having 4 transmitter channels, the scanning step size outside the ROI is thus 0.64 (i.e., 4*0.16) degrees. Inside the ROI, the scanning step size is simply 0.07 degrees because there is no interlacing among 4 channels.

Table 1000 can be generated similarly as Tables 900, 910, or 920 except that different scanning step sizes are used when the galvanometer mirror scans outside the ROI and inside the ROI. Correspondingly, transmission light beams angular positions outside the ROI and inside the ROI are positioned at different pitches. As shown in Table 1000 of FIG. 10, the scan numbers 1-14 correspond to angular positions of the galvanometer mirror when it moves to facilitate scanning outside an ROI; the scan numbers 15-30 correspond to angular positions of the galvanometer mirror when it moves to facilitate scanning inside the ROI; and the scan numbers 31-50 correspond to angular positions of the galvanometer mirror when it moves to facilitate scanning outside the ROI again. Thus, the galvanometer mirror moves to scan inside an ROI at scan number 15 and exits the scanning of the ROI at scan number 31. In the Table 1000 shown in FIG. 10, scan numbers 1-25 correspond to angular positions of the galvanometer mirror when it moves in one direction (e.g., moving down) and scan numbers 26-50 correspond to angular positions of the galvanometer mirror when it moves in the other direction (e.g., moving up). In some embodiments, the scanlines corresponding to scan numbers 1-25 form one frame and the scanlines corresponding to scan numbers 26-50 form the next frame.

As illustrated in Table 1000 of FIG. 10, scanline skipping occurs near the end-of-travel region corresponding to scan numbers 1-6 and 44-50. Specifically, in the part of end-of-travel region corresponding to scan numbers 1-6, the angular positions of the transmission light beams are distributed evenly starting from the angular position at about 8.28 degrees. That is, starting from 7.8 degrees, the angular positions of the transmission light beams are evenly spaced at 8.28, 8.12, 7.96, 7.8 etc. degrees across all four transmitter channels with a target scanline pitch of 0.16 degrees. But several angular positions are skipped or missing, including positions at 11, 10.84, 10.68, 10.36, 10.2, 9.72, 9.56, 9.08, and 8.44 degrees. None of the four transmission light beams scans at these skipped angular positions and thus there are no corresponding scanlines in the resulting scan pattern. As a result, nine scanlines are skipped. Similarly, in the other part of the end-of-travel region, starting from about −11.65 degrees, the angular positions of the transmission light beams are evenly spaced at −11.65, −11.49, −11.33, −11.17, etc. degrees across all four transmitter channels. But angular positions at −14.85, −14.69, −14.53, −14.21, etc. degrees are skipped or missing. None of the four transmission light beams scans at these positions and thus the corresponding scanlines are skipped in the resulting scan pattern.

In addition to scanline skipping, FIG. 10 also shows redundant scanlines when the galvanometer mirror transits into or out of the ROI. As shown in Table 10, for instance, inside of the ROI (e.g., corresponding to scan numbers 15-30), the angular positions of the transmission light beams across all four transmitter channels are evenly distributed with a target scanline pitch of 0.07 degrees. Thus, inside the ROI, the transmission light beam of the first transmitter channel (CH #1) is moved to angular positions at 2.2, 2.13, 2.06, 1.99, . . . 1.15 degrees; the transmission light beam of the second transmitter channel continues the angular positions at 1.08, 1.01, 0.94, 0.87, . . . 0.03 degrees; the transmission beam of the third transmitter channel continues the angular positions at −0.04, −0.11, −0.18, −0.25, . . . −1.09 degrees; and so forth. Thus, inside the ROI, the transmission light beams angular positions from 2.2 degrees to −2.21 degrees are evenly distributed. The resulting scanlines in the scan pattern inside the ROI are also evenly distributed.

But as indicated in Table 1000, there are redundant transmission beams angular positions outside the ROI when the galvanometer mirror is transitioning into the ROI or out from the ROI. For example, at scan number 10, the transmission light beam of the fourth transmitter channel (CH #4) has the angular position of 2.04 degrees. This position is redundant because the transmission light beam of the first transmitter channel (CH #1) has already scanned at angular positions of 2.13, 2.06, and 1.99 degrees inside the ROI. The angular position of 2.04 degrees falls into the angular range that has already covered by scanning inside the ROI. Thus, the scanning at the angular position of 2.04 degrees is redundant and the resulting scanline at that position is also a redundant scanline. Similarly, as illustrated in FIG. 10, angular positions of 1.4 degrees (scan number 11, CH #4), 1.88 degrees (scan number 12, CH #3), 1.24 degrees (scan number 13, CH #3), etc. are also redundant. In general, if the angular positions of the transmission light beams outside the ROI fall within the range of the angular positions covered inside the ROI, then the angular positions outside the ROI are redundant, resulting in redundant scanlines. A high number of redundant scanlines causes wasting of energy to process the scanlines and increases the number of scanlines needed to cover a desired vertical FOV. In this example, for the LiDAR system to scan a vertical FOV of 25 degrees using four transmitter channels, the total number of scanlines is 200, even though the minimum number of scanlines is 191 according to equation [3]. As discussed above, a higher number of scanlines requires the light steering device (e.g., a polygon mirror) to rotate at a faster speed, thereby increasing the acoustic noise of the device and causing further energy waste.

Skipped scanlines and redundant scanlines can be reduced or eliminated by properly configuring one or more movement profiles of the galvanometer mirror. FIG. 11A is a block diagram illustrating a control device and additional components used to control the galvanometer mirror movement and to control the light steering device movement. FIG. 11B is a flowchart illustrating an example method for controlling a galvanometer mirror, according to some embodiments. With reference to FIG. 11A, a control device 1101 can be used to control the movement of the galvanometer mirror 1122. In one embodiment, the control device 1101 comprises processor(s) 1110, memory (not shown), and a galvanometer controller 1114. In some embodiments, the control device 1101 can further comprise a multiple-facet light steering device controller 1134.

Figure 13:
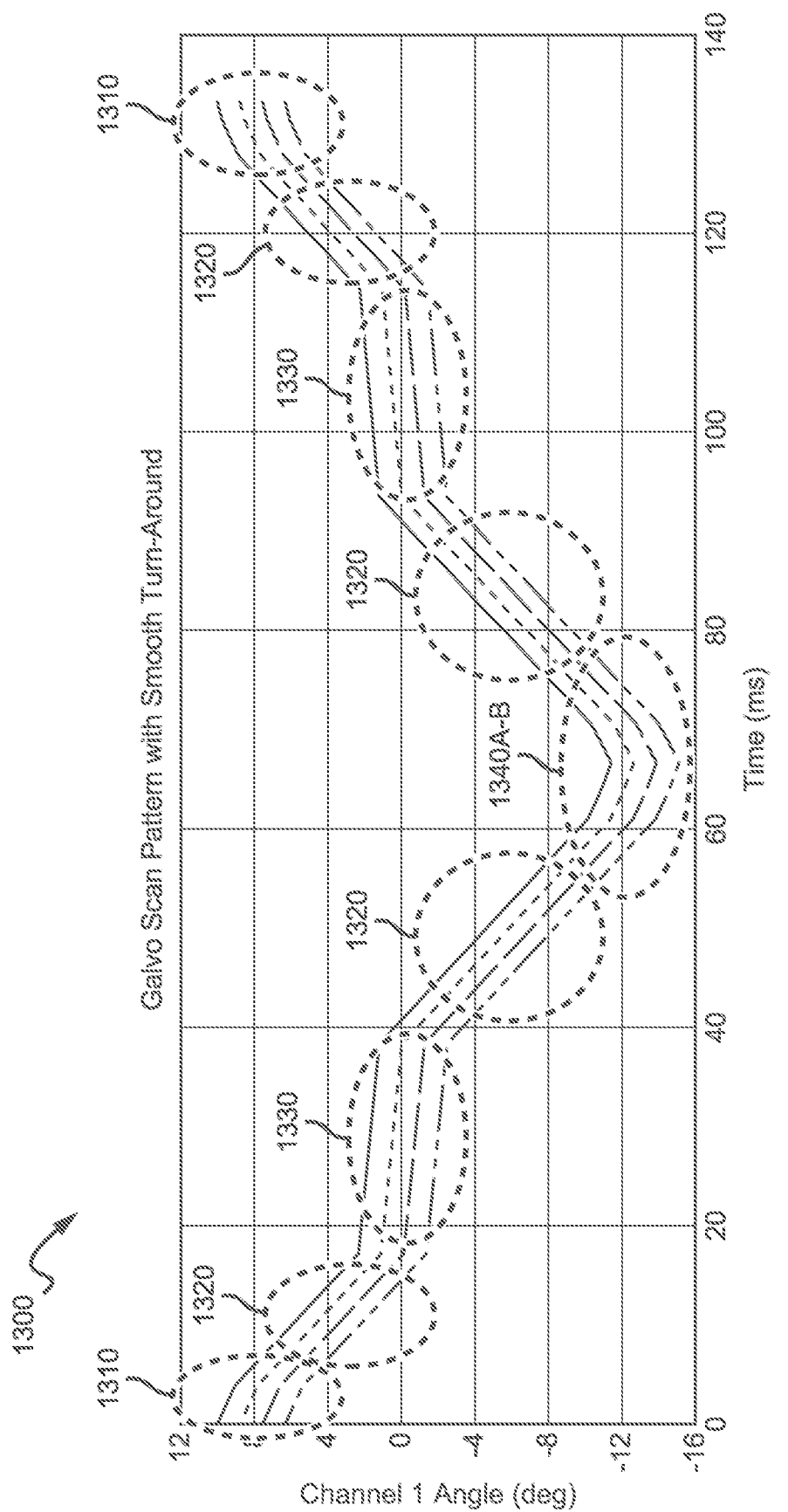
FIG. 13 illustrates example curves representing transmission beams angular position patterns, according to some embodiments.
Figure 14:
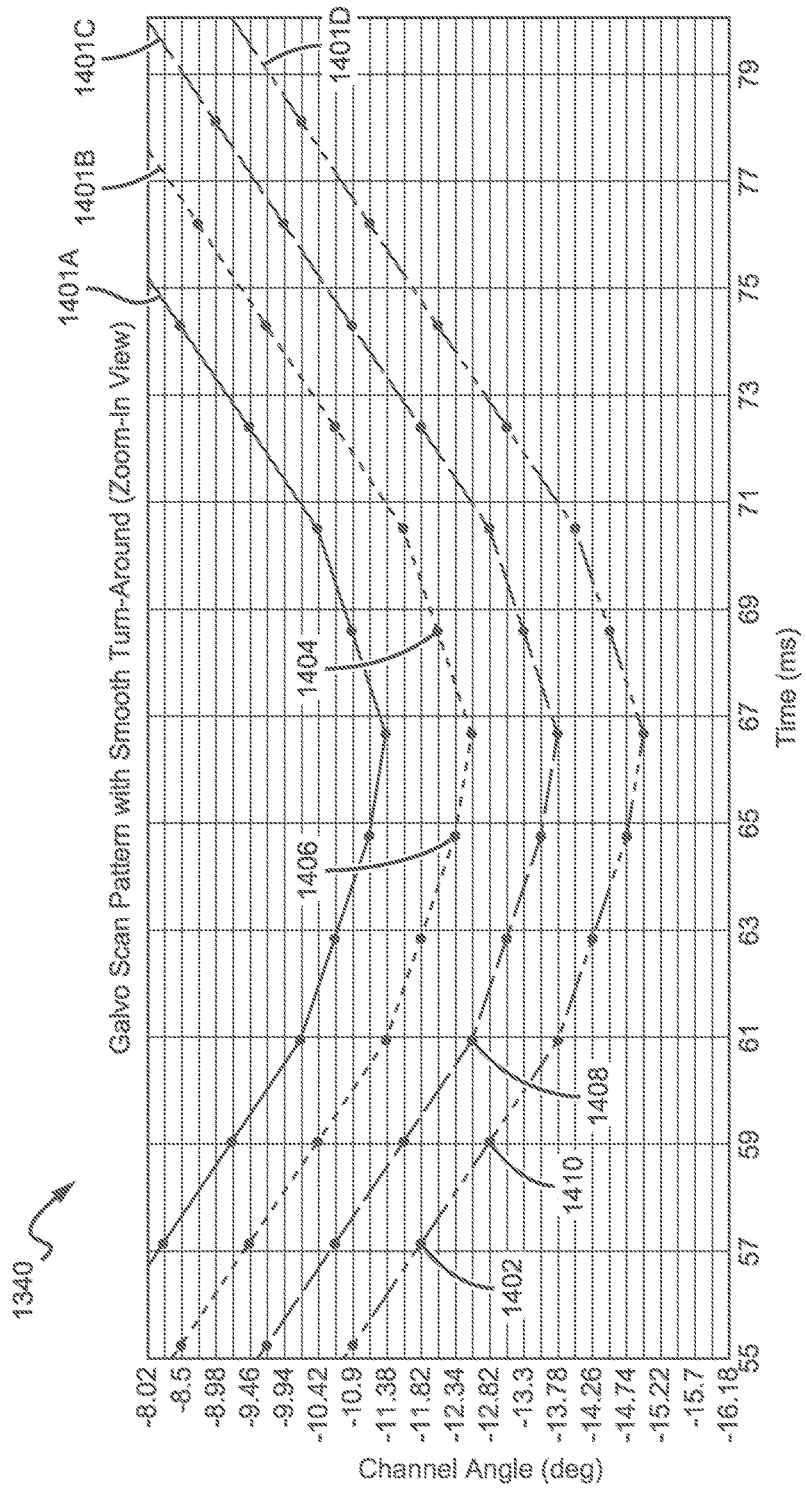
FIG. 14 illustrates a zoom-in view of a portion of the example curves representing the transmission beams angular position patterns shown in FIG. 13, according to some embodiments.

With reference to FIG. 11A, processor(s) 1110 receives one or more galvanometer mirror movement profiles including, e.g., profiles 1102A, 1102B, and/or 1102C. In some embodiments, mirror movement profiles 1102A, 1102B, and 1102C can be predefined or preconfigured for controlling the galvanometer mirror movement inside an end-of-travel region; outside the end-of-travel region and outside an ROI; and outside the end-of-travel region and inside the ROI, respectively. In some embodiments, if the LiDAR system is not configured to scan an ROI, then profile 1102C may not be provided to processor(s) 1110. Each of mirror movement profiles 1102A, 1102B, and 1102C can represent a respective galvanometer mirror angular-position time relation and/or a galvanometer mirror speed-time relation. In some embodiments, the combination of the mirror movement profiles 1102A-C are configured to provide the angular position-time relation and/or speed-time relation associated with the movement of the galvanometer mirror between two angular positions. The angular positions are with respect to an axis about which the galvanometer mirror oscillates (e.g., axis about which mirror 709 oscillates shown in FIG. 7 and/or axis 834 about which mirror 808 oscillates shown in FIG. 8). The two angular positions within with the galvanometer mirror moves are also referred to as the end angular positions or end positions. As one example, the two angular positions can be about −20 degrees and about +20 degrees, respectively. Thus, the galvanometer mirror oscillates to cover about a 40-degree range in one dimension (e.g., the vertical dimension) of the FOV. FIGS. 12-14 illustrate examples of the various mirror-movement profiles and are described in greater detail below.

Processor(s) 1110 can be implemented by hardware and/or software. It can be a discrete component, a part of galvanometer controller 1114, a part of light steering device controller 1134, a part of control device 1101, and/or a part of any other components in the LiDAR system. Process(s) 1110 may also include a processor disposed external to the LiDAR system (e.g., in a cloud computing environment). FIG. 11A further illustrates that in some embodiments, galvanometer mirror position feedback data 1117 is provided to process(s) 1110. Galvanometer mirror position feedback data 1117 can be provided by an encoder and/or a Hall effect sensor associated with a galvanometer motor 1120 to measure the particular angular position of the galvanometer mirror 1122 at any particular time point. Processor(s) 1110 receives one or more movement profiles 1102A-C of galvanometer mirror 1122 and performs one or more signal processing operations based on the received movement profiles. In one embodiment, the movement profiles comprise the preconfigured angular position-time relations and/or speed-time relations of the galvanometer mirror 1122.

The one or more movement profiles 1102A-C can be generated based on one or more parameters associated with the scanning requirements, using one or more signal processing operations. Such parameters include, for example, the LiDAR scanning frame rate (e.g., 15 Hz), the light steering device rotational speed (e.g., 6300 rpm), a time step (denoted as Δt) for each horizontal scan performed by the light steering device, one or more base galvanometer mirror angular speeds (denoted as Sn) and their corresponding time intervals (denoted as $T_n$), and a galvanometer mirror starting angular position (e.g., −10.8 degrees). Each horizontal scan performed by the light steering device uses one facet of the light steering device. As an example, if the light steering device is a 5-facet polygon mirror, each horizontal scan is performed when the polygon mirror rotates about 72 degrees (e.g., across one facet). The one or more base galvanometer mirror angular speeds can be used to determine galvanometer's angular speeds for scanning different regions. For example, the base speed $S_1$ represents the galvanometer mirror angular speed for scanning outside an ROI. One example of the base speed $S_1$ is about 0.47 degrees/ms, which corresponds to a target scanline pitch of about 0.9 degrees. As another example, the base speed $S_2$ is the galvanometer mirror angular speed for scanning inside an ROI. One example of the based speed $S_2$ is about 0.0535 degrees/ms, which corresponds to a target scanline pitch of about 0.1 degrees.

Using the one or more parameters associated with the scanning requirements, one or more movement profiles 1102A-C can be generated using one or more signal processing operations. Some of these signal processing operations include data sampling, filtering, analog-to-digital conversion, superimposing, data compensation, position control, data transformation, digital-to-analog conversion, subtraction, addition, multiplication, division, and/or any other desired operations. For example, a galvanometer mirror movement profile can predefine the galvanometer mirror's angular speed (e.g., in degrees/ms) used for scanning within any particular time interval. In some embodiments, inside an end-of-travel region, the speed of the galvanometer mirror movement can be configured to be a fraction of the base speed $S_1$ (e.g., $0.125*S_1$, $0.25*S_1$, or $0.5*S_1$). Outside the end-of-travel region and outside of an ROI, the speed of the galvanometer mirror movement can be configured to be equal to, or similar to, the base speed $S_1$ (e.g., $0.85*S_1$, $0.95*S_1$, $1.05*S_1$, $1.15*S_1$, or the like). Outside the end-of-travel region and inside of an ROI, the speed of the galvanometer mirror movement can be equal to, or similar to, the base speed $S_2$ (e.g., $0.85*S_2$, $0.95*S_2$, $1.05*S_2$, $1.15*S_2$, or the like). Thus, the base speeds $S_1$ and/or $S_2$ can be modified in any manner for configuring the movement profiles of the galvanometer mirror. In other embodiments, the speed of the galvanometer mirror can be configured directly without using a base speed.

As described above, a galvanometer mirror can be configured to oscillate between two angular positions. The end-of-travel region includes the areas within one or more threshold angular distances from the two angular positions between which the galvanometer mirror oscillates. For example, the end-of-travel region comprises a first part within a first threshold angular distance of a first of the two angular positions between which the galvanometer mirror oscillates. The end-of-travel region further comprises a second part within a second threshold angular distance of a second of the two angular positions. FIG. 13 illustrates such a first part represented by region 1310 located at one end of the galvanometer mirror movement, and such a second part represented by region 1340 located at the other end of the galvanometer mirror movement. In FIG. 13, curves 1300 represent transmission light beam angular positions of the four transmitter channels. As described above, the transmission light beam angular positions can be determined based on the galvanometer mirror angular positions. Region 1310 corresponds to the first part of the end-of-travel region where the galvanometer mirror moves away from, or approaches toward, its vertical bottom position. Region 1340 corresponds to the second part of the end-of-travel region where the galvanometer mirror approaches toward, or moves away from, its vertical top position. In some embodiments, region 1310 may be associated with the first threshold angular distance; and region 1340 may be associated with a second threshold angular distance. The first threshold angular distance may or may not be the same as the second threshold angular distance. As a result, the first part of the end-of-travel region may or may not have the same angular range as the second part of the end-of-travel region.

Based on one or more parameters described above and the first and second threshold angular distances, multiple speeds and time intervals defining the galvanometer mirror movement inside and outside the end-of-travel region can be determined. As described above, the speed of the galvanometer movement within a first part (e.g., region 1310 shown in FIG. 13) of the end-of-travel region can be pre-configured to be a fraction of the base speed $S_1$ (e.g., $0.5*S_1$). Using the speed of the galvanometer movement within the first part of the end-of-travel region and the threshold angular distance associated with the first part, the time points between which the galvanometer mirror travels within the first part can be computed. As an example, the first movement profile (e.g., 1102A in FIG. 11A) for configuring the mirror movement inside the end-of-travel region may define that from the time point of 0ms to the time point of $2*\Delta t$ (where $\Delta t$ denotes the step size), the galvanometer mirror's angular speed should be half of the base speed (i.e., $0.5*S_1$). The second movement profile (e.g., 1102B in FIG. 11A) for configuring the mirror movement outside the end-of-travel region may define that from the time point of $2*\Delta t$ to the time point of $T_1$, the galvanometer mirror's angular speed should be the base speed $S_1$. If the galvanometer mirror is configured to facilitate scanning an ROI, the third movement profile (e.g., 1102C in FIG. 11A) for configuring the mirror movement inside the ROI may define that from time point $T_1$ to time point $T_1+T_2$, the galvanometer mirror's speed should be another base speed $S_2$. In this manner, the movement profiles in different regions (outside the end-of-travel region, inside the end-of-travel region, and inside the ROI) can be configured differently. In some embodiments, movement profiles 1102A-C are combined as a single movement profile that configures the movement trajectory of the galvanometer mirror in all regions.

With reference back to FIG. 11A, in some embodiments, processor(s) 1110 may modify one or more movement profiles 1102A-C based on galvanometer mirror position feedback data 1117. During operation, the angular positions of galvanometer mirror 1122 may not always be accurately controlled (e.g., according to movement profiles 1102A-C for mirror 1022) and may have position inaccuracies from time to time. The position inaccuracies may be generated due to many factors such as controller inaccuracies, assembly-caused inaccuracies, inaccuracies caused by optical components manufacturing tolerance, inaccuracies caused by vibration, shock, temperature changes, and/or other environmental changes, etc. For example, a LiDAR system and its components often experience vibration or shock during the operation of a motor vehicle, to which the LiDAR system is mounted. The vibration and shock may affect the position accuracies of one or more optical components in the LiDAR system, including mirror 1122. Therefore, in some embodiments, there will be differences between the expected angular positions included in the movement profile 1102A-C and the actual angular positions of galvanometer mirror 1122. To reduce or eliminate such differences, galvanometer mirror position feedback data 1117 can be taking into account when generating the control signals using one or more of the movement profiles 1102A-C.

In some embodiments, galvanometer mirror 1122 has a rotary position encoder and/or a Hall effect sensor, or any other desired position encoders. The position encoder provides position feedback data 1117 to processor(s) 1110. Using one or more of movement profiles 1102A-C and the position feedback data 1117 associated with the galvanometer mirror 1122, processor(s) 1110 generates signals 1111 by performing one or more of signal processing operations. Some of these signal processing operations include data sampling, filtering, analog-to-digital conversion, superimposing, data compensation, position control, data transformation, digital-to-analog conversion, subtraction, addition, multiplication, division, and/or any other desired operations. Signals 1111 represent modified movement profiles based on the position feedback data 1117. For example, based on the position feedback data 1117, a particular angular position and/or speed associated with a particular time in one or more of movement profiles 1102A-C can be modified (increased or decreased) to compensate the angular position inaccuracy of galvanometer mirror 1122. As such, the oscillation trajectory of galvanometer mirror 1122 can be controlled and adjusted in real time during operation. It is understood that in certain circumstances, one or more movement profiles 1102A-C may not need to be modified because position feedback data 1117 do not represent any inaccuracy or that the inaccuracy is below a threshold. If there is no inaccuracy or if an inaccuracy is below the threshold, the signals 1111 may be generated using just the one or more movement profiles 1102A-C.

With reference still to FIG. 11A, signals 1111 are provided to galvanometer controller 1114. Using the signals 1111, controller 1114 generates control signals 1113 for controlling galvanometer drive 1118. In some embodiments, control signals 1113 are pulse width modulation (PWM) signals (e.g., 3.3V signals having milliampere current level). These pulse width modulation signals are provided to galvanometer driver 1118, which can generate a more powerful signal 1115 to drive a galvanometer motor 1120. In one embodiment, galvanometer driver 1118 includes an amplifier to amplify the input PWM control signal 1113 to generate a 12V PWM signal 1115 having ampere level current. This high-power signal 1115 is then used to drive a galvanometer motor 1120 to oscillate galvanometer mirror 1122. In some embodiments, two or more of galvanometer controller 1114, galvanometer mirror 1122, motor 1120, a position encoder (not shown), and galvanometer driver 1118 are included in a galvanometer mirror assembly.

FIG. 11A illustrates that control device 1101 includes processor(s) 1110 and galvanometer controller 1114. Control device 1101 can further include a light steering device controller 1134. Control device 1101 can be implemented by hardware and/or software. In one embodiment, control device 1101 can be a part of control circuitry 350 shown in FIG. 3. In some embodiments, light steering device controller 1134 controls the movement of light steering device 1142 (e.g., setting a predefine rotational speed). As described above, the control of the galvanometer mirror 1122 can be performed based on the one or more movement profiles 1102A-C and optionally based on galvanometer mirror position feedback data 1117. As a result, controllers 1114 and 1134 can be configured such that the rotation cycle of the light steering device 1142 is synchronized with the scanning cycle of galvanometer mirror 1122. The synchronization between the light steering device 1142 and the galvanometer mirror 1122 can provide a more stable point cloud data, and is described in more detail below.

FIG. 11A further illustrates that in some embodiments, light steering device position feedback data 1137 are provided to processor(s) 1110. Similar to those described above, the angular positions of light steering device 1142 may also have position inaccuracies and thus position feedback data 1137 can be provided to one or both of processor(s) 1110 and light steering device controller 1134 for at least partially compensating the position inaccuracies of light steering device 1142. Light steering device 1142 can also obtain its angular positions/speed by using a position encoder. The position encoder can be a rotary position encoder and/or a Hall effect sensor, or any other desired position encoders. The position encoder provides position feedback data 1137 to processor(s) 1110 and/or light steering device controller 1134. Using light steering device position feedback data 1137, processor(s) 1110 can modify one or more galvanometer movement profiles 1102A-C to compensate the position inaccuracies of light steering device 1142. For example, if light steering device 1142 slows down its rotation, processor(s) 1110 can modify a speed-time relation included in one or more of profiles 1102A-C such that the scanning cycle of galvanometer mirror 1122 and the rotation cycle of light steering device 1142 remain synchronized. In one embodiment, the one or more profiles 1102A-C are modified such that the galvanometer mirror's oscillation speed is reduced or increased.

In one embodiment, using position feedback data 1137, light steering device controller 1134 generates one or more control signals 1137 for directly controlling the light steering device 1142 to compensate for its position inaccuracies. For example, based on position feedback data 1137, a particular angular position and/or speed of light steering device 1142 can be modified (increased or decreased) to compensate the angular position inaccuracy of device 1142 during operation. As such, one or more aspects of the rotational movement (e.g., speed) of light steering device 1142 can be controlled and adjusted in real time during operation. It is understood that in certain circumstances, the rotational movement of light steering device 1142 may not need to be adjusted because position feedback data 1137 may indicate that there is no inaccuracy (or that the inaccuracy or error is below a threshold). If there is no inaccuracy or if an inaccuracy is below the threshold, light steering device controller 1134 may not generate any signals for adjusting the movement of the light steering device 1142.

With reference still to FIG. 11A, in some embodiments, control signals 1137 are pulse width modulation (PWM) signals (e.g., 3.3V signals having milliampere current level). These pulse width modulation signals are provided to light steering device driver 1138, which can generate a more powerful signal 1139 to drive a light steering device motor 1140. In one embodiment, light steering device driver 1138 includes an amplifier to amplify the input PWM control signal 1137 to generate a 12V PWM signal 1139 having ampere level current. Signal 1139 has a high power and is then used to drive motor 1140 to rotate light steering device 1142. In some embodiments, two or more of light steering device controller 1134, light steering device driver 1138, light steering device motor 1140, a position encoder (not shown), and light steering device 1142 (e.g., a polygon mirror) are included in a multiple-facet light steering device assembly.

FIG. 11B is a flowchart illustrating a method 1160 for performing an intelligent LiDAR scanning using one or more galvanometer mirror movement profiles described above. With reference to FIGS. 11A and 11B, method 1160 may begin with step 1162, in which a first mirror movement profile is received by a control device (e.g., device 1101 in FIG. 11A). The first mirror movement profile can be a profile for controlling the galvanometer mirror to move inside an end-of-travel region (e.g., regions 1310 and/or 1340 shown in FIG. 13). The first mirror movement profile can include a speed-time relation and/or an angular position-time relation of the galvanometer mirror's movement inside the end-of-travel region. As described above, an end-of-travel region may include a first part (e.g., region 1310 in FIG. 13) within a first threshold angular distance of a first of the two angular positions between which the galvanometer mirror oscillates. The end-of-travel region may also include a second part (e.g., region 1340 in FIG. 13) within a second threshold angular distance of a second of the two angular positions. The first threshold angular distance may or may not be the same as the second threshold angular distance. That is, the first part of the end-of-travel region may or may not have the same angular range as the second part of the end-of-travel region. For instance, if Δt denotes a time step of the galvanometer mirror corresponding to each horizontal scan performed by the light steering device, the first part of the end-of-travel region may correspond to the angular distance that the galvanometer mirror moves within two time steps (e.g., 2*Δt), while the second part of the end-oftravel region may correspond to the angular distance that the galvanometer mirror moves within four time steps (e.g., 4*Δt).

With reference still to FIG. 11B, in step 1164 of method 1160, the control device receives a second mirror movement profile. The second mirror movement profile can be a profile for controlling the galvanometer mirror to move outside the end-of-travel region and outside an ROI (if any). The second mirror movement profile can include a speed-time relation and/or an angular position-time relation of the galvanometer mirror's movement outside the end-of-travel region and outside the ROI. In some embodiments, the first mirror movement profile is associated with a slower movement speed than the second mirror movement profile. For instance, the first mirror movement profile may define that the galvanometer mirror moves inside the end-of-travel region at a speed of a fraction of the base speed $S_1$ (e.g., about 0.25*$S_1$ or 0.5*$S_1$). And the second mirror movement profile may define that the galvanometer mirror moves outside the end-of-travel region at the base speed (e.g., about $S_1$). Thus, the galvanometer mirror moves faster outside the end-of-travel region than inside the end-of-travel region. In FIG. 13, the slopes of different parts of curves 1300 represent different angular speeds of the galvanometer mirror's movement. For example, the speed of the movement is greater in region 1320 (e.g., outside of end-of-travel region) than in region 1310 (e.g., inside the end-of-travel region). As described below in more detail, slowing down the galvanometer mirror's movement inside the end-of-travel region can reduce or eliminate scanline skipping.

As described above, the first mirror movement profile and the second mirror movement profile can be determined based on one or more parameters including the target pitch of the scanlines and the number of transmitter channels. For instance, if a first target pitch outside of an ROI and a second target pitch inside the ROI are predefined, the minimum number of scanlines per frame can be calculated based on equation [3] described above. If the frame rate is also defined, then the total number of scanlines per second can be determined based on equation [1]. If the number of the facets of the light steering device and the number of transmitter channels are also known, the rotation speed of the light steering device can be calculated using equation [2], and in turn the time step Δt of the galvanometer mirror can be determined. Thus, the mirror movement profiles can be determined based on the time step Δt and one or more base speeds ($S_1$, $S_2$) as described above.

With reference to FIG. 11B, if the LiDAR system is configured to scan an ROI, the control device receives (step 1165) a third mirror movement profile for scanning inside the ROI. As described above, the third mirror movement profile includes a speed-time relation and/or an angular position-time relation of the galvanometer mirror's movement inside the ROI. Typically, the speed of the galvanometer mirror movement inside the ROI is slower than that outside the ROI, for obtaining the smaller target scanline pitch inside the ROI. The third mirror movement profile can be determined based on the target scanline pitch inside the ROI and the number of transmitter channels, in a similar manner as described above with respect to the second mirror movement profile.

In step 1166 of method 1160, the control device receives galvanometer mirror's position feedback data. As described above, in some embodiments, the position feedback data represent position inaccuracy, if any, of the galvanometer mirror and are used to adjust the movement profiles for better controlling the angular position and/or speed of the galvanometer mirror. In some embodiments, the position feedback data can also be used for determining if the galvanometer mirror is currently located inside or outside an end-of-travel region.

In step 1168, the control device determines if the galvanometer mirror is currently located inside or outside an end-of-travel region. The determination can be based on the position feedback data received in step 1166, and/or based on a time point. For instance, if a first mirror movement profile defines that between time points 0 and 2*Δt, the galvanometer mirror should move inside an end-of-travel region and if the current time point (e.g., Δt) is between the defined time points, then the control device determines the galvanometer mirror is moving inside the end-of-travel region. If the current time point (e.g., 3*Δt) is outside of these two defined time points, the control device determines that the galvanometer mirror is moving outside the end-of-travel region. In some embodiments, the control device compares the galvanometer mirror's position feedback data with one or more threshold angular distances to determine if the mirror is moving inside or outside the end-of-travel region. For example, if the current position feedback data indicates that the mirror's position is at an angular position that is less than the threshold angular distance, the control device determines that the mirror is moving inside an end-of-travel region, and vice versa.

FIG. 11B further illustrates that if the galvanometer mirror is determined to be inside an end-of-travel region, the control device controls (step 1170) the galvanometer mirror to move based on the first mirror movement profile. And if the galvanometer mirror is determined to be outside an end-of-travel region, the control device further determines (step 1174) if the mirror is outside an ROI. If so, the control device controls (step 1176) the galvanometer mirror to move based on the second mirror movement profile. As described above, in some embodiments, the first mirror movement profile is associated with a slower movement speed than the second mirror movement profile. For instance, based on the first mirror movement profile, the galvanometer mirror moves at a speed of about 0.5*$S_1$ inside the end-of-travel region; while based on the second mirror movement profile, the galvanometer mirror moves at a speed of about $S_1$ outside the end-of-travel region. The slower moving speed inside the end-of-travel region facilitates reducing or eliminating scanline skipping, which occurs if the moving speed is the same for both inside and outside of the end-of-travel region.

FIG. 12 is a sample transmission beams angular position pattern when the galvanometer mirror is configured to scan according to one or more mirror movement profiles. An angular position of a particular transmitter beam is related to the angular position of the galvanometer mirror. The numbers in Table 1200 of FIG. 12 represent angular positions of transmission beams provided by multiple transmitter channels (e.g., four channels CH #1-CH #4). Each of the angular positions in Table 1200 of FIG. 12 thus corresponds to a scanline in the resulting LiDAR scan pattern. FIG. 12 illustrates that by properly configuring the galvanometer mirror movement files, the number of skipped scanlines is reduced. As described above, a LiDAR system can include multiple transmitter channels separated from each other by an angular channel spacing. When the adjacent transmitter channels are configured to have the proper angular channel spacing, the multiple transmission light beams are positioned sufficiently apart at a desired angular separation to scan different areas within an FOV, providing a good coverage of the scanned areas and improving the scan resolution and speed. In FIG. 12, the angular channel spacing is configured to be, for example, 1.2 degrees. The target scanline pitch for scanlines outside the ROI is 0.24 degrees. The angular channel spacing is configured to be an integer multiplication of the target scanline pitch (e.g., in this case, 5*0.24). The angular channel spacing can thus be equal to or greater than the target scanline pitch. As described above, the target scanline pitch can be determined based on one or more parameters including a maximum LiDAR detection distance outside of a region of interest (ROI), a reflection rate outside of the ROI, a horizontal direction field-of-view (FOV) requirement outside of the ROI, a vertical direction FOV requirement outside of the ROI, an horizontal direction angular resolution outside of the ROI, and a vertical direction angular resolution outside of the ROI.

With reference to FIG. 12, in Table 1200, the example angular channel spacing is 1.2 degrees, which is 5 multiplied by the target scanline pitch (e.g., 0.24). Table 1200 shows the transmission beam angular positions corresponding to two frames of scanning. The first frame is generated when the galvanometer mirror oscillates from, for example, a first end angular position to a second end angular position. The first frame corresponds to time points from 0 ms to 64.77 ms. The second frame is generated when the galvanometer mirror oscillates from, for example, the second end angular position back to the first end angular position. The second frame corresponds to time points from 66.675 ms to 131.445 ms. In each of the first frame and the second frame, the galvanometer mirror oscillates within an end-of-travel region. A first part of the end-of-travel region corresponds to the time points from about 0ms to about 5.715 ms when the galvanometer mirror oscillates away from the first end angular position, and also corresponds to the time points from about 125.73 ms to about 131.445 ms when the galvanometer mirror approaches toward the first end angular position. Similarly, a second part of the end-of-travel region corresponds to the time points from about 59.055 ms to about 64.77 ms when the galvanometer mirror approaches the second end angular position, and also corresponds to the time points from about 66.675 ms to about 72.39 ms when the galvanometer mirror oscillates away from the second end angular position.

Table 1200 shows that there are skipped scanlines in the first part of the end-of-travel region corresponding to the time points from about 0ms to about 5.715 ms. That is, the angular positions of the transmission light beams are distributed evenly (and so does the resulting scanlines) starting from the angular position at 7.1 degrees, which is at about 7.62 ms. Table 1200 shows that starting from 7.1 degrees, the angular positions of the transmission light beams are evenly spaced (and so are the resulting scanlines) at 7.1, 6.86, 6.62, 6.38, 6.14, etc., degrees across all four transmitter channels with a target scanline pitch of 0.24 degrees. But in the first part of the end-of-travel region as shown by Table 1220, angular positions at 9.74, 9.26, 8.54, and 7.34 degrees are skipped.

Using the properly configured mirror movement profiles, these skipped scanlines are filled in the next frame when the galvanometer mirror oscillates back to the first part of the end-of-travel region corresponding to time points from 125.73 ms to 133.35 ms. As shown by Table 1200, angular positions 9.84, 9.26, 8.54, and 7.34 degrees are present in the first part of the end-of-travel region corresponding to the time points from about 125.73 ms to about 131.445 ms. In other words, the skipped scanlines in one galvanometer mirror scanning cycle can be compensated by the scanlines in another galvanometer mirror scanning cycle. Similarly, Table 1200 shows that in the second part of the end-of-travel region corresponding to time points from about 59.055 ms to 64.77 ms, angular positions at 12.1, 13.3, 14.02, and 14.5 degrees are skipped, resulting in skipped scanlines. But these angular positions are present in the second part of the end-of-travel region corresponding to time points from about 66.675 ms to 72.39 ms.

A galvanometer mirror scanning cycle corresponds to a complete trip in one mirror movement direction. A scanning cycle generates one frame. As shown in Table 1200 of FIG. 12, from the time points of about 0ms (e.g., corresponding to scan number 1) to about 64.77 ms (e.g., corresponding to scan number 35), the galvanometer mirror oscillates from the first end angular position to the second end angular position (e.g., from top to bottom). Thus, the galvanometer mirror has completed one scanning cycle. Similarly, from the time points of about 66.675 ms (e.g., corresponding to scan number 36) to about 131.445 ms (e.g., corresponding to scan number 70), the galvanometer mirror oscillates from the second end angular position back to the first end angular position (e.g., from bottom to top), thereby completing another scanning cycle. The two scanning cycles (one from top to bottom and one from bottom to top) are neighboring scanning cycles for generating two scanning frames. As a result, scanlines skipping in the end-of-travel region in one scanning cycle can be compensated (e.g., filled in) by its neighboring scanning cycle. In this example, the scanline skipping is thus eliminated due to the using of one or more mirror movement profiles to slow down the galvanometer mirror movement within the end-of-travel region. In general, movement of the galvanometer mirror based on the properly configured mirror movement profile facilitates minimizing or eliminating instances of scanlines having a pitch exceeding the target scanline pitch (e.g., outside of ROI and inside the end-of-travel region). Scanlines having a pitch exceeding the target scanline pitch correspond to skipped or missing scanlines. Eliminating or minimizing the skipped or missing scanlines improves the resolutions of the scanline pattern, reduces the speed of the light steering device for producing the same total number of scanlines, and thus improves the overall performance of the LiDAR system.

With reference back to FIG. 11B, as described above, the control device determines (step 1174) if the galvanometer mirror is located inside or outside an ROI. An ROI is a region between a third threshold angular distance from the first of the two angular positions (within which the galvanometer mirror oscillates) and a fourth threshold angular distance from the second of the two angular positions (within which the galvanometer mirror oscillates). FIG. 12 illustrates an ROI between angular positions corresponding to time points from about 17.145 ms to about 38.1 ms when the galvanometer mirror moves in one direction and time points from about 94.345 ms to about 114.3 ms when the galvanometer mirror moves in the other direction. The angular position at the time point of 17.145 ms, for example, is about 6.72 degrees from the angular position at the time point of 0ms. Therefore, in this example, the third threshold angular distance is about 6.72 degrees, indicating that the ROI is about 6.72 degrees from one end angular position of the galvanometer mirror's oscillation range. Similarly, the fourth threshold angular distance is about 11.52 degrees from the other end angular position of the galvanometer mirror's oscillation range. In this example, therefore, the ROI is closer to one end angular position than that to the other end. The angular positions and threshold distances associated with the ROI can be preconfigured or determined based on dynamic vehicle scanning requirements. For example, if a vehicle perception and planning system (e.g., system 220 shown in FIG. 2) requests, for example, the LiDAR system to provide a high resolution scan of a certain area that is different from the currently-configured ROI, the LiDAR system can dynamically move the ROI (and the configure the associated angular positions and threshold distances) to the requested area.

In some embodiments, the control device can configure the angular range of the ROI based on the angular channel spacing and the number of the transmitter channels. For example, the ROI illustrated in Table 1200 of FIG. 12 has an angular range of about 4.8 degrees, which is equal to the angular channel spacing (e.g., 1.2 degrees) multiplied by the number of transmitter channels (e.g., 4). As shown in FIG. 12, inside the ROI, the galvanometer mirror is configured, based on the third mirror movement profile, to move at a slower speed such that the target scanline pitch of about 0.1 degrees is achieved. When the galvanometer mirror moves inside the ROI, the first transmitter channel (CH #1) scans angular positions from about 2.3 degrees to 1.2 degrees in a 0.1 degrees step; the second transmitter channel (CH #2) scans angular positions from about 1.1 degrees to 0 degrees in a 0.1 degrees step; and the third transmitter channel (CH #3) thus scans angular positions from −0.1 degrees to −1.2 degrees in a 0.1 degrees step; and the fourth transmitter channel (CH #4) thus scans angular positions from −1.3 degrees to −2.4 degrees in a 0.1 degrees step. As a result, in this example, within the ROI, the scanlines generated by each transmitter channel do not overlap with other scanlines generated by other transmitter channels. Each transmitter channel is spaced apart from its neighboring transmitter channel by 1.2 degrees, and configured to scan an angular range of about 1.2 degrees with a 0.1 degrees step. Therefore, the angular range of the ROI is the multiplication of the angular channel spacing and the quantity of the transmitter channels.

With reference back to FIG. 11B, step 1174 can be performed in a similar manner as step 1168. For instance, the determination can be based on the current time point and the one or more mirror movement profiles, which include speed-time and/or angular position-time relations. The determination can also be based on comparing the galvanometer mirror's position feedback data with the angular range of the ROI. FIG. 13 illustrates a region 1330, which corresponds to the ROI angular range within which the galvanometer mirror moves. The two areas of region 1330 in FIG. 13 indicates that the galvanometer mirror moves into and out of the ROI from different directions (e.g., one from top to bottom and the other from bottom to top). FIG. 12 illustrates that in one scanning direction (e.g., from top to bottom), the galvanometer mirror moves into the ROI region at the time point of about 17.145 ms and moves out from the ROI region at the time point of about 38.1 ms. In the other scanning direction (e.g., from bottom to top), the galvanometer mirror moves into the ROI region at the time point of about 93.345 ms and moves out from the ROI at the time point of about 114.3 ms.

FIG. 12 further illustrates that inside the ROI, the target scanline pitch is configured to be 0.1 degrees, which is much smaller than the pitch of 0.24 degrees outside the ROI. Thus, inside the ROI, the galvanometer mirror enables a higher resolution scanning. The target scanline pitch inside an ROI can be configured according to one or more parameters including, a maximum LiDAR detection distance inside of the ROI, a reflection rate inside of the ROI, a horizontal direction field-of-view (FOV) requirement inside of the ROI, a vertical direction FOV requirement inside of the ROI, an horizontal direction angular resolution inside of the ROI, and/or a vertical direction angular resolution inside of the ROI. FIG. 11B illustrates that if the control device determines that the galvanometer mirror is located inside an ROI, it controls (step 1180) the galvanometer mirror to move based on the third mirror movement profile.

FIG. 12 further illustrates that by configuring the galvanometer mirror's movement (using the second and third mirror movement profiles) to their respective scanning speeds for scanning outside and inside the ROI, the number of redundant or overlapping scanlines can be reduced or eliminate. As described above for FIG. 10, redundant or overlapping scanlines may occur when the galvanometer mirror moves into an ROI or out from an ROI. These redundant scanlines correspond to transmission beam angular positions that have already been covered inside the ROI and are thus unnecessary. As shown in Table 1000 in FIG. 10, the redundant scanlines occur at the angular positions corresponding to scan numbers 10-14 and 31-35. That is, there are redundant scanlines distributed corresponding to 11 scan numbers if the scanning does not use properly-configured movement profiles. When the galvanometer mirror is configured to move according to the speed-time relation or angular position-time relation defined in the mirror movement profiles, the number of redundant or overlapping scanlines is reduced. This is illustrated by FIG. 12. Table 1200 illustrates that in one galvanometer scanning cycle corresponding to the time points between about 0ms to 64.77 ms, the redundant scanlines occur at the angular positions corresponding to scan numbers 7-9 and 23-24 (corresponding to time points between about 11.43-15.24 ms and 41.91-43.815 ms). Compared to the number of scan numbers that have redundant scanlines in Table 1000, the number of scan numbers that have redundant scanlines in Table 1200 has been reduced from 11 to 5. Reducing the number of redundant scanlines further reduces the requirements of the rotational speed of the light steering device such that it can rotate slower while still achieving a required number of total scanlines. This in turn reduces the energy consumption and improves the reliability and stability of the light steering device.

FIG. 13 illustrates example curves 1300 representing transmission beams angular position patterns in multiple transmitter channels, according to some embodiments. As described above, the transmission beams angular positions are related to, and can be derived from, the galvanometer mirror's angular positions. Therefore, curves 1300 provide a visual representation of the galvanometer mirror's movement across different regions. As shown in FIG. 13, different parts of the curves 1300 have different slopes, indicating that the galvanometer mirror moves at different angular speed in different regions. For instance, region 1310 of curves 1300 corresponds to angular positions inside the end-of-travel region of the galvanometer mirror and region 1320 corresponds to angular positions outside the end-of-travel region. The slope of region 1310 is smaller than the slope of region 1320, indicating that the galvanometer mirror moves slower inside the end-of-travel region than outside the end-of-travel region. Similarly, the slope of region 1330 is much smaller than any other regions, indicating that galvanometer mirror moves slower inside the ROI than outside the ROI.

Figure 15:
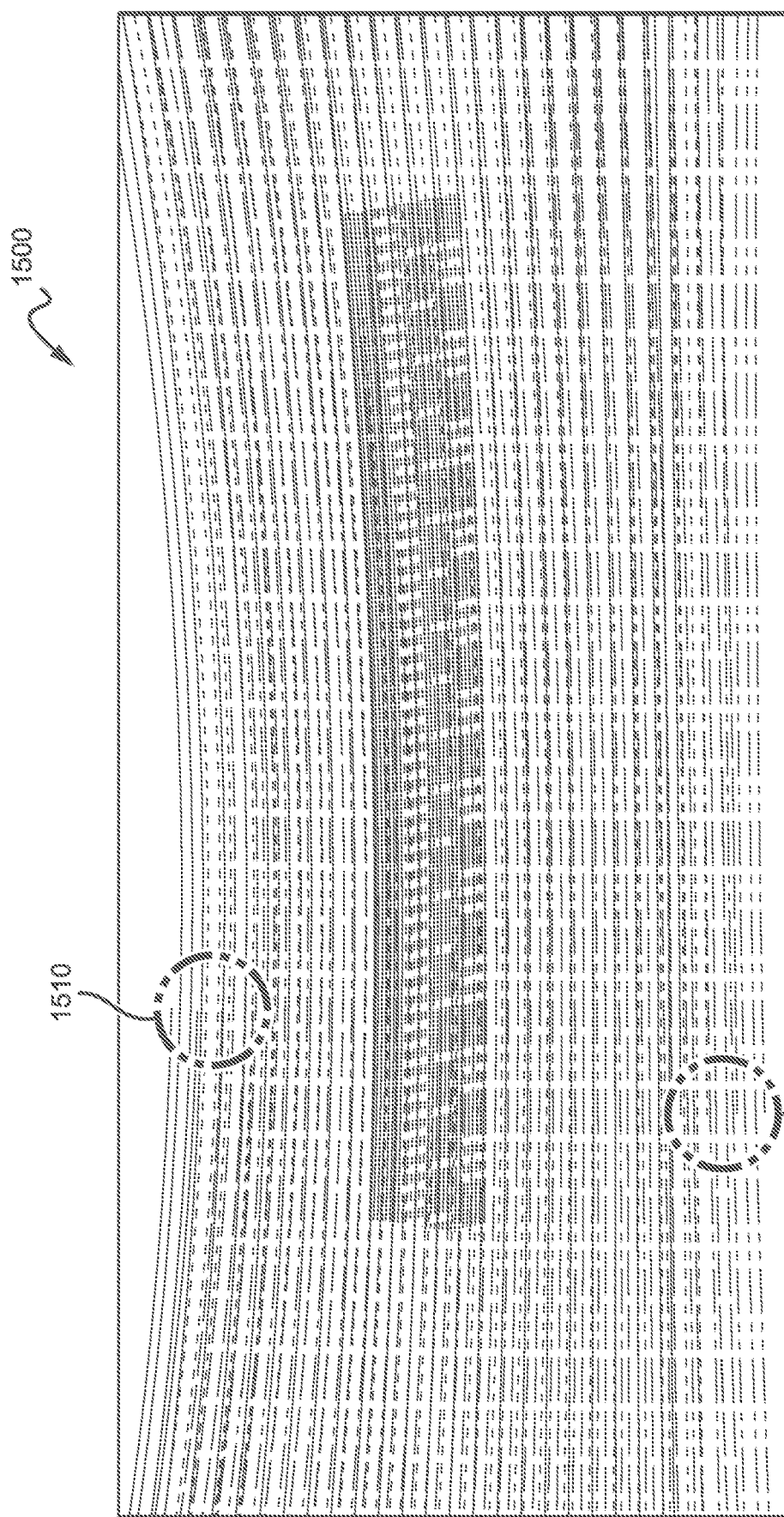
FIG. 15 illustrates an example LiDAR scanning pattern, according to some embodiments.

FIG. 14 illustrates a zoomed-in view of a portion of the example curves 1300 representing transmission beams angular position patterns in multiple transmitter channels shown in FIG. 13, according to some embodiments. The portion of curves 1300 shown in FIG. 14 is a part of region 1340, which corresponds to the end-of-travel region of the galvanometer mirror. As described above, scanline skipping may occur in the end-of-travel region if the galvanometer mirror's oscillation speed remains the same as that outside of the end-of-travel region. When the galvanometer mirror is configured to move based on the first mirror movement profile, it slows down the oscillation speed inside the end-of-travel region and thus eliminates the scanline skipping. This is illustrated in FIG. 14, in which each data point represents a corresponding scanline in a LiDAR scanline pattern (an example is shown in FIG. 15). The target scanline pitch associated with curves 1300 is configured to be about 0.24 degrees. Thus, if each of the data points shown in FIG. 14 is spaced from its neighboring data point by about 0.24 degrees, no scanline skipping or missing occurs. As one example, data point 1402 (located on curve 1401D) has an angular position of about −11.86 degrees. Its neighboring data point is data point 1404 located on curve 1401B. Data point 1404 has an angular position at about −12.1 degrees. Therefore, the two data points 1402 and 1404 are spaced apart by about 0.24 degrees. Data point 1404 is located in a neighboring scanning cycle of the galvanometer mirror because FIG. 14 shows that at the time of data point 1404, the galvanometer mirror has changed the moving direction, thereby starting another scanning cycle. The next neighboring data point is data point 1406 located on curve 1401B. Data point 1406 has an angular position at about −12.34 degrees. Again, data points 1404 and 1406 are spaced apart by about 0.24 degrees. Similarly, the next neighboring data point is data point 1408 located on curve 1401C. Data point 1408 has an angular position of about −12.58 degrees. The next neighboring data point is data point 1410 located on curve 1401D. Data point 1410 has an angular position of about −12.82 degrees. As illustrated by FIG. 14, the five data points 1402, 1404, 1406, 1408, and 1410 are each spaced apart from their neighboring data points by 0.24 degrees. Because each of the data points corresponds to a scanline, the scanlines are thus spaced apart at the target scanline pitch of 0.24 degrees. In a similar manner, the data points from curves 1300 (representing scanning using the 4 transmission beams) cover all the angular positions in the desired 0.24-degree pitch. As a result, there is no scanline skipping in the end-of-travel region.

FIG. 15 illustrates an example LiDAR scanline pattern 1500, according to some embodiments. LiDAR scanline pattern 1500 illustrates that the scanlines are evenly spaced at the first target scanline pitch in the end-of-travel region and other regions outside of ROI. That is, scanline pattern 1500 shows that by controlling the galvanometer mirror's movement based on properly-configured mirror movement profiles, the galvanometer mirror's oscillation speed is reduced inside the end-of-travel region, thereby eliminating skipped scanlines. FIG. 15 further illustrates that the LiDAR system is configured to scan an ROI, which correspond to the scanlines in the center area of the scanline pattern in both the vertical and horizontal directions. The scanlines associated with the ROI has a smaller target scanline pitch, thereby providing a higher density or resolution scanline pattern.

With reference still to FIG. 15, the LiDAR scanline pattern 1500 corresponds to one scanning frame. In some situations, the starting position of the scanning frame may drift from frame-to-frame. For example, the starting position 1510 may change horizontally across multiple frames. Correspondingly, the ending position 1520 may change horizontally across multiple frames. The drifting of the starting and ending positions of the frames is caused by the lack of synchronization between the rotational speed of the light steering device and the oscillation speed of the galvanometer mirror. With reference back to FIGS. 11A and 11B, in some embodiments, the control device (e.g., device 1101) is configured to synchronize (steps 1172 or 1182) the movement of the light steering device with the movement of the galvanometer mirror. For example, the speed of the galvanometer mirror can be controlled or predetermined such that the galvanometer mirror's scanning cycle is synchronized with the rotation cycle of the light steering device. This can be performed by further adjusting the speed-time relation in one or more of the mirror movement profiles of the galvanometer mirror. As one example, during the same amount of time that the galvanometer mirror oscillates one cycle, the light steering device can be configured to rotate an N number of cycles, where N is an integer number. An oscillation cycle of the galvanometer mirror refers to the movement from one end angular position to the other end angular position (e.g., from top to bottom or from bottom to top). A rotation cycle of the light steering device (e.g., a polygon mirror) refers to one complete 360-degree rotation. Thus, if during the same amount of time, the galvanometer mirror completes one oscillation cycle and the light steering device completes a fixed integer number of rotation cycles, the scanline starting position is fixed from frame-to-frame. Using Table 1200 in FIG. 12 as an example, if in the same amount of time that the galvanometer mirror completes one oscillation cycle (e.g., scanning from time points at about 0 ms to 64.77 ms, or completes 35 time steps), the light steering device completes 35 rotation cycles, then the starting and stopping scanline positions of the resulting scanline pattern do not drift from frame-to-frame. In this example, at each angular position of the galvanometer mirror (corresponding to each time point), the light steering device completes one complete 360-degree rotation cycle.

Eliminating the frame-to-frame drifting of the starting positions can make the resulting point cloud more stable by reducing or eliminating the frame-to-frame jitter. Jitter may be caused by variation of the facet characteristics among different facets of the light steering devices. Ideally, all facets of the light steering device are exactly the same. In reality, however, different facets may have slightly different shapes, tilt angles (a tilt angle is an angle between the rotational axis of the light steering device and the normal direction of the facet), surface roughness, etc. Thus, scanlines generated by scanning using different facets of the light steering device may move up and down to form jitter from frame-to-frame. For instance, if a first scanline of a frame is formed by scanning using a first facet of the light steering device and a first scanline of the next frame is formed by scanning using a second facet of the light steering device, the scanlines of the two frames may not be at the same position because the two facets are slightly different. As a result, frame-to-frame jitter occurs, and the point cloud is unstable. By synchronizing the movements of the galvanometer mirror and the light steering device, the jitter can be eliminated or reduced, thereby improving the quality of the scanlines.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention. For example, while the ROI is illustrated as being positioned in the middle of the FOV in the vertical direction, those skilled in the art would appreciate that the ROI can be positioned anywhere within the FOV. As another example, the speed, angular positions, time points, etc. illustrated above can be configured to be different values in other embodiments to achieve the same or similar purposes.

What is claimed is:

1. A light detection and ranging (LiDAR) scanning system, comprising:
   a light steering device;
   a galvanometer mirror controllable to oscillate between two angular positions;
   a plurality of transmitter channels configured to direct light to the galvanometer mirror, the plurality of transmitter channels being separated by an angular channel spacing from one another;
   a control device including one or more processors, memory, and processor-executable instructions stored in memory, the processor-executable instructions comprising instructions for:
      inside an end-of-travel region of an oscillation range of the galvanometer mirror, controlling the galvanometer mirror to move based on a first mirror movement profile, the end-of-travel region of the oscillation range of the galvanometer mirror comprising a first part within a first threshold angular distance of a first of the two angular positions and a second part within a second threshold angular distance of a second of the two angular positions; and
      outside the end-of-travel region, controlling the galvanometer mirror to move based on a second mirror movement profile, the second mirror movement profile being different from the first mirror-movement profile;
      wherein movement of the galvanometer mirror based on the first mirror movement profile facilitates minimizing instances of scanlines corresponding to the end-of-travel region having a pitch exceeding a first target pitch.

2. The system of claim 1, wherein the first mirror movement profile comprises a first galvanometer mirror speed-time relation, wherein the second mirror movement profile comprises a second galvanometer mirror speed-time relation, and wherein the first mirror movement profile is associated with a slower movement speed than the second mirror-movement profile.

3. The system of claim 1, wherein the angular channel spacing is greater than the first target pitch.

4. The system of claim 3, wherein the angular channel spacing is an integer multiple of the first target pitch.

5. The system of claim 1, wherein the processor-executable instructions comprise further instructions for:
   synchronizing movement of the light steering device with the movement of the galvanometer mirror.

6. The system of claim 1, wherein a scan cycle of the galvanometer mirror corresponds to an integer multiple of a rotation cycle of the light steering device.

7. The system of claim 1, wherein the processor-executable instructions comprise further instructions for:
   receiving the first mirror movement profile, wherein the first mirror movement profile is configured based on the first target pitch and a quantity of the transmitter channels of the plurality of transmitter channels.

8. The system of claim 1, wherein the processor-executable instructions comprise further instructions for:
   receiving the second mirror movement profile, wherein the second mirror movement profile is configured based on the first target pitch and a quantity of the transmitter channels of the plurality of transmitter channels.

9. The system of claim 1, wherein the processor-executable instructions comprise further instructions for:
   receiving position feedback data of the galvanometer mirror; and
   determining, based on the position feedback data of the galvanometer mirror, whether the galvanometer mirror is located inside or outside the end-of-travel region.

10. The system of claim 1, wherein the first target pitch is determined based on at least one of:
    a maximum LiDAR detection distance outside of a region of interest (ROI),
    a reflection rate outside of the ROI,
    a horizontal direction field-of-view (FOV) requirement outside of the ROI,
    a vertical direction FOV requirement outside of the ROI,
    an horizontal direction angular resolution outside of the ROI, and
    a vertical direction angular resolution outside of the ROI.

11. The system of claim 1, wherein the processor-executable instructions comprise further instructions for:
    outside the end-of-travel region and inside a region of interest (ROI), controlling the galvanometer mirror to move based on a third mirror movement profile, the third mirror movement profile being different from the second mirror movement profile,
    wherein movement of the galvanometer mirror based on the third mirror movement profile facilitates obtaining scanlines corresponding to the ROI having a second target pitch.

12. The system of claim 11, wherein the processor-executable instructions comprise further instructions for:
    receiving the third mirror movement profile, wherein the third mirror movement profile is configured based on a second target pitch and a quantity of the transmitter channels of the plurality of transmitter channels.

13. The system of claim 11, wherein the second target pitch is smaller than the first target pitch.

14. The system of claim 11, wherein the processor-executable instructions comprise further instructions for:
    receiving position feedback data of the galvanometer mirror; and
    determining, based on the position feedback data of the galvanometer mirror, whether the galvanometer mirror is located inside or outside the ROI.

15. The system of claim 11, wherein the second target pitch is determined based on at least one of:
    a maximum LiDAR detection distance inside of the ROI,
    a reflection rate inside of the ROI,
    a horizontal direction field-of-view (FOV) requirement inside of the ROI,
    a vertical direction FOV requirement inside of the ROI,
    an horizontal direction angular resolution inside of the ROI, and
    a vertical direction angular resolution inside of the ROI.

16. The system of claim 11, wherein the ROI is a region between a third threshold angular distance from the first of the two angular positions and a fourth threshold angular distance from the second of the two angular positions.

17. The system of claim 11, wherein the processor-executable instructions comprises further instructions for:
  determining the ROI based on one or more dynamic vehicle scanning requirements.

18. The system of claim 11, wherein a range of the ROI is a multiplication of the angular channel spacing and a quantity of the transmitter channels of the plurality of transmitter channels.

19. The system of claim 11, wherein movement of the galvanometer mirror based on the second mirror movement profile and the third mirror movement profile further facilitates minimizing instances of scanline overlapping between scanlines obtained by scanning outside of the ROI and scanlines obtained by scanning inside the ROI.

20. A method for performing scan using a light detection and ranging (LiDAR) system, the method being performed by one or more processors and memory, the method comprising:
  inside an end-of-travel region of an oscillation range of the galvanometer mirror, controlling the galvanometer mirror to move based on a first mirror movement profile, the end-of-travel region of the oscillation range of the galvanometer mirror comprising a first part within a first threshold angular distance of a first of the two angular positions and a second part within a second threshold angular distance of a second of the two angular positions; and
  outside the end-of-travel region, controlling the galvanometer mirror to move based on a second mirror movement profile, the second mirror movement profile being different from the first mirror-movement profile;
  wherein movement of the galvanometer mirror based on the first mirror movement profile facilitates minimizing instances of scanlines corresponding to the end-of-travel region having a pitch exceeding a first target pitch.

21. The method of claim 20, wherein the first mirror movement profile comprises a first galvanometer mirror speed-time relation, wherein the second mirror movement profile comprises a second galvanometer mirror speed-time relation, and wherein the first mirror movement profile is associated with a slower movement speed than the second mirror-movement profile.

22. The method of claim 20, wherein the angular channel spacing is greater than the first target pitch.

23. The method of claim 22, wherein the angular channel spacing is an integer multiple of the first target pitch.

24. The method of claim 20, further comprising:
  synchronizing movement of a light steering device with the movement of the galvanometer mirror.

25. The method of claim 20, further comprising:
  receiving the first mirror movement profile, wherein the first mirror movement profile is configured based on the first target pitch and a quantity of a plurality of transmitter channels of the LiDAR system; and
  receiving the second mirror movement profile, wherein the second mirror movement profile is configured based on the first target pitch and a quantity of a plurality of transmitter channels of the LiDAR system.

26. The method of claim 20, further comprising:
  outside the end-of-travel region and inside a region of interest (ROI), controlling the galvanometer mirror to move based on a third mirror movement profile, the third mirror movement profile being different from the second mirror movement profile,
  wherein movement of the galvanometer mirror based on the third mirror movement profile facilitates obtaining scanlines corresponding to the ROI having a second target pitch.

27. The method of claim 26, further comprising:
  receiving the third mirror movement profile, wherein the third mirror movement profile is configured based on a second target pitch and a quantity of a plurality of transmitter channels of the LiDAR system; and
  wherein the second target pitch is smaller than the first target pitch.

28. The method of claim 27, wherein movement of the galvanometer mirror based on the second mirror movement profile and the third mirror movement profile further facilitates minimizing instances of scanline overlapping between scanlines obtained by scanning outside of the ROI and scanlines obtained by scanning inside the ROI.

29. A non-transitory computer readable medium storing one or more programs, the one or more programs comprising instructions, which when executed by one or more processors of an electronic device, cause the electronic device to perform a process including:
  inside an end-of-travel region of an oscillation range of the galvanometer mirror, controlling the galvanometer mirror to move based on a first mirror movement profile, the end-of-travel region of the oscillation range of the galvanometer mirror comprising a first part within a first threshold angular distance of a first of the two angular positions and a second part within a second threshold angular distance of a second of the two angular positions; and
  outside the end-of-travel region, controlling the galvanometer mirror to move based on a second mirror movement profile, the second mirror movement profile being different from the first mirror-movement profile;
  wherein movement of the galvanometer mirror based on the first mirror movement profile facilitates minimizing instances of scanlines corresponding to the end-of-travel region having a pitch exceeding a first target pitch.

30. A vehicle comprising a light detection and ranging (LiDAR) scanning system, the LiDAR system comprising:
  a light steering device;
  a galvanometer mirror controllable to oscillate between two angular positions;
  a plurality of transmitter channels configured to direct light to the galvanometer mirror, the plurality of transmitter channels being separated by an angular channel spacing from one another;
  a control device including one or more processors, memory, and processor-executable instructions stored in memory, the processor-executable instructions comprising instructions for:
    inside an end-of-travel region of an oscillation range of the galvanometer mirror, controlling the galvanometer mirror to move based on a first mirror movement profile, the end-of-travel region of the oscillation range of the galvanometer mirror comprising a first part within a first threshold angular distance of a first of the two angular positions and a second part within a second threshold angular distance of a second of the two angular positions; and
    outside the end-of-travel region, controlling the galvanometer mirror to move based on a second mirror movement profile, the second mirror movement profile being different from the first mirror-movement profile;

wherein movement of the galvanometer mirror based on the first mirror movement profile facilitates minimizing instances of scanlines corresponding to the end-of-travel region having a pitch exceeding a first target pitch.

\* \* \* \* \*